United States Patent
Furuya et al.

(10) Patent No.: US 7,796,324 B2
(45) Date of Patent: Sep. 14, 2010

(54) WAVELENGTH CONVERTING APPARATUS AND IMAGE DISPLAYING APPARATUS

(75) Inventors: Hiroyuki Furuya, Nara (JP); Tetsuro Mizushima, Osaka (JP); Kazuhisa Yamamoto, Osaka (JP); Shinichi Kadowaki, Hyogo (JP); Koichi Kusukame, Osaka (JP)

(73) Assignee: Panasonic Corporation, Osaka (JP)

( * ) Notice: Subject to any disclaimer, the term of this patent is extended or adjusted under 35 U.S.C. 154(b) by 79 days.

(21) Appl. No.: 12/438,114

(22) PCT Filed: Oct. 9, 2007

(86) PCT No.: PCT/JP2007/069674
§ 371 (c)(1),
(2), (4) Date: Feb. 19, 2009

(87) PCT Pub. No.: WO2008/044673
PCT Pub. Date: Apr. 17, 2008

(65) Prior Publication Data
US 2010/0066649 A1    Mar. 18, 2010

(30) Foreign Application Priority Data
Oct. 10, 2006  (JP) .............................. 2006-276217
Oct. 25, 2006  (JP) .............................. 2006-289819

(51) Int. Cl.
G02F 1/35    (2006.01)
G02F 2/02    (2006.01)

(52) U.S. Cl. ........................................ 359/328; 372/22

(58) Field of Classification Search ......... 359/326–332; 372/21, 22; 345/55
See application file for complete search history.

(56) References Cited

U.S. PATENT DOCUMENTS 5,898,718 A * 4/1999 Mohatt et al. ................. 372/22

(Continued)

FOREIGN PATENT DOCUMENTS

JP    1-98282    4/1989

(Continued)

OTHER PUBLICATIONS

International Search Report issued Jan. 15, 2008 in International (PCT) Application No. PCT/JP2007/069674.

*Primary Examiner*—Daniel Petkovsek
(74) *Attorney, Agent, or Firm*—Wenderoth, Lind & Ponack L.L.P.

(57) ABSTRACT

A wavelength converting apparatus comprising: a laser resonator; a first wavelength converting element that converts a fundamental wave outputted from the laser resonator into a harmonic wave; a first temperature control element that controls the temperature of the first wavelength converting element; a second wavelength converting element that converts a fundamental wave outputted from the first wavelength converting element into a harmonic wave; a second temperature control element that controls the temperature of the second wavelength converting element; a first detecting portion that detects an output of a harmonic wave outputted from the first wavelength converting element; a second detecting portion that detects an output of a harmonic wave outputted from the second wavelength converting element; and a controller that manages temperature control of the first wavelength converting element by the first temperature control element, temperature control of the second wavelength converting element by the second temperature control element, and current value control of a driving current applied to the laser light source.

17 Claims, 31 Drawing Sheets

U.S. PATENT DOCUMENTS

| | | | |
|---|---|---|---|
| 6,130,901 A * | 10/2000 | Takamine et al. | 372/32 |
| 7,583,431 B2 * | 9/2009 | Furuya et al. | 359/326 |
| 2004/0066807 A1 | 4/2004 | Kasazumi et al. | |
| 2004/0240495 A1 | 12/2004 | Akamatsu | |
| 2004/0258109 A1 | 12/2004 | Tojo et al. | |
| 2008/0144678 A1 * | 6/2008 | Lu et al. | 372/22 |

FOREIGN PATENT DOCUMENTS

| | | |
|---|---|---|
| JP | 2-253969 | 10/1990 |
| JP | 10-41589 | 2/1998 |
| JP | 11-44897 | 2/1999 |
| JP | 2001-125156 | 5/2001 |
| JP | 2002-62556 | 2/2002 |
| JP | 2003-75877 | 3/2003 |
| JP | 2004-103954 | 4/2004 |
| JP | 2004-356579 | 12/2004 |
| JP | 2005-10340 | 1/2005 |
| JP | 2005-311133 | 11/2005 |
| WO | 03/001635 | 1/2003 |
| WO | 2006/090721 | 8/2006 |

* cited by examiner (1) SHIFT IN FUNDAMENTAL WAVE
    LONG WAVELENGTH
(2) RISE IN ELEMENT TEMPERATURE
(3) RECOVERY (1) SHIFT IN FUNDAMENTAL WAVE
    SHORT WAVELENGTH
(2) DROP IN ELEMENT TEMPERATURE
(3) RECOVERY

FIG. 7B

| FIRST STAGE OUTPUT (G1) | SECOND STAGE OUTPUT (G2) | ELEMENT STATUS | APPLICABLE ALGORITHM |
|---|---|---|---|
| INCREASE | DECREASE | DROP IN ELEMENT TEMPERATURE ONLY IN FIRST STAGE | ALGORITHM 1 |
| DECREASE | INCREASE | RISE IN ELEMENT TEMPERATURE ONLY IN FIRST STAGE EFFECT OF ELEMENT HEATING | ALGORITHM 1 |
| INCREASE | INCREASE | VARIATION IN AMBIENT TEMPERATURE (DROP IN TEMPERATURE) VARIATION IN LASER WAVELENGTH (SHIFT TOWARDS LONGER WAVELENGTHS) | ALGORITHM 2 |
| DECREASE | DECREASE | VARIATION IN AMBIENT TEMPERATURE (RISE IN TEMPERATURE) VARIATION IN LASER WAVELENGTH (SHIFT TOWARDS SHORTER WAVELENGTHS) | ALGORITHM 2 |
| CONSTANT | INCREASE | DROP IN ELEMENT TEMPERATURE IN SECOND STAGE | ALGORITHM 3 |
| CONSTANT | DECREASE | RISE IN ELEMENT TEMPERATURE IN SECOND STAGE | ALGORITHM 3 |
| INCREASE | CONSTANT | DROP IN TEMPERATURE OF FIRST STAGE, RISE IN TEMPERATURE OF SECOND STAGE | ALGORITHM 1 |
| DECREASE | CONSTANT | RISE IN TEMPERATURE OF FIRST STAGE, DROP IN TEMPERATURE OF SECOND STAGE | ALGORITHM 1 |

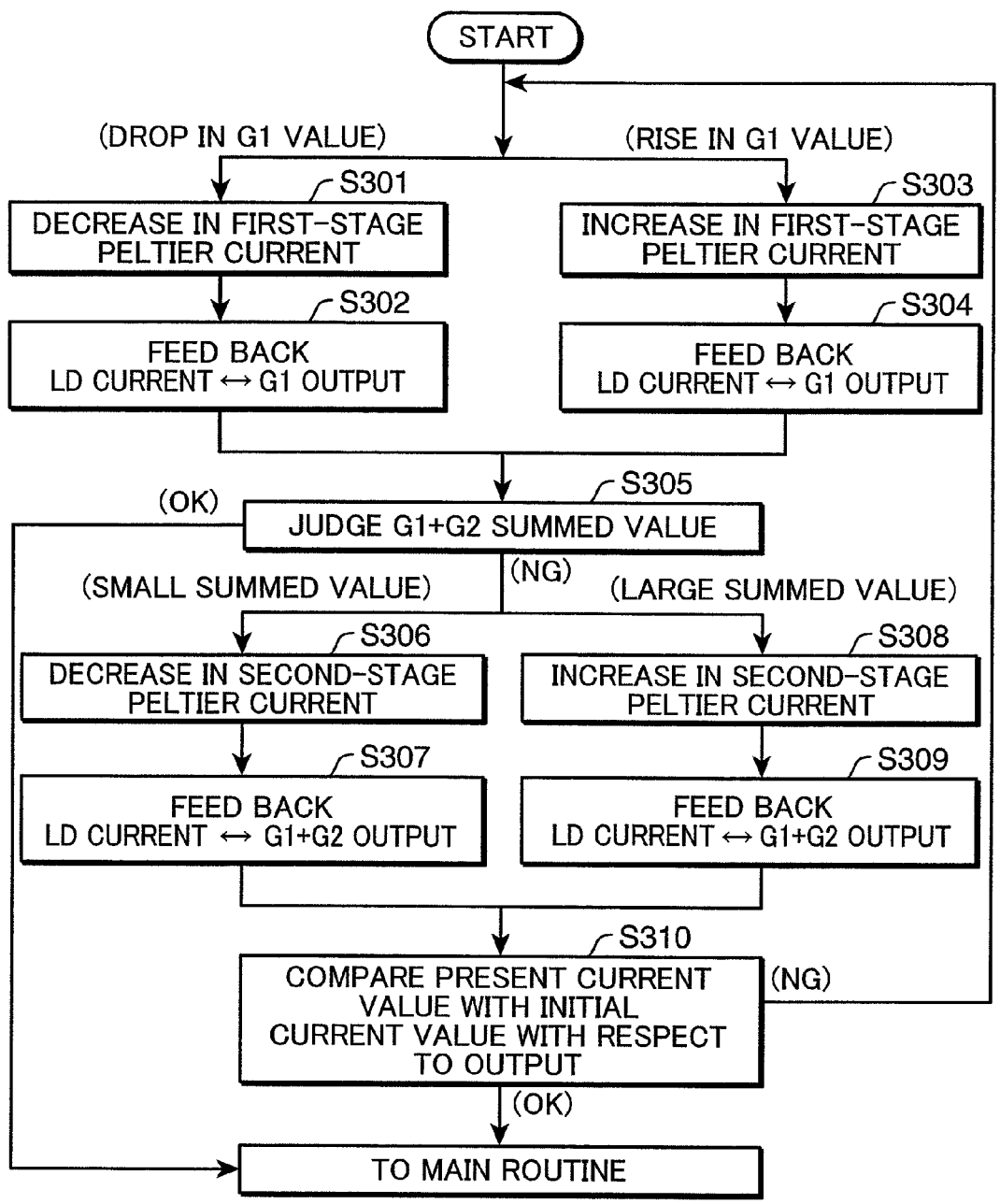

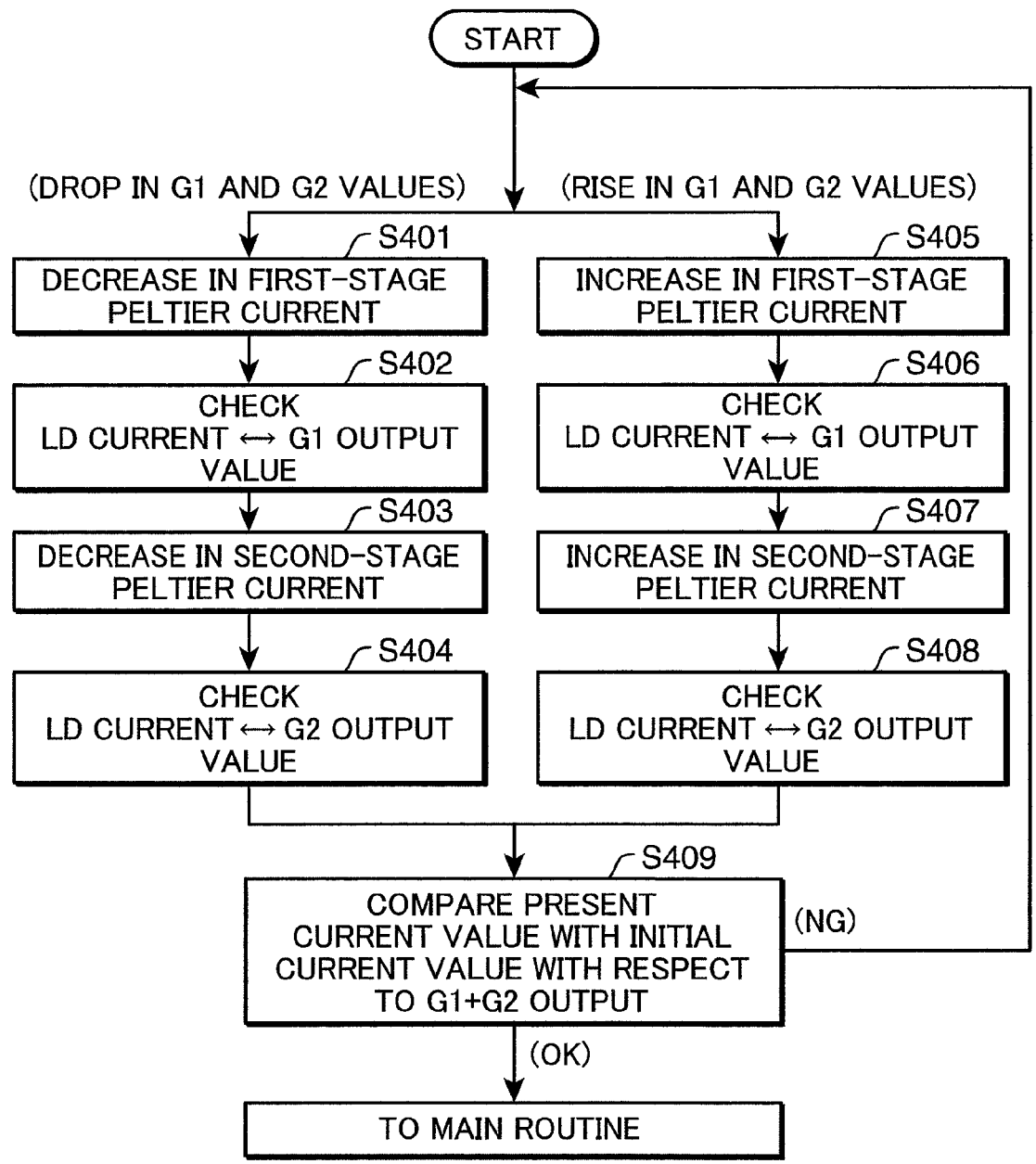

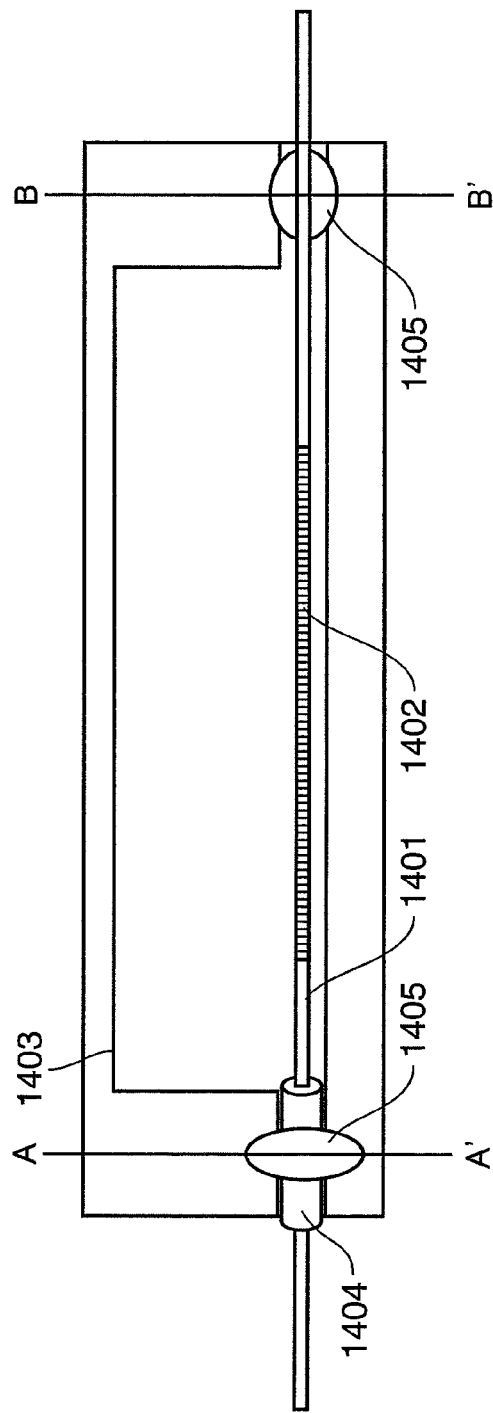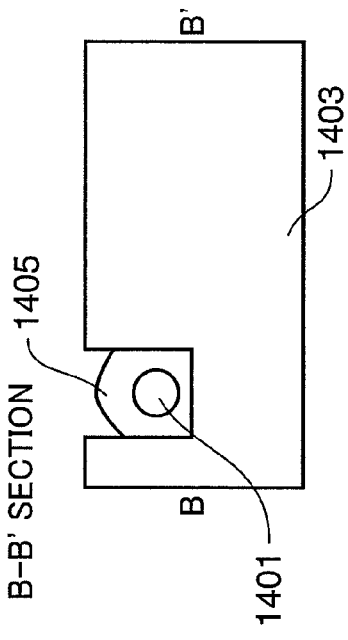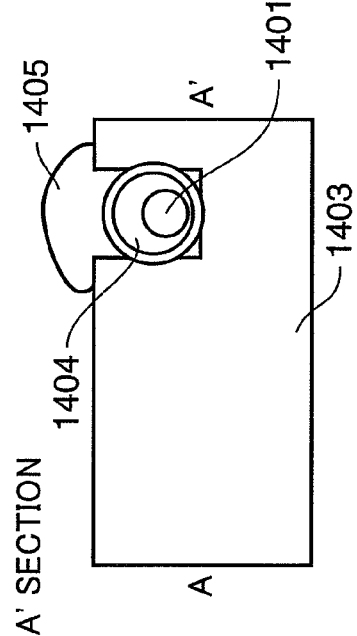

WAVELENGTH CONVERTING APPARATUS AND IMAGE DISPLAYING APPARATUS

TECHNICAL FIELD

The present invention relates to a wavelength converting apparatus that combines a fiber laser and a wavelength converting element to obtain a stable visible-light high-power laser, and an image displaying apparatus that uses the wavelength converting apparatus as a light source.

BACKGROUND ART

A highly monochromatic visible light source capable of a W-class high output is considered a requisite for realizing a large-size display, a high-brightness display and the like. Among the three primary colors of red, green and blue, as a red light source, a red high-power semiconductor laser used in DVD recorders and the like is usable as a highly productive compact light source. However, green and blue light sources are difficult to realize using a semiconductor laser and the like, resulting in demands for highly productive compact light sources. In particular, green light sources are difficult to realize due to the lack of appropriate material constructible as a semiconductor laser for generating green output light.

As such a light source, a wavelength converting apparatus that combines a fiber laser and a wavelength converting element is realized as a low-power visible light source. Blue and green compact light sources which use a semiconductor laser as an excitation light source for exciting the fiber laser and a nonlinear optical crystal as the wavelength converting element are well known.

However, several challenges must be overcome in order to obtain green and blue W-class high-power output lights from such a wavelength converting apparatus. A schematic configuration of a conventional wavelength converting apparatus is shown in FIG. 31. Using this configuration, a case will now be described in which, for example, a green output light is obtained. The wavelength converting apparatus shown in FIG. 31 comprises a fiber laser 20 which outputs a fundamental wave and a wavelength converting element 27 which converts the fundamental wave into green laser light.

Furthermore, basic laser operations of the fiber laser 20 will be described. In FIG. 31, first, excitation light from an excitation laser light source 21 is incident from one end of a fiber. After the incident excitation light is absorbed by a laser active substance contained in a Yb fiber 14, a seed light of the fundamental wave is generated inside the fiber 14. The seed light of the fundamental wave is repeatedly reflected and travels back and forth inside a laser resonator which includes a fiber grating 22 and a fiber grating 25 as a pair of reflecting mirrors. At the same time, the seed light is amplified by a gain attributable to the laser active substance contained in the fiber 14, and reaches laser oscillation with its light intensity increased and wavelength selected. The laser light source 21 is current-driven by an excitation laser current source 31.

Next, basic operations of the wavelength converting apparatus shown in FIG. 31 will be described. As described above, a fundamental wave is outputted from the fiber laser 20 and enters the wavelength converting element 27 via a lens 26. The fundamental wave from the fiber laser 20 is converted into a harmonic wave by a non-linear optical effect of the wavelength converting element 27. While a portion of the converted harmonic wave is reflected by a beam splitter 28, the transmitted harmonic wave becomes a green laser light that is the output light of the wavelength converting apparatus.

The harmonic wave partially reflected by the beam splitter 28 is received by a light-receiving element 29 for monitoring output light of the wavelength converting apparatus, and subsequently converted into an electric signal to be used. An output controller 30 adjusts a driving current of the laser light source 21 using the excitation laser current source 31 so that the intensity of the converted signal enables a desired output to be obtained by the wavelength converting apparatus. Accordingly, the intensity of the excitation light from the laser light source 21 is adjusted, the output intensity of the fundamental wave of the fiber laser 20 is adjusted, and as a result, the intensity of the output of the wavelength converting apparatus is adjusted. Consequently, a so-called automatic power control (hereinafter abbreviated as "APC") operates stably in which the intensity of the output of the wavelength converting apparatus is kept constant.

As described above, since methods such as monitoring the output from a laser light source and feeding back the same to a current value that drives the laser in order to achieve a constant light output from the laser, keeping the temperature of a laser-holding portion constant, and the like are important techniques in the field of optical recording, various methods have been conventionally proposed. For example, in Patent Document 1, a method is proposed for predicting a temperature rise of a semiconductor chip portion from a current value applied to a laser diode to regulate temperature. Various other methods have been proposed, including a method proposed in Patent Document 2 in which an upper limit is set to a current value applied when controlling light intensity using feedback control to protect a laser diode.

In addition, a method is proposed in Patent Document 3 for determining a current amount to be applied when using an air-cooled laser diode by monitoring the temperature of the laser diode instead of performing current feedback using a photodiode. Patent Document 4 proposes a method for preventing the destruction of a laser diode when commencing temperature regulation concurrently with the start of an operation of the laser diode by reducing an initial driving current in accordance with a detected temperature of the laser diode. Patent Document 5 proposes a method for determining a current amount to be applied by monitoring the temperature of a laser diode using a temperature detector to be used when performing temperature regulation of a laser. Furthermore, a configuration such as those described in Patent Documents 6 to 8 is proposed in regards to an output stabilizing method in a case of combining a laser diode with a wavelength converting element. Various methods other than those described in the aforementioned patent documents have been proposed in regards to temperature regulation of a laser diode.

However, with the conventional wavelength converting apparatuses described above, it is difficult to obtain green light in a stable manner amidst fluctuations in ambient temperature and, in particular, when the aforementioned conventional wavelength converting apparatuses are placed inside a commercially-available device such as a backlight of a projection display or a liquid crystal display, there is a problem in that a gradual rise in the temperature inside a chassis causes a decline in green output. On the other hand, a method for controlling the temperature of a wavelength converting element to a constant value, a method for feeding back an output value to LD current, and the like have been proposed in consideration of such a problem. However, the method for controlling the temperature of a wavelength converting element requires that control of the temperature of the wavelength converting element be performed in 0.01° C. increments and is not a viable option due to cost and the like insofar as its use in commercially-available devices, and the method for feeding back an output value to LD current only amounted to a compensation of around 0.3° C. and was therefore not an effective improvement. In particular, when using a fiber laser light source with a wavelength selected by a fiber grating, since the wavelength characteristics of a wavelength converting element vary according to temperature and the wavelength characteristics of the fiber grating also vary according to temperature, output stabilization cannot be achieved even when performing conventional temperature constant-value control.

Furthermore, for the purpose of improving conversion efficiency from a fundamental wave laser light source prior to wavelength conversion to a green light output that is a second harmonic wave, a wavelength converting apparatus provided with two wavelength converting mechanisms is proposed in which a fundamental wave not converted by a first wavelength converting mechanism (first stage) is once again wavelength-converted by a second wavelength converting mechanism (second stage) (for convenience sake, such a configuration shall be referred to, for convenience, as a "two-state configuration"). This two-stage configuration is characterized in that a second harmonic wave output of the second stage fluctuates dependent on a second harmonic wave output of the first stage. As such, it is difficult to control a summed value of outputs of the first and second stages using a conventional output stabilization method. In particular, with a two-stage configuration, since the output fluctuations in a harmonic wave output of the first stage and a harmonic wave output of the second stage move opposite to each other in most cases, control using current value feedback to a laser diode or normal element temperature regulation is extremely difficult.

Patent Document 1: Japanese Patent Laid-Open No. H01-098282

Patent Document 2: Japanese Patent Laid-Open No. H02-253969

Patent Document 3: Japanese Patent Laid-Open No. 2004-103954

Patent Document 4: Japanese Patent Laid-Open No. 2004-356579

Patent Document 5: Japanese Patent Laid-Open No. 2005-311133

Patent Document 6: Japanese Patent No. 3329446

Patent Document 7: Japanese Patent No. 3334787

Patent Document 8: Japanese Patent No. 3526282

DISCLOSURE OF THE INVENTION

An object of the present invention is to provide a wavelength converting apparatus capable of stably obtaining green and blue W-class high-power laser output lights.

A wavelength converting apparatus according to an aspect of the present invention comprises: a laser resonator that oscillates an excitation light outputted from a laser light source and outputs a fundamental wave; a first wavelength converting element that converts a fundamental wave outputted from the laser resonator to a harmonic wave; a first temperature control element that controls the temperature of the first wavelength converting element; a second wavelength converting element that converts a fundamental wave outputted from the first wavelength converting element without being converted by the first wavelength converting element among the fundamental wave incident to the first wavelength converting element into a harmonic wave; a second temperature control element that controls the temperature of the second wavelength converting element; a first detecting portion that detects an output of a harmonic wave outputted from the first wavelength converting element; a second detecting portion that detects an output of a harmonic wave outputted from the second wavelength converting element; and a controller that manages temperature control of the first wavelength converting element by the first temperature control element, temperature control of the second wavelength converting element by the second temperature control element, and current value control of a driving current applied to the laser light source, wherein the controller sums a first detected value by the first detecting portion and a second detected value by the second detecting portion, and based on the summed value, performs temperature control of the first and second wavelength converting elements.

According to the wavelength converting apparatus described above, since temperature control of the first and second wavelength converting elements is performed based on a summed value of a first detected value by the first detecting portion and a second detected value by the second detecting portion, even when a fluctuation in the output of a harmonic wave from the second wavelength converting element occurs dependent on a fluctuation in the output of a harmonic wave from the first wavelength converting element, a fluctuation in the output of a summed value of the two harmonic waves can be effectively suppressed.

According to the present invention, a wavelength converting apparatus capable of stably obtaining green and blue W-class high-power laser output lights can be provided.

BRIEF DESCRIPTION OF THE DRAWINGS

FIG. 7B is a diagram showing contents of judging criteria used in step S204 in FIG. 7A;

FIG. 8 is a flowchart for explaining processing of subroutine A;

FIG. 9 is a flowchart for explaining processing of subroutine B;

FIGS. 20A to 20C are schematic diagrams showing output adjustment of various colors when light control is performed, in which FIG. 20A is a diagram showing a case where a limitation is imposed on red, FIG. 20B is a diagram showing a case where a limitation is imposed on green, and FIG. 20C is a diagram showing a case where a limitation is imposed on blue;

FIG. 24A is a schematic diagram of a holding portion according to the fifth embodiment of the present invention, FIG. 24B is a cross-sectional view taken along A-A' of FIG. 24A, and FIG. 24C is a cross-sectional view taken along B-B' of FIG. 24A;

BEST MODE FOR CARRYING OUT THE INVENTION

Figure 1:
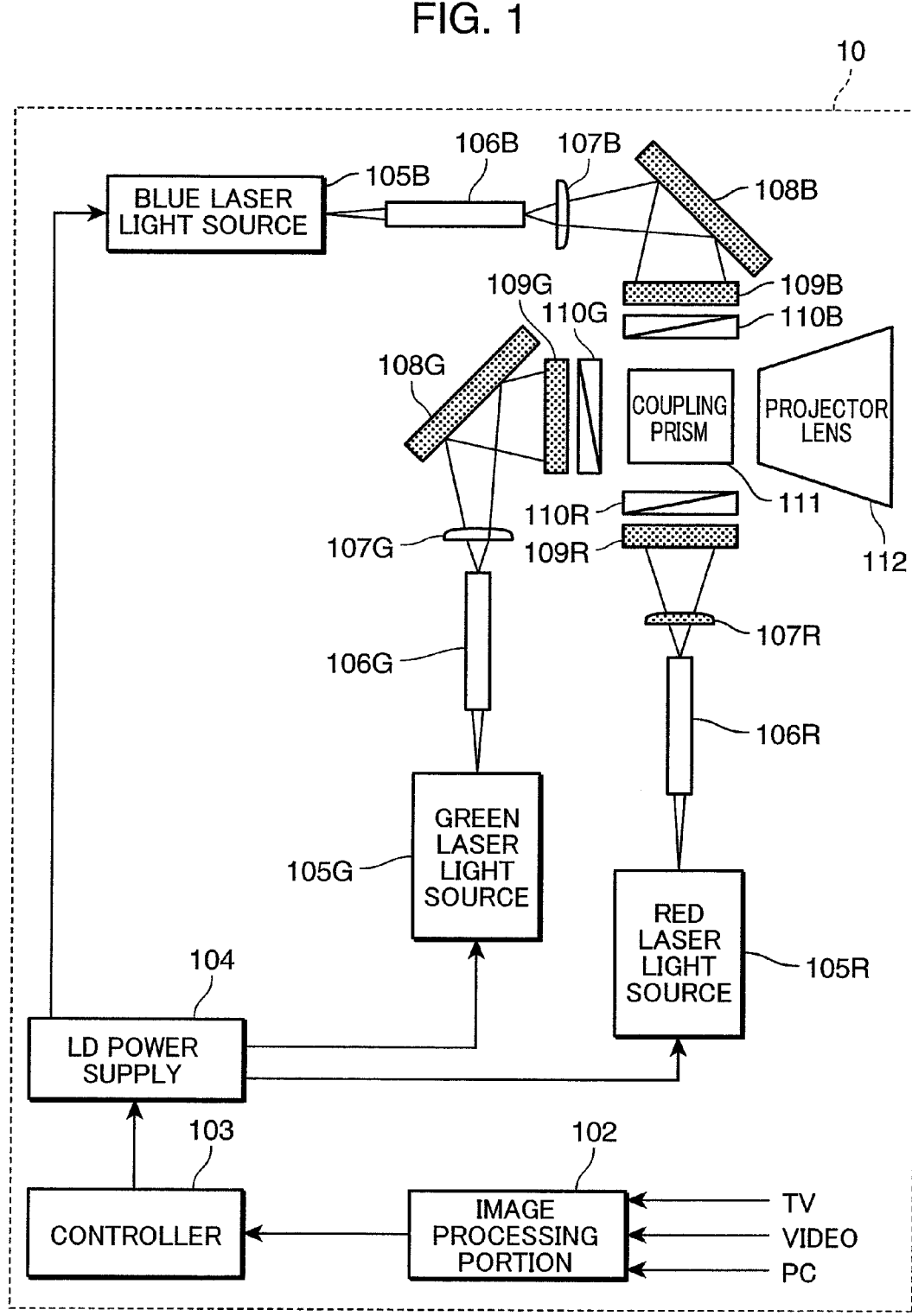
FIG. 1 is a diagram showing a configuration of a two-dimensional image displaying apparatus using a wavelength converting apparatus according to a first embodiment of the present invention.

Hereinafter, wavelength converting apparatuses and image displaying apparatuses according to embodiments of the present invention will be described with reference to the drawings. Note that descriptions on elements assigned the same reference characters in the drawings may be omitted.

First Embodiment

FIG. 1 is a schematic diagram showing a configuration of a two-dimensional image displaying apparatus using a wavelength converting apparatus according to a first embodiment of the present invention. As shown in FIG. 1, a two-dimensional image displaying apparatus 10 according to the present embodiment is an example of an application to an optical engine of a three-panel liquid crystal projector. The two-dimensional image displaying apparatus 10 according to the present embodiment comprises: an image processing portion 102; a laser output controller (controller) 103; an LD power supply 104; a red laser light source 105R; a green laser light source 105G; a blue laser light source 105B; beam-forming rod lenses 106R, 106G and 106B; relay lenses 107R, 107G and 107B; folding mirrors 108G and 108B; two-dimensional modulating elements 109R, 109G and 109B; polarizers 110R, 110G and 110B; a coupling prism 111; and a projector lens 112.

Figure 2:
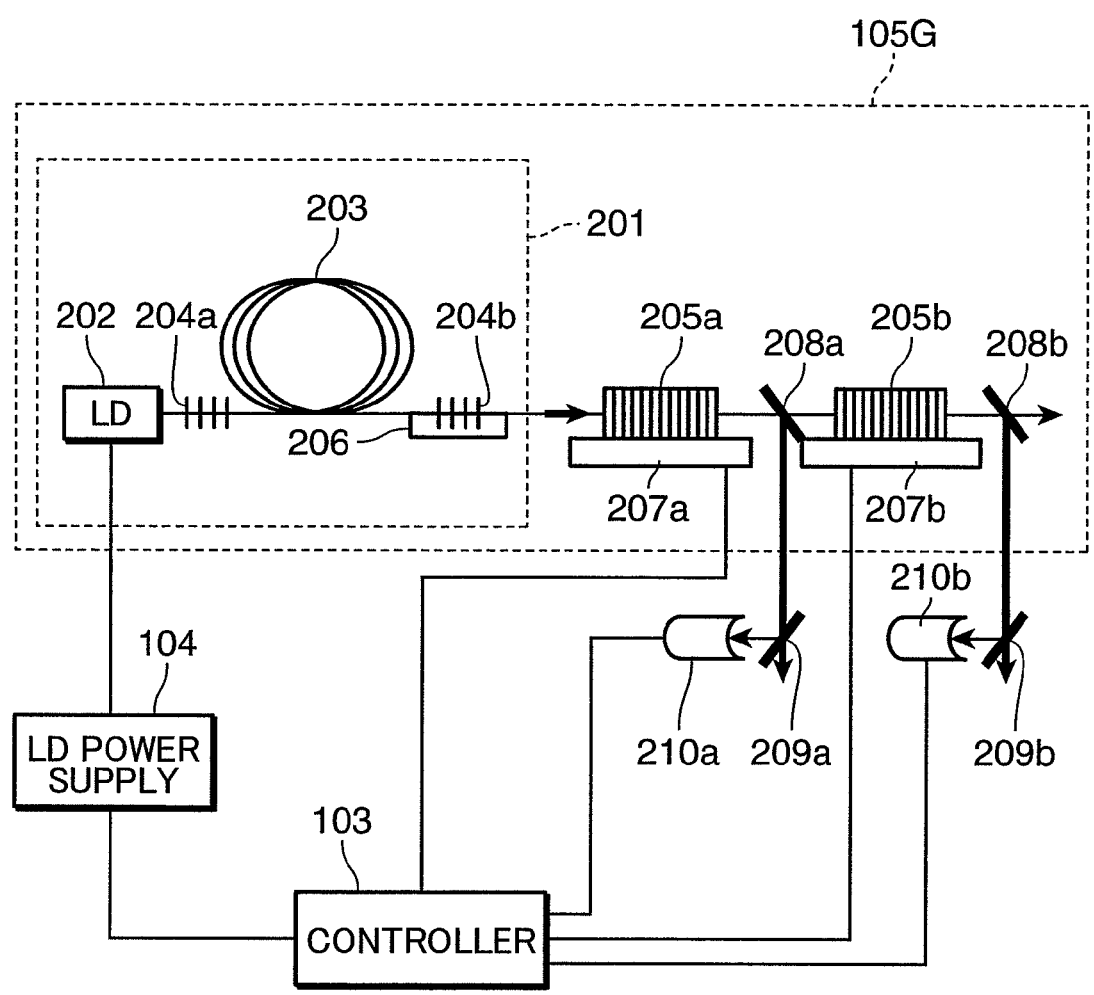
FIG. 2 is a diagram showing a configuration of a green laser light source.

In FIG. 1, the wavelength converting apparatus according to the present embodiment is applied to the green laser light source 105G of the two-dimensional image displaying apparatus 10. FIG. 2 shows a configuration of the green laser light source 105G.

In FIG. 2, the green laser light source 105G comprises: a fiber laser 201; wavelength converting elements 205a and 205b which reduce the wavelength of a fundamental wave laser light emitted from the fiber laser 201 in half; Peltier elements 207a and 207b which control the temperatures of the wavelength converting elements 205a and 205b; beam splitters 208a and 208b which separate green light generated by the wavelength converting elements 205a and 205b from remaining fundamental waves; beam samplers 209a and 209b for monitoring the green light generated by the wavelength converting elements 205a and 205b; and photodiodes 210a and 210b. The fiber laser 201 comprises: an excitation LD 202; fiber gratings 204a and 204b; a Yb fiber 203; and a holding portion 206 that holds the fiber grating 204b. Furthermore, the excitation LD 202 is connected to the LD power supply 104, while the Peltier elements 207a and 207b and the photodiodes 210a and 210b are connected to the controller 103 which controls the output of the green light source 105G.

The fiber laser 201 excites the Yb fiber 203 with excitation light (wavelength 915 nm) emitted from the excitation LD 202. The fiber gratings 204a and 204b are disposed on both ends of the Yb fiber 203, thereby constituting a laser resonator between the fiber gratings 204a and 204b. The fiber grating 204a has a reflection central wavelength of 1070 nm, a reflectance band of 1 nm, and a reflectance ratio of 98% or higher, while the fiber grating 204b has a reflection central wavelength of 1069.9 nm, a reflectance band of 0.1 nm, and a reflectance ratio of 10%. A fiber laser using Yb-added fiber has a wider operating range compared to a Nd fiber and the like, and is capable of generating laser light that ranges from 1030 to 1150 nm. Consequently, when used as a two-dimensional image displaying apparatus, high definition can be achieved by securing a wider color reproduction range.

Applying the narrow-band fiber grating 204b as one of the reflecting faces of the laser resonator of the fiber laser 201 enables selection of an arbitrary reflection central wavelength and therefore an arbitrary oscillation central wavelength. In addition, a fundamental wave with a wavelength band of 0.05 to 0.2 nm required by the wavelength converting elements 205a and 205b can be generated.

In the present embodiment, it is preferable to use a fiber grating formed as a polarization-maintaining fiber as the fiber gratings 204a and 204b and a polarization-maintaining double-clad fiber as the Yb fiber 203. In this case, the polarization direction of the oscillated fundamental wave can be controlled.

Additionally, in the present embodiment, by configuring a closed system in which the laser resonator of the fiber laser 210 is closed inside a fiber, damages to the resonator due to dust from the outside, a misalignment of the reflecting faces, and the like can be prevented from increasing. As a result, a reduction over time and fluctuations in laser resonator output can be suppressed.

Next, basic laser operations of the green laser light source 105G according to the present embodiment will be described. In FIG. 2, after propagating through the attached fiber, excitation light from the pigtail-type excitation LD 202 enters a fiber constituting the laser resonator. The incident excitation light propagates through the Yb fiber 203 while being absorbed by a laser active substance (Yb: ytterbium) contained in the Yb fiber 203. 90% or more of the excitation light is absorbed by the laser active substance and is lost before reaching the fiber grating 204b. In this manner, in the present embodiment, a seed light of the fundamental wave is generated inside the Yb fiber 203 in a state where the excitation light has been absorbed within the Yb fiber 203 and a gain that amplifies the fundamental wave has risen inside the Yb fiber 203. With the fiber grating 204a and the fiber grating 204b as a pair of reflecting faces of the laser resonator, the seed light of the fundamental wave repeatedly travels back and forth inside the laser resonator while being amplified and having its intensity increased until finally attaining laser oscillation.

As the Yb fiber 203 according to the present embodiment, for example, a double-clad polarization-maintaining fiber capable of propagating a high-power excitation light has been used. As such, the excitation light propagates across a relatively spacious region consisting of the core and the inner clad of the Yb fiber 203 to be absorbed by the laser active substance (ytterbium) contained in the Yb fiber 203. In addition, since the excitation light is able to propagate across a spacious region, a high-power excitation light can also be used.

In this manner, the fundamental wave outputted from the fiber laser 201 is guided to the wavelength converting element 205a.

Next, basic operations of the wavelength converting elements 205a and 205b will be described. As was shown above, a laser light of the fundamental wave is outputted by the fiber laser 201, collected by a collecting lens or the like, and enters the wavelength converting element 205a. The fundamental wave from the fiber laser 201 becomes an incident wave that is subsequently converted by a nonlinear optical effect of the wavelength converting element 205a into a harmonic wave output whose wavelength is half of that of the fundamental wave. A beam outputted from the wavelength converting element 205a is outputted in a state in which an unconverted fundamental wave and the converted harmonic wave output are mixed with each other.

The beam outputted from the wavelength converting element 205a once passes through a recollimating lens, and after returning to a parallel beam, enters the beam splitter 208a. The harmonic wave output converted by the wavelength converting element 205a is separated by the beam splitter 208a and is directed towards the beam sampler 209a. Meanwhile, the fundamental wave whose wavelength has not been converted passes through the beam splitter 208a as-is to be collected by a collecting lens and entered to the wavelength converting element 205b.

The fundamental wave not converted by the wavelength converting element 205a becomes an incident wave that is converted by a nonlinear optical effect of the wavelength converting element 205b into a harmonic wave output whose wavelength is half of that of the fundamental wave. A beam outputted from the wavelength converting element 205b is outputted in a state in which an unconverted fundamental wave and the converted harmonic wave output are mixed with each other.

The beam outputted from the wavelength converting element 205b once passes through a recollimating lens, and after returning to a parallel beam, enters the beam splitter 208b. The harmonic wave output converted by the wavelength converting element 205b is separated by the beam splitter 208b and heads towards the beam sampler 209b. Meanwhile, the fundamental wave whose wavelength was not converted passes through the beam splitter 208b as-is. The transmitted fundamental wave is absorbed by an absorber and discharged as heat. Almost all of the harmonic wave output, with the exception of that used for output light detection, is outputted as an output light from the green laser light source 105G. In the present embodiment, Mg-added $LiNbO_3$ crystals having a polarization-inverting structure are used as the wavelength converting elements 205a and 205b. The elements are 20 mm long and the temperatures thereof are respectively controlled by the Peltier elements 207a and 207b.

Figure 3A:
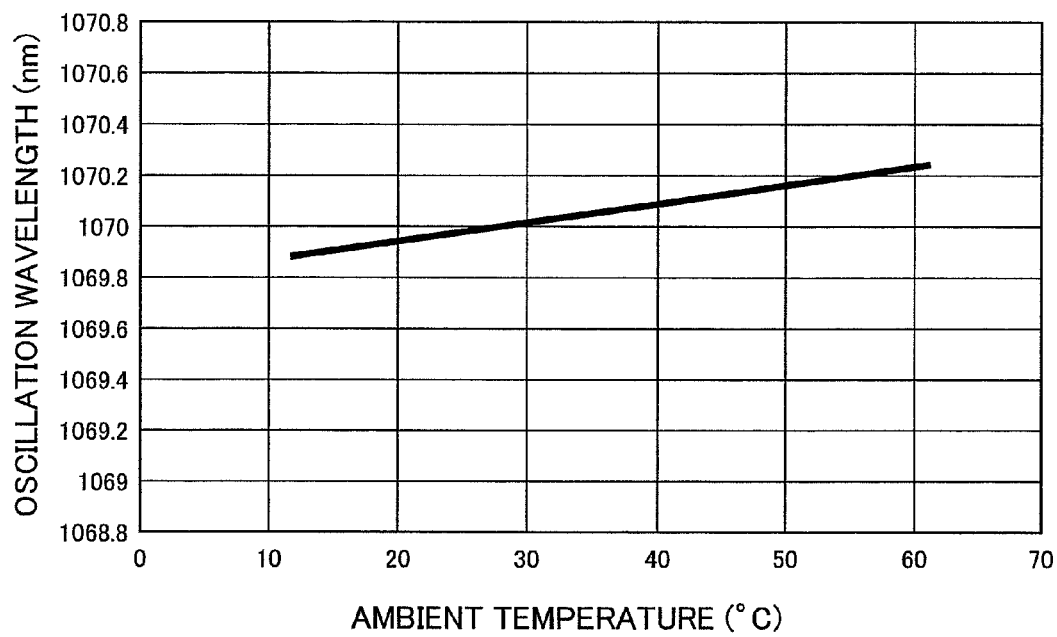
FIG. 3A is a diagram showing a relationship between ambient temperature and the oscillation wavelength of a fiber laser.

FIG. 3A shows a relationship between ambient temperature and the oscillation wavelength of the fiber laser 201. It is apparent from the diagram that the oscillation wavelength of the fiber laser 201 varies along with shifting of the reflectance band of the fiber grating constituting the resonator which occurs in accordance with the ambient temperature of the fiber laser 201. A variation of 0.007 nm/K is shown in FIG. 3A. In other words, harmonic wave output (green light output) cannot be stabilized unless the operating wavelengths (phase-matched wavelengths) of the wavelength converting elements 205a and 205b are varied with each variation in ambient temperature. This is a major difference from a solid-state laser light source for which an oscillation wavelength is determined by a laser crystal regardless of ambient temperature. In the present embodiment, the variation in the oscillation wavelength of the fiber laser 201 is preferably 0.002 nm/K or less. As described above, while the phase-matched wavelengths of the wavelength converting elements 205a and 205b must be varied with each variation in ambient temperature, the phase-matched wavelengths of the wavelength converting elements 205a and 205b can be effectively controlled as described later as long as the variation in the oscillation wavelength of the fiber laser 201 is 0.002 nm/K or less.

Figure 3B:
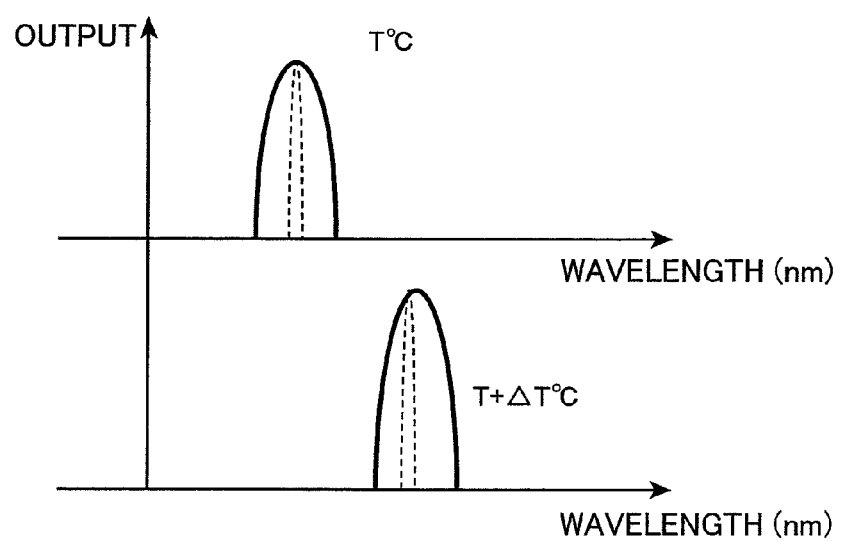
FIG. 3B is a diagram showing a relationship between the wavelength spectrum of a fundamental wave (wavy line) and the phase-matched wavelength spectrum of a wavelength converting element (solid line)

FIG. 3B shows a relationship between the wavelength of a fundamental wave of a fiber laser and the phase-matched wavelength of a wavelength converting element. The solid line in the drawing represents a bandwidth of a fundamental wave emitted from the fiber laser, while the dashed line in the drawing represents wavelength conversion characteristics of a wavelength converting element with respect to incident wavelength. As is apparent from FIG. 3B, the stabilization of an output from a wavelength converting element requires varying ambient temperatures of the fiber laser and the wavelength converting element so that both the fiber laser and the wavelength converting element attain the same wavelength characteristics. For example, constituting the holding portion 206 shown in FIG. 2 using aluminum results in an oscillation wavelength variation of the fiber laser 201 with respect to temperature of 0.03 nm/K and enables approximation to the phase-matched wavelength variation of 0.05 nm/K of the wavelength converting elements 205a and 205b. In addition, constituting the holding portion 206 using a substance having a coefficient of thermal expansion of $5 \times 10^{-6}/^\circ$ C., the temperature characteristics of the wavelength converting elements 205a and 205b and the temperature characteristics of the fiber laser 201 can be approximately matched to further simplify output stabilization control. While the present embodiment shows a case where the fiber grating 204b is fixed on top of the holding portion 206 made up of aluminum, a similar effect can be achieved when the fiber grating 204b is disposed midair as is conventional.

Figure 4:
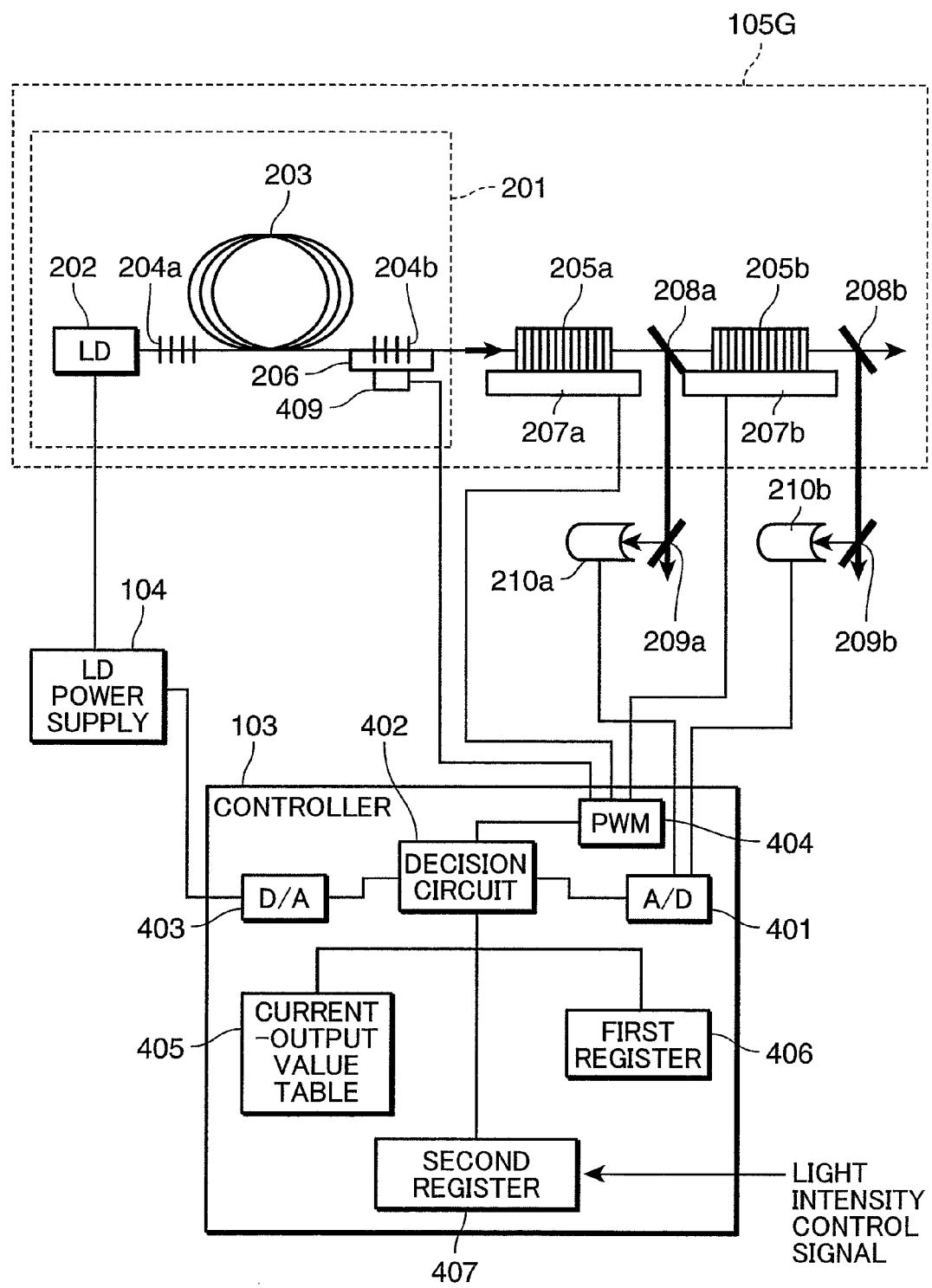
FIG. 4 is a diagram showing a configuration of a controller.

FIG. 4 shows a specific configuration of the controller 103 shown in FIG. 2. The controller 103 shown in FIG. 4 comprises: an A/D converter 401; a decision circuit 402; a D/A converter 403; a PWM signal generator 404; a current-output value table 405; a first register 406; and a second register 407. The controller 103 controls the temperatures of the wavelength converting elements 205a and 205b using the Peltier elements 207a and 207b. Moreover, while not indispensable, a thermistor 409 for measuring the temperature inside the chassis of the fiber laser 201 may be additionally provided. In this case, the thermistor 409 is provided at the holding portion 206 of the fiber grating 204b.

A relationship between a current value supplied to the excitation LD 202 and the output value of green light can be set in a table format in the current-output value table 405. These values are to be used as reference values when executing control. The first register 406 is used to temporarily store current values and output values to be used during control.

The output value of a green light to be outputted by the green laser light source 105G is determined according to a light intensity control signal that is an external signal. The second register 407 stores a factory default value of each part constituting the green laser light source 105G. The factory default values of the respective parts are values to be used for compensating manufacturing variations in the parts. Upon receiving a light intensity control signal, the second register 407 notifies a green light output value set by the light intensity control signal and the factory default values to the decision circuit 402. The decision circuit 402 is constituted by a microcomputer or the like, and references the current-output value table 405 to notify a current value corresponding to the output value notified by the second register to the LD power supply 104 via the D/A converter 403.

The photodiodes 210a and 210b receive green light partially reflected by the beam samplers 209a and 209b, and output an output detection signal that is a voltage signal depending on the magnitude of the received green light to the A/D converter 401. The A/D converter 401 converts the analog output detection signal to a digital output detection signal and outputs the same to the decision circuit 402. The decision circuit 402 controls the temperatures of the wavelength converting elements 205a and 205b in accordance with the output detection signal using the Peltier elements 207a and 207b.

Figure 5:
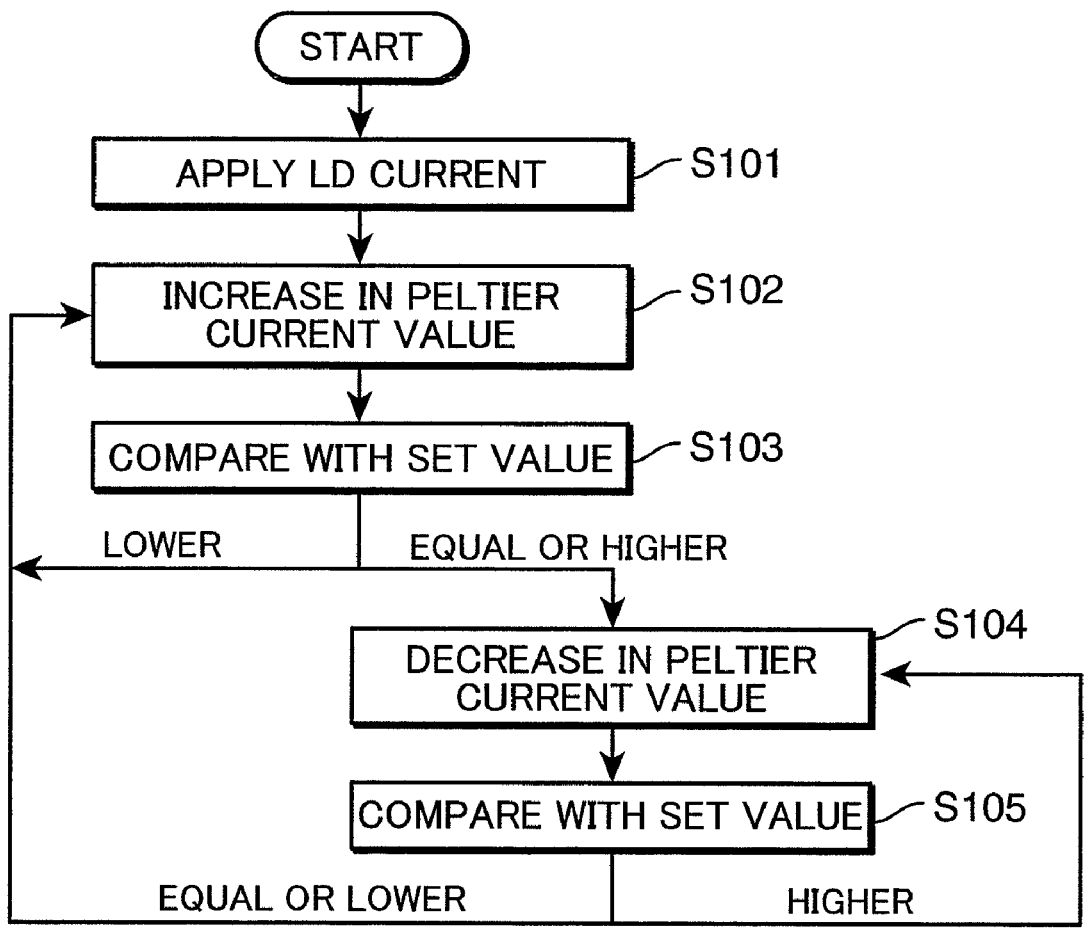
FIG. 5 is a flowchart showing a processing procedure of a start-up operation of a wavelength converting element.

Next, operations of the green light source 105G will be described. FIG. 5 is a flowchart showing a processing procedure of a start-up operation of the wavelength converting element 205a of the green laser light source 105G. Since a start-up operation of the wavelength converting element 205b is similar to that of the wavelength converting element 205a, a description on the start-up operation of the wavelength converting element 205b shall be omitted.

First, in step S101 of FIG. 5, as the operation of the green laser light source 105G commences, an LD current from the LD power supply 104 is applied to the excitation LD 202, whereby the excitation LD 202 enters a state in which green light can be outputted. At this point, the value of the LD current is set such that fundamental wave output is around 500 mW and, when phase-matching conditions are consistent, a green light of 20 mW can be outputted. In the case of the present embodiment, the value of the LD current is set to about 1 A. This is because setting a minute output for the green light makes outputting of a green light for start-up less conspicuous in the case of a two-dimensional image displaying apparatus. In doing so, it is important that the phase-matched temperature of the wavelength converting element 205a be designed so as to be higher than room temperature at 40 to 60° C.

Next, in step S102, since the Peltier element 207a is driven by a PWM (Pulse Width Modulation) waveform current until the green light output value reaches the set value, the decision circuit 402 monitors the green light output value while extending the period of time over which the current is supplied to the Peltier element 207a so as to raise element temperature. More specifically, in step S103, as long as the green light output value is lower than the set value, the period of time over which the current is supplied to the Peltier element 207a is extended.

Once the green light output value reaches and exceeds the set value, in step S104, the green light output value is monitored while reducing the period of time over which the current is supplied to the Peltier element 207a so as to lower element temperature. More specifically, in step S105, as long as the green light output value is higher than the set value, the period of time over which the current is supplied to the Peltier element 207a is reduced. Meanwhile, once the green light output value reaches and drops below the set value, the procedure returns to step S102.

A peak search of green light output is performed as described above. In addition, the current waveform (PWM waveform) supplied to the Peltier element 207a is proportionally-controlled such that the closer the green light output value to the set value, the longer an OFF time. Furthermore, in consideration of output stabilization, the frequency of the current waveform is desirably set around 5 to 100 MHz. Such a frequency enables temperature stabilization without having to perform smoothing on the current waveform. Furthermore, although there is a problem when the current waveform is smoothed in that response speed decreases as an ON time becomes shorter, temperature control can be performed without sacrificing response speed by directly driving with the PWM waveform.

As described above, by monitoring the green light, it is now possible to match the temperature of the wavelength converting element 205a with the phase-matched temperature. Once the green light output is stabilized, the current of the excitation LD 202 is cut off while maintaining the PWM waveform at the point where the green light output was stabilized so as to enter a stand-by state.

In the present embodiment, while the Peltier elements 207a and 207b are used as temperature control elements of the wavelength converting elements 205a and 205b, the element temperatures are desirably set to 35 to 80° C. When the element temperatures are set around room temperature (actual operating temperature), the polarity of the current to be applied to the Peltier elements 207a and 207b must be reversed. However, by setting the element temperatures higher than room temperature to 35 to 80° C., polarity reversal becomes unnecessary and an even greater control speed is achieved. Furthermore, while the greater the difference between room temperature and element temperature, the higher the control speed during element cooling, consumed power also increases in association therewith. Therefore, the temperature in which the elements are held is more desirably set so as to range from 40 to 60° C.

Meanwhile, by setting the holding temperature of the elements to 80 to 200° C., a more inexpensive heater can be used. The holding temperature rises in comparison to the case where a Peltier element is used because, while the control speed during a rise in temperature is substantially the same as that in the case of a Peltier element, the control speed during a drop in temperature is lower than that of a Peltier element and it is therefore required that the temperature gradient between ambient temperature and element temperature be increased.

As described earlier, in the present embodiment, the thermistor 409 may be added as an ambient temperature monitor. Hereinafter, a case where the thermistor 409 is added to the present embodiment will be described. As the operation of the green laser light source 105G commences, the thermistor 409 detects ambient temperature and an LD current from the LD power supply 104 is subsequently applied to the excitation LD 202, whereby the excitation LD 202 enters a state in which green light can be outputted. At this point, the value of the LD current is set such that fundamental wave output is around 500 mW and, when phase-matching conditions are consistent, a green light of 20 mW can be outputted. In the case of the present embodiment, the value of the LD current is set to about 1 A. This is because a minute output for the green light makes outputting of a green light for start-up less conspicuous in the case of a two-dimensional image displaying apparatus. At this point, cases can be divided into those in which the ambient temperature detected by the thermistor 409 is lower than the set value and those in which the ambient temperature detected by the thermistor 409 is higher.

When the ambient temperature is lower than the set value, since a current is supplied to the Peltier elements 207a and 207b which control the temperatures of the wavelength converting elements 205a and 205b and the Peltier elements 207a and 207b are driven by the PWM waveform current until the green light output value reaches the set value, the green light output value is monitored while extending the period of time over which the current is supplied to the Peltier elements 207a and 207b so as to raise element temperature. A peak search of green light output is performed in this manner. In addition, the current waveform (PWM waveform) supplied to the Peltier elements 207a and 207b is proportionally-controlled such that the closer the green light output value to the set value, the longer an OFF time.

On the other hand, when the ambient temperature is higher than the set value, the peak search can be concluded by reversing the polarity of the current to be supplied to the Peltier elements 207a and 207b and performing a similar operation. When the thermistor 409 is used, since it is possible to judge whether the element temperature should be lower or higher than the ambient temperature, the phase-matched temperature of the wavelength converting elements 205a and 205b need not be designed higher than room temperature to 40 to 60° C. In this case, since a circuit for polarization reversal becomes necessary, a decline in control speed may occur depending on the configuration of such a circuit.

Figure 6A:
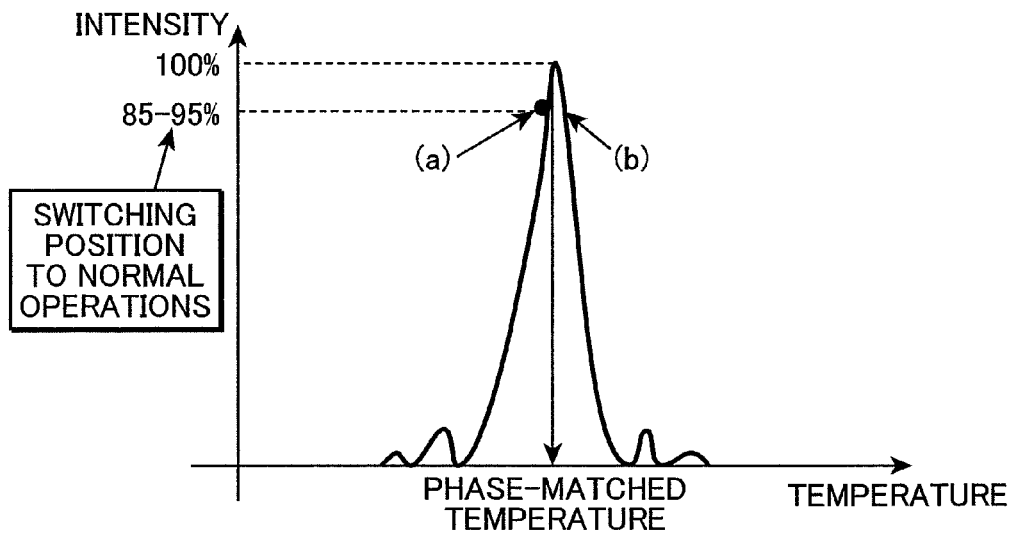
FIG. 6A is a diagram showing temperature characteristics and stand-by positions after a start-up operation of a wavelength converting element.

Next, temperature control of the wavelength converting elements 205a and 205b by a decision circuit 402 will be described. FIG. 6A is a diagram showing a relationship between temperature characteristics of the wavelength converting elements 205a and 205b and stand-by positions of the wavelength converting elements 205a and 205b after a start-up operation of the same. The stand-by temperature is controlled so as to be 85 to 95% of the phase-matched temperature at which harmonic wave intensity peaks and lower than the phase-matched temperature (refer to the position denoted by reference character (a) in the drawing). Standing by at this position enables ambient temperature during operation to be monitored. In other words, it is shown that the higher the output, the lower the ambient temperature and the lower the output, the higher the ambient temperature. Therefore, the temperatures of the wavelength converting elements 205a and 205b can be controlled based on the variation of this output value.

Figure 6B:
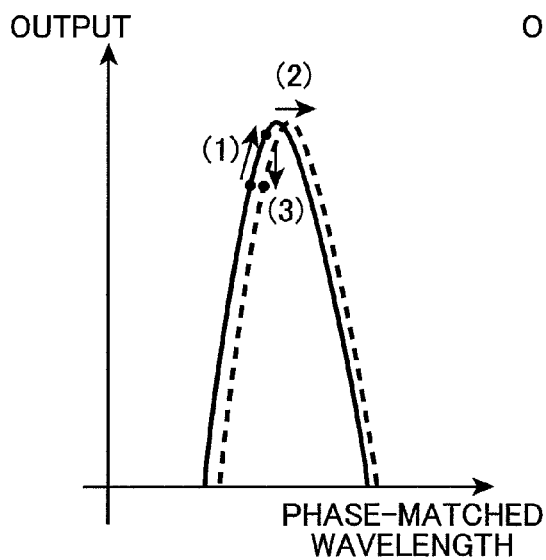
FIG. 6B is a diagram showing a relationship between temperature and phase-matched wavelength.
Figure 6C:
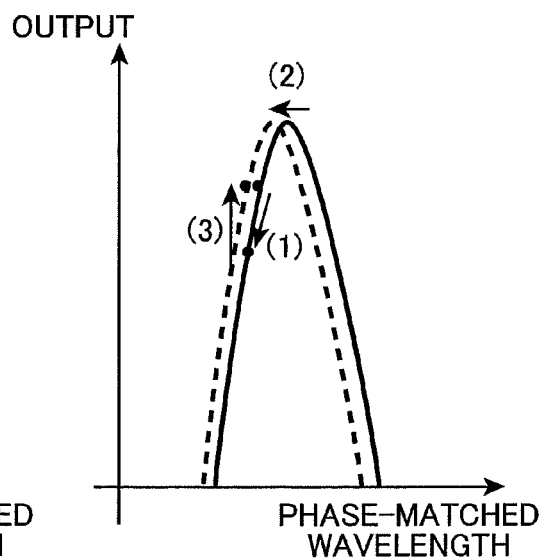
FIG. 6C is a diagram showing another relationship between temperature and phase-matched wavelength.

FIG. 6B shows a variation in phase-matched wavelength when the oscillation wavelength of the fiber laser 201 shifts towards longer wavelengths, while FIG. 6C shows a variation in phase-matched wavelength when the oscillation wavelength of the fiber laser 201 shifts towards shorter wavelengths. First, in FIG. 6B, as the wavelength of the fundamental wave from the fiber laser 201 shifts towards longer wavelengths when the temperatures of the wavelength converting elements 205a and 205b are controlled to the stand-by temperature as described above and green light is outputted at a stand-by position where the green light being outputted from the wavelength converting elements 205a and 205b is 85 to 95% of a peak output, green light output moves from the aforementioned stand-by position and rises as indicated by the arrow (1). At this point, when the temperatures of the wavelength converting elements 205a and 205b are raised, a characteristic curve of a phase-matched wavelength corresponding to the green light output changes from the solid line to the dashed line as indicated by the arrow (2) and shifts rightward in the diagram or, in other words, towards longer wavelengths. As a result of this shift, green light output can be restored as indicated by arrow (3).

Meanwhile, in FIG. 6C, as the wavelength of the fundamental wave from the fiber laser 201 shifts towards shorter wavelengths when green light is being outputted at the aforementioned stand-by position, green light output moves from the aforementioned stand-by position and drops as indicated by the arrow (1). At this point, when the temperatures of the wavelength converting elements 205a and 205b are lowered, a characteristic curve of a phase-matched wavelength corresponding to the green light output changes from the solid line to the dashed line as indicated by the arrow (2) and shifts leftward in the diagram or, in other words, towards shorter wavelengths. As a result of this shift, green light output can be restored as indicated by the arrow (3).

Figure 7A:
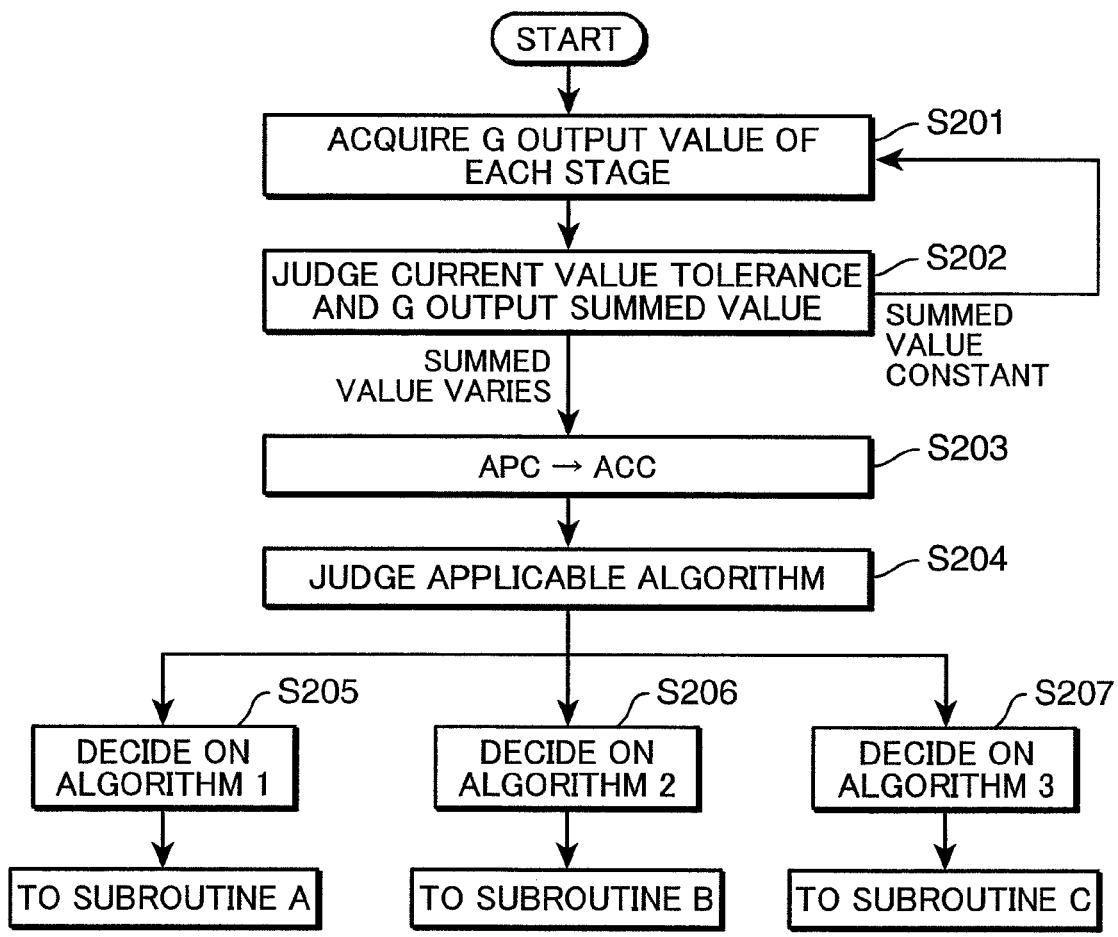
FIG. 7A is a flowchart showing a processing procedure of constant value control of green light output value.

Next, constant value control of the green light output value by the decision circuit 402 will be described. FIG. 7A is a flowchart showing a processing procedure of constant value control of the green light output value by the decision circuit 402. With the green laser light source 105G according to the present embodiment, control is performed so that a summed value of the intensities of harmonic wave light (green light) outputted from the respective stages (the wavelength converting elements 205a and 205b) becomes constant. In other words, control is performed so that the sum of the green light output from the first stage (wavelength converting element 205a) (hereinafter referred to as "G1") and the green light output from the second stage (wavelength converting element 205b) (hereinafter referred to as "G2"), or G1+G2, becomes constant.

Specifically, first, in step S201, the decision circuit 402 acquires green light output from each stage. Next, in step S202, the decision circuit 402 verifies that the current value of the LD power supply 104 is within a predetermined usable range and, at the same time, judges whether the summed value G1+G2 of the green light output has fluctuated or not. If the summed value G1+G2 of the green light output has not fluctuated, the decision circuit 402 returns processing to step S201. Moreover, with a minute fluctuation, the decision circuit 402 adjusts the driving current of the excitation LD 202 using the LD power supply 104 to adjust the intensity of the summed value G1+G2. Consequently, an APF control becomes operational in which the intensity of the summed value G1+G2 is kept constant.

On the other hand, in the case of a deviance from a range accommodatable by APC control, in step S203, a transition is made from APC control to ACC (automatic current control) control so as to apply a control loop which ensures that the summed value G1+G2 becomes constant. After making this judgment, in step S204, a judgment is made according to an algorithm (subroutine) applied based on the green light output value acquired from each stage.

FIG. 7B shows judging criteria used in step S204. Firstly, when G1 increases while G2 decreases, the fluctuation in the summed value G1+G2 is conceivably caused by a decline in the element temperature of the first stage. Conversely, when G1 decreases while G2 increases, the conceivable cause is either a rise in the element temperature of only the first stage or heating of the element due to light absorption. When G1 increases while G2 remains constant, the conceivable cause is a decline in the element temperature of the first stage, combined with a rise in the element temperature of the second stage. Conversely, when G1 declines while G2 remains constant, the conceivable cause is a rise in the element temperature of the first stage, combined with a decline in the element temperature of the second stage. In the above cases, since it is necessary to correct the element temperature of the first stage and the element temperature of the second stage in opposite directions to each other, a subroutine A in an algorithm 1 is executed in order to keep the summed value G1+G2 constant.

When both G1 and G2 rise or decline, the fluctuation in the summed value G1+G2 is conceivably caused either by a variation in ambient temperature or by a variation in the wavelength of the fundamental wave laser of the fiber laser 201. In this case, since it is necessary to correct the element temperature of the first stage and the element temperature of the second stage in the same direction, a subroutine B in an algorithm 2 is executed in order to keep the summed value G1+G2 constant.

When G1 remains constant while only G2 fluctuates, the fluctuation in the summed value G1+G2 is conceivably caused by a fluctuation in the element temperature of the second stage. In this case, since only correcting the element temperature of the second stage shall suffice, a subroutine C in an algorithm 3 is executed in order to keep the summed value G1+G2 constant.

The processing of the subroutines A to C in the respective algorithms 1 to 3 will now be described. FIG. 8 is a flowchart for explaining processing of the subroutine A of the algorithm 1. The subroutine A of the algorithm 1 is a routine in a case where an increase/decrease in the first stage output value and an increase/decrease in the second stage output value are oriented opposite to each other. Accordingly, temperature regulation of the wavelength converting elements 205a and 205b is performed while individually verifying the respective output values G1 and G2 of the first and second stages.

In FIG. 8, firstly, the amount of current flowing through the Peltier element 207a of the wavelength converting element 205a is controlled depending on whether the value of G1 is rising or declining. More specifically, an average amount of current is raised or lowered by manipulating a waveform (ON/OFF time) of the PWM signal generator 404. In other words, when the G1 value is rising (step S303), the amount of current to the first stage Peltier element 207a is increased to heat the wavelength converting element 205a. On the other hand, when the G1 value is declining (step S301), the amount of current to the first stage Peltier element 207a is reduced to cool the wavelength converting element 205a. Since an overshoot occurs when element temperatures fluctuate in steps S301 and S303 described above, in steps S302 and S304, output fluctuation is suppressed by feeding back G1 output to the current value to the excitation LD 202.

Next, in step S305, a judgment is made on whether the summed value G1+G2 has recovered or not. If the summed value G1+G2 has recovered, the procedure returns to the main routine shown in FIG. 7A, and if not, element temperature control is performed for the second stage.

In the control of the element temperature of the second stage, the amount of current flowing through the Peltier element 207b of the second stage is controlled depending on whether the summed value G1+G2 is greater or smaller than the value to be recovered. When the summed value is greater than the value to be recovered (step S308), the amount of current to the second stage Peltier element 207b is increased to heat the wavelength converting element 205b. On the other hand, when the summed value is smaller than the value to be recovered (step S306), the amount of current to the second stage Peltier element 207b is reduced to cool the wavelength converting element 205b. Since an overshoot occurs when element temperatures fluctuate in steps S306 and S308 described above, in steps S307 and S309, output fluctuation is suppressed by feeding back the summed value G1+G2 to the current value to the excitation LD 202.

Finally, in step S310, a comparison is made between a current value to the excitation LD 202 corresponding to the summed value G1+G2 after executing the subroutine A and an initial current value during start-up of the green laser light source 105G. When the difference therebetween falls within a preset range, the procedure returns to the main routine, while when the difference therebetween does not fall within the preset range, the subroutine A of the algorithm 1 is once again executed.

FIG. 9 is a flowchart for explaining processing of the subroutine B of the algorithm 2. The subroutine B of the algorithm 2 is a routine in a case where an increase/decrease in the first stage output value and an increase/decrease in the second stage output value are similarly oriented. Accordingly, temperature regulation of the wavelength converting elements 205a and 205b is performed in the same direction (raise/lower temperature) on the respective output values G1 and G2 of the first and second stages.

In FIG. 9, firstly, the amount of current flowing through the Peltier elements 207a and 207b of the first and second stages is controlled depending on whether the values of G1 and G2 are both increasing or decreasing. When G1 and G2 are both rising, in step S405, the amount of current to the first stage Peltier element 207a is increased to heat the wavelength converting element 205a. Since an overshoot occurs when the element temperature fluctuates in step S405, in step S406, output fluctuation is suppressed by feeding back G1 output to the current value to the excitation LD 202.

Next, in step S407, the amount of current to the second stage Peltier element 207b is increased to heat the wavelength converting element 205b. Since an overshoot occurs when the element temperature fluctuates in step S407, in step S408, output fluctuation is suppressed by feeding back G2 output to the current value to the excitation LD 202.

On the other hand, when G1 and G2 are both declining, in step S401, the amount of current to the first stage Peltier element 207a is reduced to cool the wavelength converting element 205a. Since an overshoot occurs when the element temperature fluctuates in step S401, in step S402, output fluctuation is suppressed by feeding back G1 output to the current value to the excitation LD 202.

Next, in step S403, the amount of current to the second stage Peltier element 207b is reduced to cool the wavelength converting element 205b. Since an overshoot occurs when the element temperature fluctuates in step S403, in step S404, output fluctuation is suppressed by feeding back G2 output to the current value to the excitation LD 202.

Finally, in step S409, a comparison is made between a current value to the excitation LD 202 corresponding to the summed value G1+G2 after executing the subroutine B and an initial current value during start-up of the green laser light source 105G. When the difference therebetween falls within a preset range, the procedure returns to the main routine, while when the difference therebetween does not fall within the preset range, the subroutine B of the algorithm 2 is once again executed.

Figure 10:
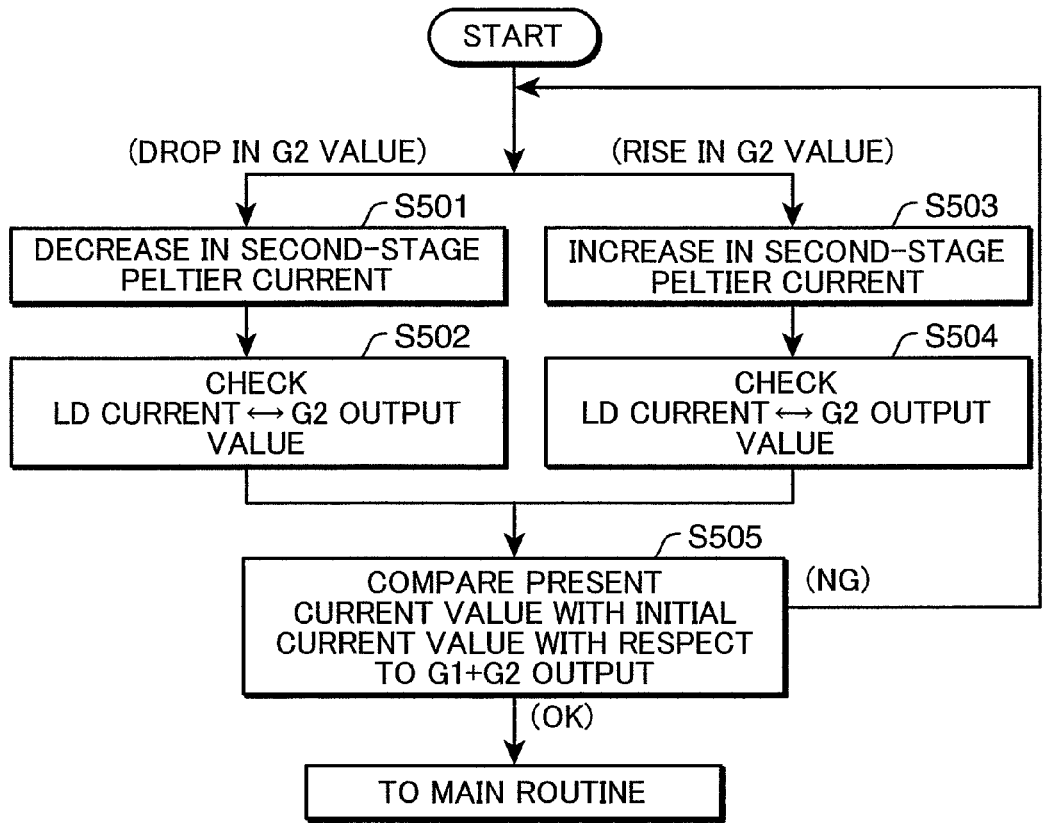
FIG. 10 is a flowchart for explaining processing of subroutine C.

FIG. 10 is a flowchart for explaining processing of the subroutine C of the algorithm 3. The subroutine C of the algorithm 3 is a routine in a case where only the temperature of the second stage is corrected in order to accommodate output fluctuation.

In FIG. 10, firstly, when the G2 value is rising, in step S503, the amount of current to the second stage Peltier element 207b is increased to heat the wavelength converting element 205b. On the other hand, when the G2 value is declining, in step S501, the amount of current to the second stage Peltier element 207b is reduced to cool the wavelength converting element 205b. Since an overshoot occurs when element temperatures fluctuate in steps S501 and S503 described above, in steps S502 and S504, output fluctuation is suppressed by feeding back G2 output to the current value to the excitation LD 202.

Next, in step S505, a comparison is made between a current value to the excitation LD 202 corresponding to the summed value G1+G2 after executing the subroutine C and an initial current value during start-up of the green laser light source 105G. When the difference therebetween falls within a preset range, the procedure returns to the main routine, while when the difference therebetween does not fall within the preset range, the subroutine C of the algorithm 3 is once again executed.

In the processing of the subroutines A to C of the respective algorithms 1 to 3 described above, control is performed so that the stand-by temperatures of the wavelength converting elements 205a and 205b are 85 to 95% of a phase-matched temperature at which harmonic wave intensity peaks and, at the same time, lower than the phase-matched temperature (the position denoted by reference character (a) in FIG. 6A). However, there may be cases where a rapid temperature change of the wavelength converting elements 205a and 205b causes the temperatures of the wavelength converting elements 205a and 205b to clear the peak and reach the position denoted by reference character (b) in FIG. 6A, thereby deviating from the stand-by position after the start-up operation. In this case, an over-the-peak return operation is performed in the present embodiment. An over-the-peak return operation should be executed when, for example, in steps S310, S409 and S505 of the aforementioned subroutines A to C, the difference between the current value to the excitation LD 202 corresponding to the summed value G1+G2 and the initial current value during start-up of the green laser light source 105G does not fall within a preset range even if the respective subroutines A to C are executed a predetermined N-number of times.

Figure 11:
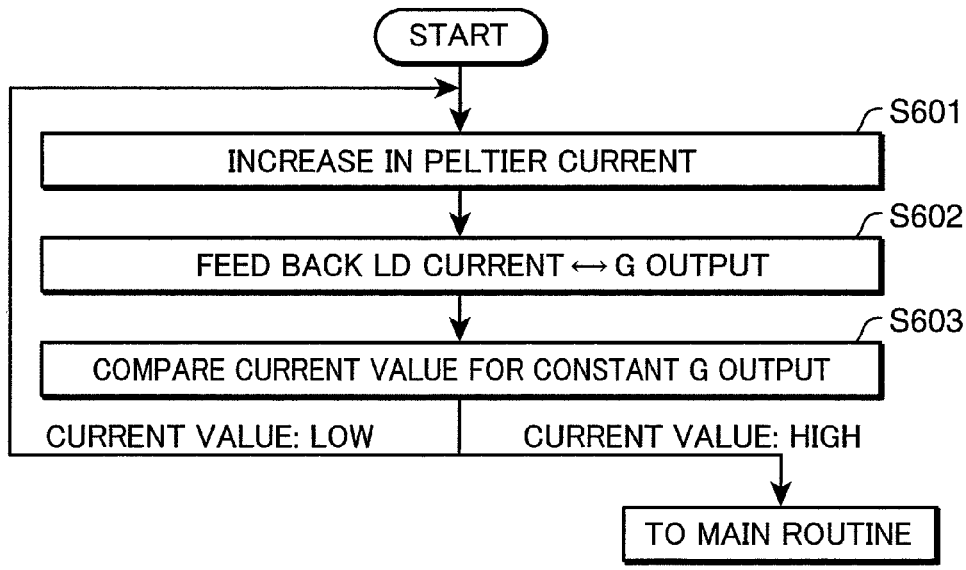
FIG. 11 is a flowchart for explaining processing of an over-the-peak return operation.

FIG. 11 is a flowchart for explaining processing of an over-the-peak return operation. In an over-the-peak return operation, the respective Peltier currents of the wavelength converting elements 205a and 205b are increased (step S601), and while feeding back the summed value G1+G2 to the current value to the excitation LD 202 in order to avoid an overshoot (step S602), the current value to the excitation LD 202 corresponding to the summed value G1+G2 is compared with the initial current value during start-up of the green laser light source 105G (step S603). If the current value is lower, the peak is gradually surmounted by returning to step S601, and once the current value rises, processing migrates over to the main routine shown in FIG. 7A to conclude the over-the-peak return operation to the stand-by position.

Figure 12:
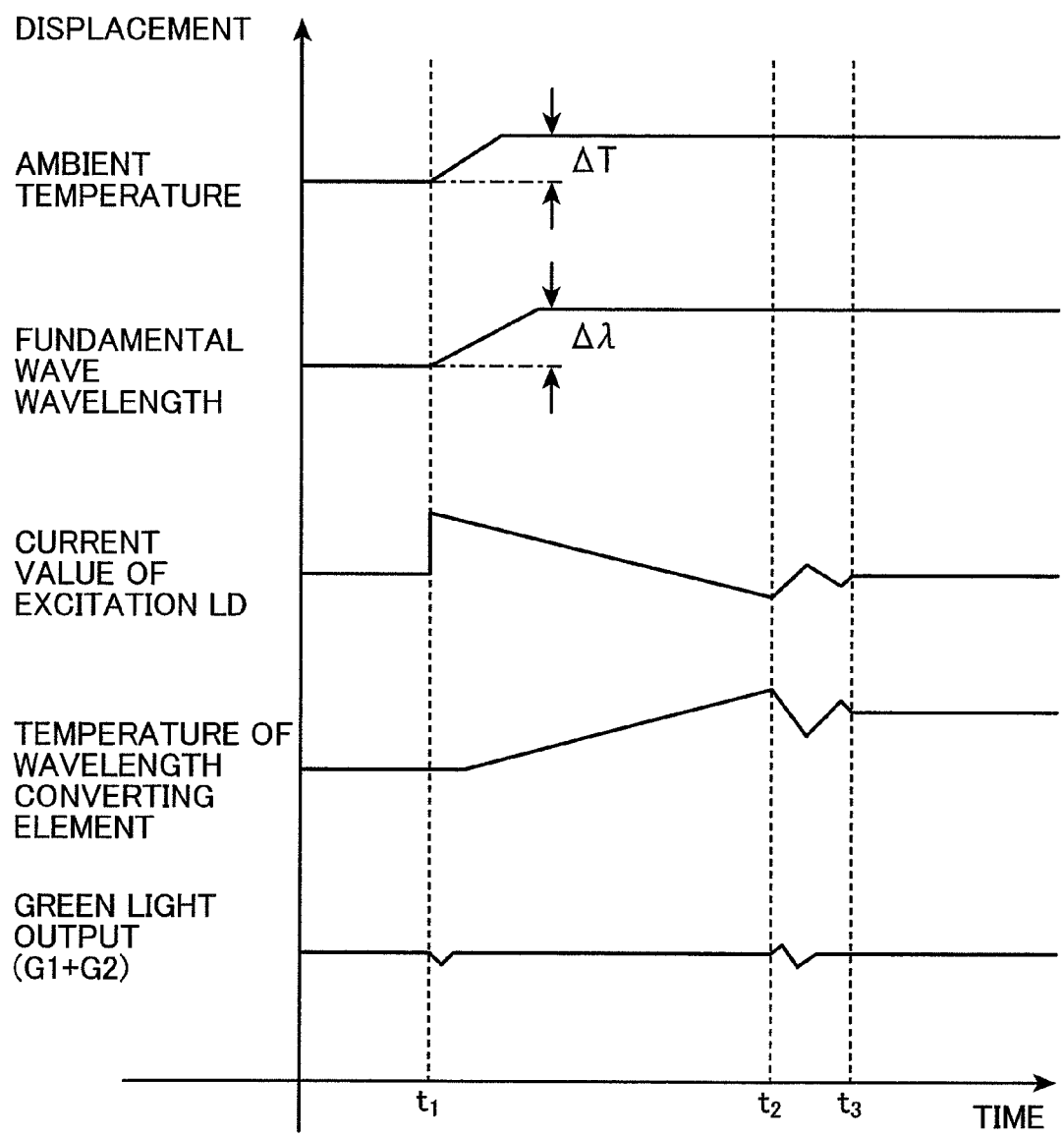
FIG. 12 is a diagram showing, as a temporal sequence, respective values in a case where green light output declines.

FIG. 12 is a diagram showing, as a temporal sequence, respective values in a case where ambient temperature rises while green light output declines as an example of control performed using a routine for output constant value control as shown in the present embodiment. In FIG. 12, when ambient temperature varies at time t1, in association therewith, the fundamental wave wavelength shifts towards longer wavelengths due to a variation in the fiber grating 204b of the fiber laser 201. Since it is difficult to have the temperatures of the wavelength converting elements 205a and 205b follow the variation in fundamental wave wavelength at high speed, the current to the excitation LD 202 is temporarily increased at time t1 to keep green light output constant. In accordance with the rise in the temperatures of the wavelength converting elements 205a and 205b, the current value to the excitation LD 202 is returned to a steady-state value. Since the temperatures of the wavelength converting elements 205a and 205b may overshoot in the vicinity of time t2, green light output can be kept constant even in this case by temporarily manipulating the current value to the excitation LD 202.

According to the present embodiment, since it is no longer necessary to monitor element temperature with an accuracy of 0.01° C. and frequently acquire temperature as was the case with conventional configurations, a control circuit and a control program can be simplified. In addition, depending on how the vicinity of wavelength converting elements is thermally designed, a "runaway effect" in which a deviation from constant value control occurs can be prevented. Furthermore, since green light output is used as a temperature indicator in the present embodiment, it is now possible to perform temperature control at higher accuracy, and by reciprocally monitoring green light output and the current supplied to an excitation LD, constant value control of green light output can be performed while causing hardly any green light output fluctuations.

In particular, the present embodiment is effective with respect to a wavelength converting apparatus which uses, as a fundamental wave, a laser light from a fiber laser whose oscillation wavelength has been determined by a fiber grating.

While a green light source using a Yb fiber laser as a fundamental wave light source and which is obtained through the use of a wavelength converting element has been described in the present embodiment, visible light ranging from around 480 to 600 nm can be stabilized using a similar configuration by a light source for which a fundamental wave light source wavelength has been similarly determined by fiber grating and which uses a MgO:LiNbO$_3$ element having a polarization-inverting structure as a wavelength converting element.

Second Embodiment

Next, a second embodiment of the present invention will be described. The present embodiment is an embodiment of a case using, as a wavelength converting element, a LiNbO$_3$ crystal or a LiTaO$_3$ crystal containing at least any of Mg, In, Zn, and Sc as an additive and which generates green light exceeding 1 W.

Figure 13:
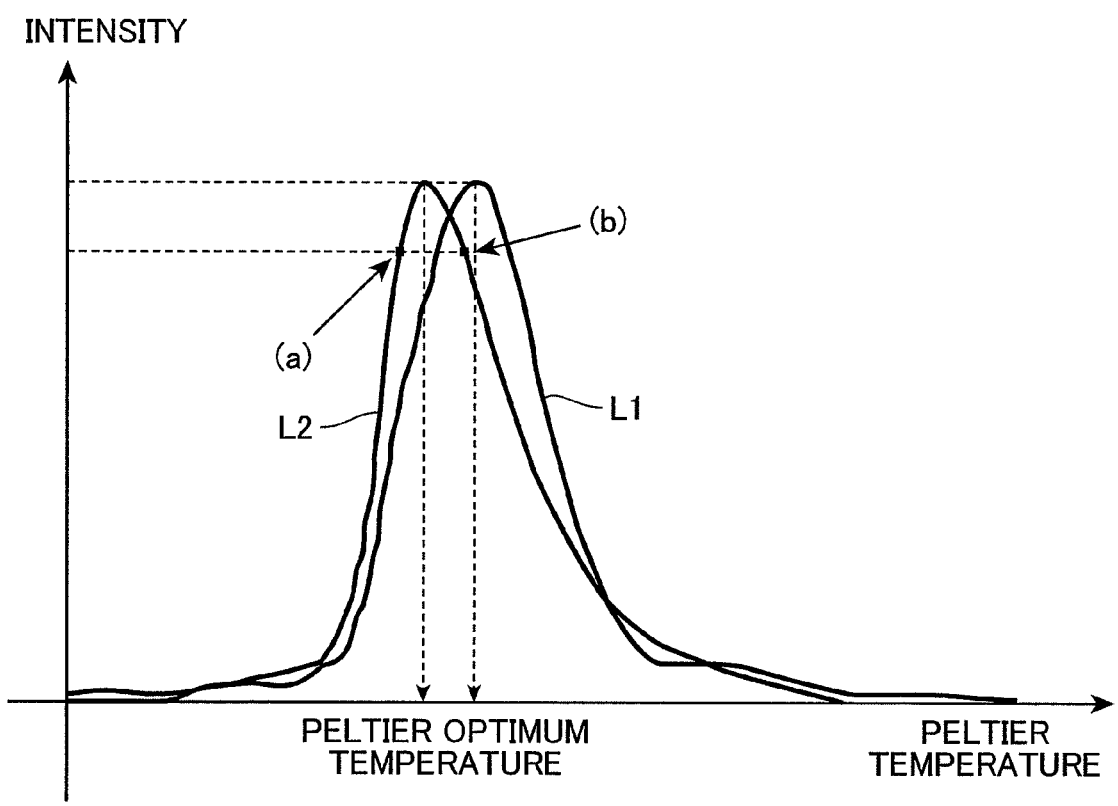
FIG. 13 is a diagram showing the temperature characteristics of a wavelength converting element and stand-by positions of the wavelength converting element after a start-up operation of the same according to a second embodiment of the present invention.

A study conducted by the present inventors has confirmed that, when using, as a wavelength converting element, a $LiNbO_3$ crystal or a $LiTaO_3$ crystal containing at least any of Mg, In, Zn, and Sc as an additive and generating green light in excess of 1 W, the relationship between the element temperature of a wavelength converting element and the intensity of a generated harmonic wave differs from the relationship shown in FIG. 6A described above. FIG. 13 is a diagram showing temperature characteristics of a wavelength converting element and stand-by positions of the wavelength converting element after a start-up operation of the same according to the present embodiment.

As shown in FIG. 13, during the conversion of a low-output wavelength of around several mW, the temperature characteristics L1 of a wavelength converting element in the vicinity of a phase-matched temperature includes a higher temperature-side and a lower temperature-side of the phase-matched temperature which are symmetrical with respect to the phase-matched temperature in a manner similar to FIG. 6A described above. However, when using the aforementioned nonlinear optical crystal as a wavelength converting element and obtaining a green light in excess of 1 W from infrared light, green light absorption occurs due to ultraviolet light generated as a sum frequency of the infrared light and the green light, resulting in heat generation within a beam path. Consequently, a temperature difference occurs between the temperature of the beam path and the temperature of a Peltier element (heater) to be used for element temperature control, and the temperature of the Peltier element (heater) with maximum harmonic wave intensity shift towards the lower temperature-side. Furthermore, the greater the generated green light output, the greater the amount of shift towards the lower temperature-side. Therefore, for example, when using MgO: $LiNbO_3$ as a wavelength converting element and setting element length to 25 mm, the temperature characteristic L2 of the wavelength converting element during conversion of a high-power wavelength at a green maximum output of 2 W, the gradient on a higher temperature-side of a Peltier optimum temperature becomes more moderate than the gradient on a lower temperature-side. At this point, by standing-by at a position (b) on the higher temperature-side of the Peltier optimum temperature, output fluctuations with respect to temperature variation can be reduced by approximately 64% as compared to a case of standing-by at a position (a) on the lower temperature-side.

As shown above, in the first embodiment described above, when a $LiNbO_3$ crystal or a $LiTaO_3$ crystal containing at least any of Mg, In, Zn, and Sc as an additive is used as a wavelength converting element and a green light exceeding 1 W is generated, the control of the first embodiment described above is preferably performed on the higher temperature-side of the Peltier optimum temperature. However, it is needless to say that by changing the stand-by position from a position (a) on the lower temperature-side of the phase-matched temperature to a position (b) on the higher temperature-side of the same, the increase/decrease in the amount of current flowing through the Peltier element becomes opposite to that of the aforementioned first embodiment.

Furthermore, in the present embodiment, while the effects of the present invention have been presented with respect to a conversion of a fundamental wave that is infrared light to green light that is a second harmonic wave, generally, it is known that ultraviolet light with a wavelength of 400 nm or less causes a $LiNbO_3$ crystal or a $LiTaO_3$ crystal with Mg, Zn, Sc, In or the like added thereto to absorb visible light whose wavelength ranges from 400 to 800 nm. That is, when entering a fundamental wave with a wavelength of 800 to 1200 nm to generate a second harmonic wave thereof, a third harmonic wave generated as a sum frequency of the fundamental wave and the second harmonic wave causes absorption of the second harmonic wave. In addition, when entering a fundamental wave with a wavelength of 400 to 800 nm to generate a second harmonic wave thereof, the second harmonic wave causes absorption of the fundamental wave. Furthermore, when entering a fundamental wave with a wavelength of 1200 to 1600 nm to generate a second harmonic wave thereof, since a fourth harmonic wave wavelength-converted from the second harmonic wave causes absorption of the second harmonic wave, the effects of the present invention are similarly achieved. Moreover, when entering a fundamental wave with a wavelength of 1200 to 2000 nm to generate a fourth harmonic wave thereof, a fifth harmonic wave generated as a sum frequency of the fundamental wave and the fourth harmonic wave causes absorption of the fourth harmonic wave, and similarly, when entering a fundamental wave with a wavelength of 1200 to 2000 nm to generate both a second harmonic wave and a third harmonic wave thereof, a fifth harmonic wave generated as a sum frequency of the second harmonic wave and the third harmonic wave causes absorption of the third harmonic wave. Therefore, it is obvious that the effects of the present invention are achieved in these cases as well.

In addition, besides the cases described above, adding Er or Nd to an $LiNbO_3$ crystal enables the absorption rate of green light to be elevated even when the amount of generated ultraviolet light is small, thereby achieving the effects of the present invention. In other words, when entering a fundamental wave and converting the same into a harmonic wave thereof, control is desirably performed on the higher temperature-side of the phase-matched temperature in all cases where the absorption rate of the harmonic wave is greater than the absorption rate of the fundamental wave. Furthermore, when the absorption rate of the fundamental wave is greater than the absorption rate of the harmonic wave, it is needless to say that control is desirably performed on the lower temperature-side of the Peltier optimum temperature. Moreover, the above is also effective in a wavelength converting apparatus with a single-stage configuration in which there is only one wavelength converting element.

Third Embodiment

Figure 14:
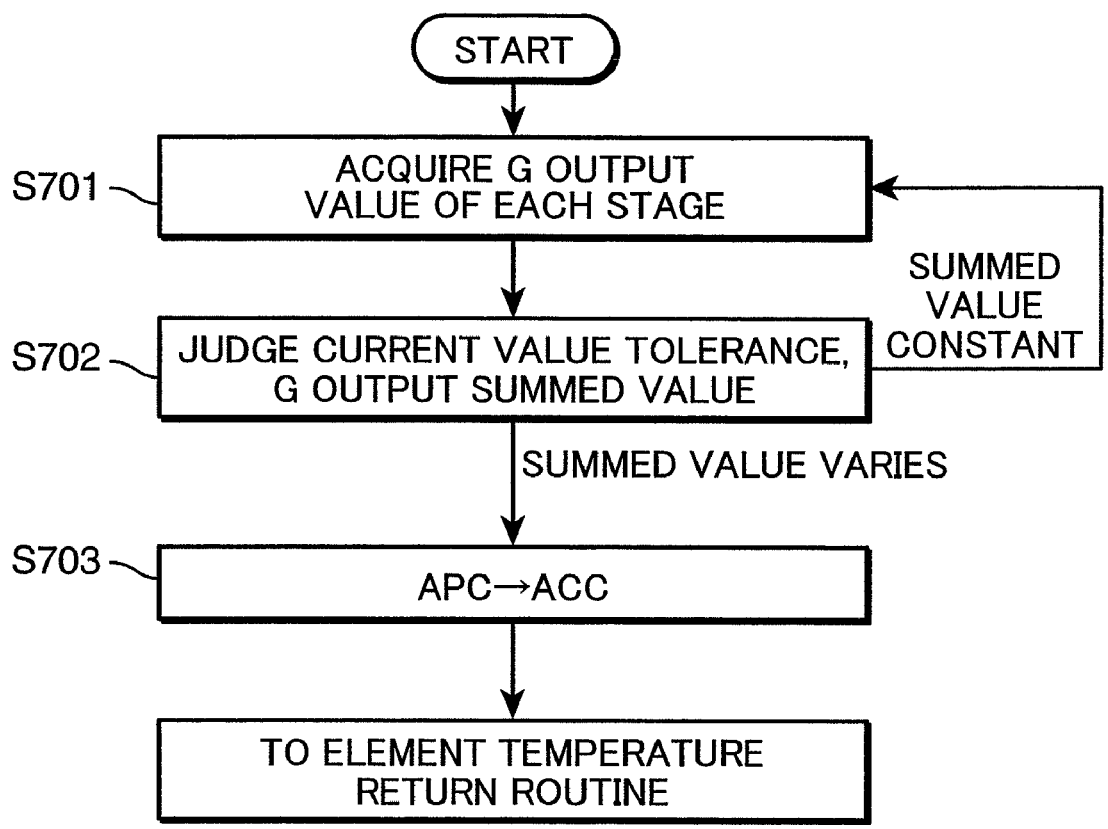
FIG. 14 is a flowchart showing a processing procedure of constant value control of a green light output value.

Next, a third embodiment of the present invention will be described. FIG. 14 is a flowchart showing a processing procedure of another constant value control of the green light output value by the decision circuit 402. In the present embodiment, the wavelength converting apparatus shown in FIG. 4 is used and a phase-matched temperature is set higher than room temperature in the same manner as the first embodiment described earlier.

First, as a start-up operation of the green laser light source 105G, a driving current from the LD power supply 104 and the amount of Peltier current from the PWM signal generator 404 are both set to maximum. The rapid increase in the amount of Peltier current is used to quickly heat the wavelength converting elements 205a and 205b. The wavelength converting elements 205a and 205b are quickly heated in order to shorten the start-up time of the two-dimensional image displaying apparatus shown in FIG. 1. After verifying that the values of G1 and G2 exceed a preset threshold, the start-up operation is concluded. In this case, the threshold output is desirably set to 20 to 80% of a desired green output.

After the start-up operation is concluded, the main routine shown in FIG. 14 is executed as a normal operation. As shown in FIG. 14, in step S701, the decision circuit 402 acquires a green light output of each stage. In step S702, the decision circuit 402 verifies that the current value of the LD power supply 104 is within a predetermined usable range and, at the same time, judges whether the summed value G1+G2 of the green light output has fluctuated or not. If the summed value G1+G2 of the green light output has not fluctuated, APC control is performed on the driving current of the excitation LD 202 while the Peltier current amount is continuously subjected to constant value control.

On the other hand, in the case of a deviance from a range accommodatable by APC control, in step S703, a transition is made from APC control to ACC control and processing proceeds to an element temperature return routine. In the element temperature return routine, the following operations are performed first on G1 and then on G2 in order to return to the phase-matched temperature.

Figure 15C:
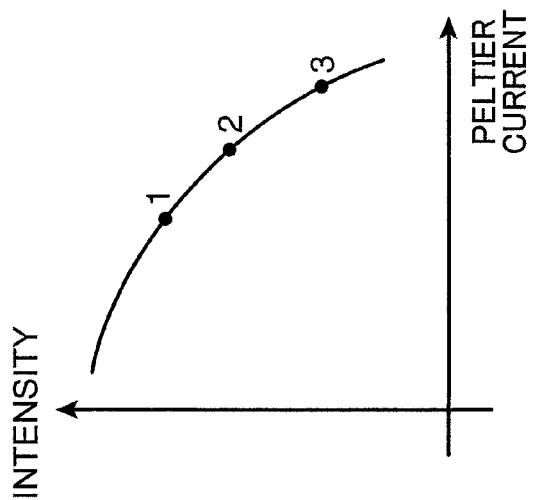
FIGS. 15A to 15C are diagrams showing a relationship between the output intensity of green light and Peltier current values.
Figure 15B:
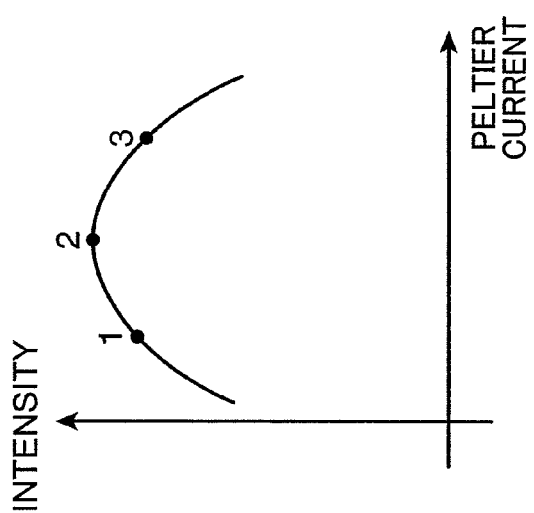
Figure 15A:
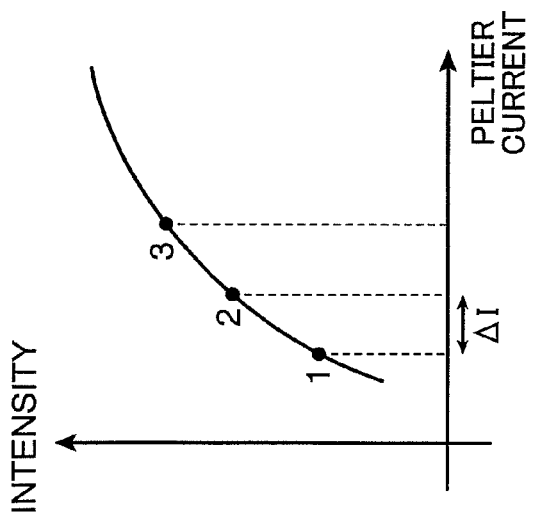

First, the driving current of the excitation LD 202 is switched to ACC control. Based on variations in output value for each current increment AI while increasing the amount of Peltier current, when the three most recent output values exhibit a monotonic increase as shown in FIG. 15A, the amount of Peltier current is increased until the green light output returns to an allowable range. On the other hand, as shown in FIGS. 15B and 15C, when otherwise, the amount of Peltier current is reduced until the green light output returns to a desired value. After verifying that the output values for both G1 and G2 have reached desired values due to the operations described above, the procedure returns to the main routine.

In this case, when the driving current of the excitation LD 202 is returned from ACC control to APC control, the desired green light output to be used as a criterion of judgment for a return to the main routine must ensure that the driving current of the excitation LD 202 at least falls within an allowable range.

With the present embodiment, a higher conversion efficiency of a stand-by position and a higher average wavelength conversion efficiency can be achieved in comparison with the first embodiment described earlier.

Fourth Embodiment

Next, a fourth embodiment of the present invention will be described. For the present embodiment, a description will be given on the respective control methods for R, B, and G light sources in a two-dimensional image displaying apparatus which uses the light output stabilizing mechanism according to the first to third embodiments described above. The two-dimensional image displaying apparatus according to the present embodiment is configured as illustrated in FIG. 1.

Figure 16A:
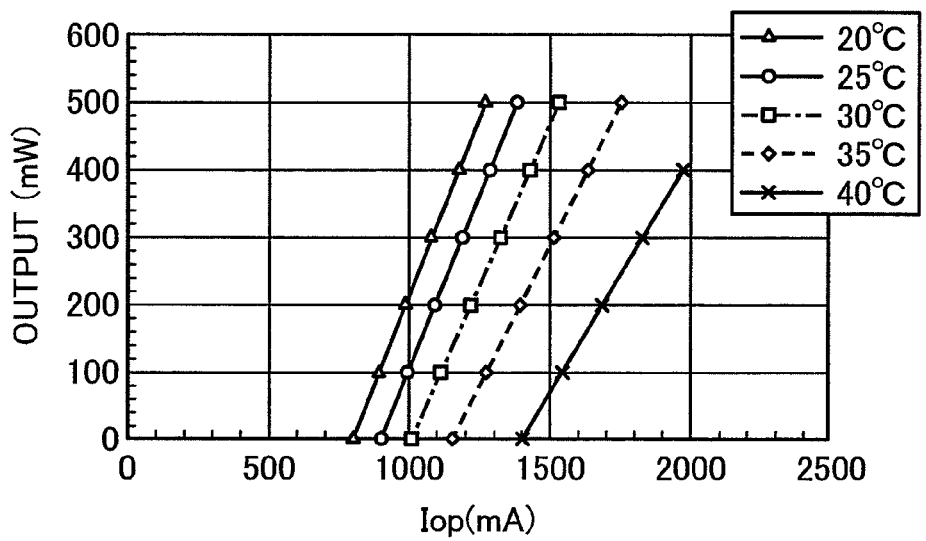
FIG. 16A is a diagram showing output characteristics with respect to the temperature of a red LD.

In the present embodiment, the temperature characteristics of the red laser light source 105R are sensitive to variations in ambient temperature. FIG. 16A shows variations in laser light output with respect to applied current while using, as a parameter, the temperature of an LD holder portion that holds an LD, which is an example of the temperature characteristics of the red laser light source 105R. As shown in FIG. 16A, the threshold current gradually rises as the temperature of the LD holder portion rises. However, while a rated output of 500 mW can be outputted at up to 35° C., the rated output cannot be outputted above 40° C., and oscillation stops altogether at 45° C. This tendency becomes apparent when using an LD having a strained quantum-well structure and which oscillates by TM polarized light at a wavelength of 635 to 640 nm when the temperature of the LD holder portion is 25° C. While this problem can be avoided by using an LD that oscillates by TM polarized light at a wavelength of 640 to 650 nm when the temperature of the LD holder portion is 25° C., since luminosity is reduced to about 60% compared to 635 nm, there is a disadvantage in that a required laser light output increases by just that much.

Figure 16B:
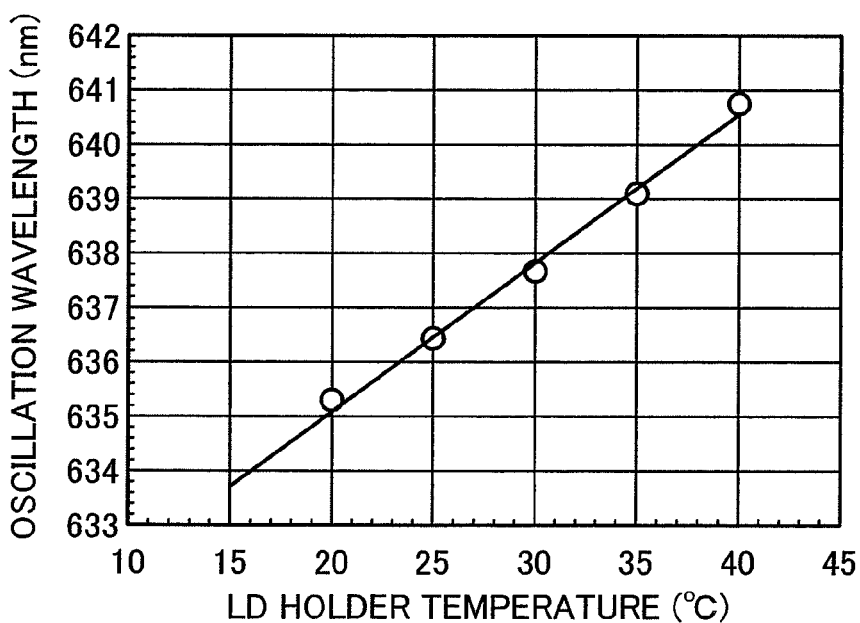
FIG. 16B is a diagram showing wavelength characteristics with respect to temperature.

FIG. 16B is a diagram showing a relationship between the temperature of the LD holder portion and the oscillation wavelength of a red LD. It is shown that the oscillation wavelength rises at a rate of approximately 3.3 nm/K as the temperature of the LD holder portion varies. This means that when using such a red LD in a two-dimensional image displaying apparatus, a problem exists in that the ratio of other colors (green and blue) for obtaining white, i.e., the white balance varies as the temperature of the red LD rises, causing a variation in the displayed color. Conventionally, this problem has been solved by controlling the LD temperature with high accuracy. However, with this method, there is a risk of the white balance being disrupted during temperature adjustment, causing the displayed image to deteriorate.

Figure 17A:
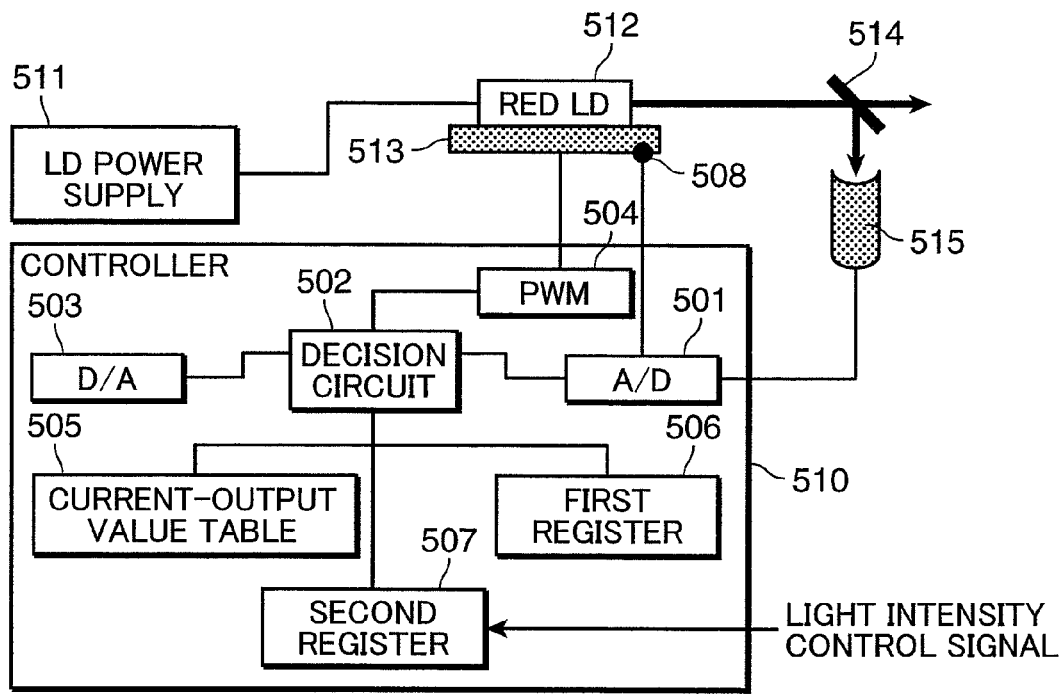
FIG. 17A is a diagram showing a configuration of a red laser light source.

The present embodiment is configured so as to acquire a temperature of the red LD, judge an oscillation wavelength and a generatable output, calculate a white balance, and send a command for current output to the LD power supply 104. FIG. 17A shows a configuration of the red laser light source 105R according to the present embodiment. As shown in FIG. 17A, the red laser light source 105R according to the present embodiment is provided with a thermistor 508 for acquiring the temperature of an LD holder (Peltier element) 513 that holds a red LD 512. A controller 510 comprises: an A/D converter 501 which performs signal conversion on a voltage signal sent from a photodiode 515 that monitors outputted red light; a decision circuit 502 composed of a microcomputer; a D/A converter 503 for generating an LD current value signal; a PWM signal generator 504 which sends a PWM signal that is a control signal to the Peltier element 513; a current-output value table 505 for presetting a relationship between a current value supplied to the red LD 512 and an output value; a first register 506 for temporarily storing current and output values during control; and a second register 507 for storing various factory default values. A necessary light intensity is determined by a light intensity control signal that is an external signal.

Figure 17B:
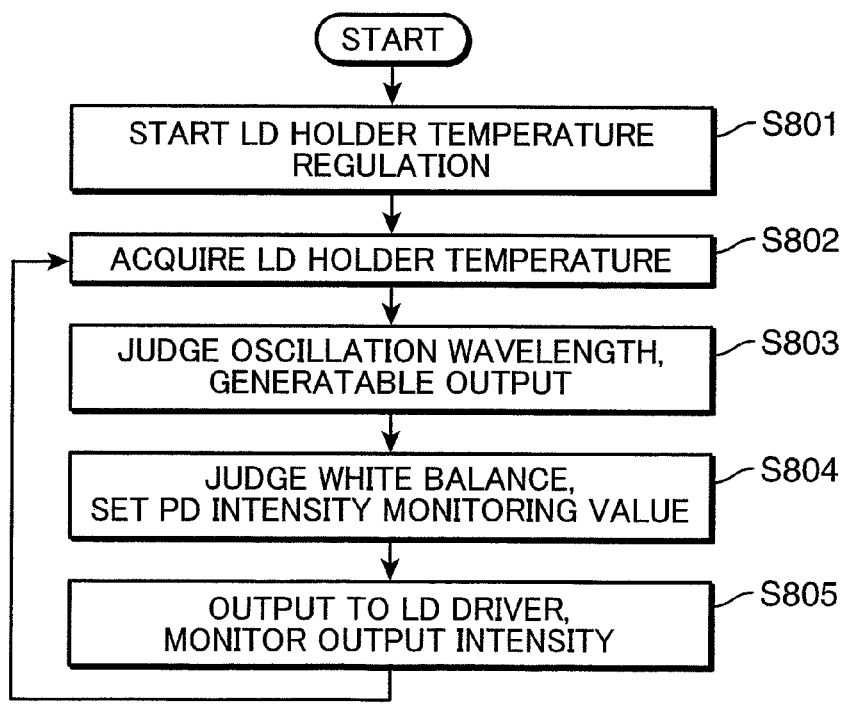
FIG. 17B is a flowchart for explaining processing during a monitoring operation of a red LD.

FIG. 17B shows a flowchart for explaining processing during a monitoring operation of the red LD 512. As operations of the red LD 512 are started, in step S801, temperature regulation of the LD holder 513 commences. Subsequently, in step S802, the decision circuit 502 acquires the temperature of the LD holder 513. In step S803, by referencing the current-output value table 505 which uses the temperature of the LD holder 513 and the temperature stored in the first register 506 of the controller 510 as parameters, the decision circuit 502 judges an oscillation wavelength and a generatable output of the red LD 512.

The oscillation wavelength and the generatable output of the red LD 512 judged in step S803 described above are transmitted in step S804 to the image processing portion 102 shown in FIG. 1, and a judgment on white balance is made and an output value to be actually issued from the LD as an output command is set. Subsequently, in step S805, the output value is transmitted to an LD power supply 511 and the red LD 512 actually becomes luminous.

Conventional techniques are problematic in that conventional temperature constant value control is not fast enough to accommodate variations in output light intensity due to ambient temperature even when the LD is emitting light. However, with the present embodiment, since an outputtable value is calculated from each momentary temperature of the red LD 512, the problem of control not being fast enough can be avoided. In addition, when the temperature of the red LD 512 rises suddenly and the red light output value drops, since light-dark variations on a screen increase, a gradual return is desirable when restoring normal brightness. A light control function to be described later can be used as a restoration method.

Figure 18A:
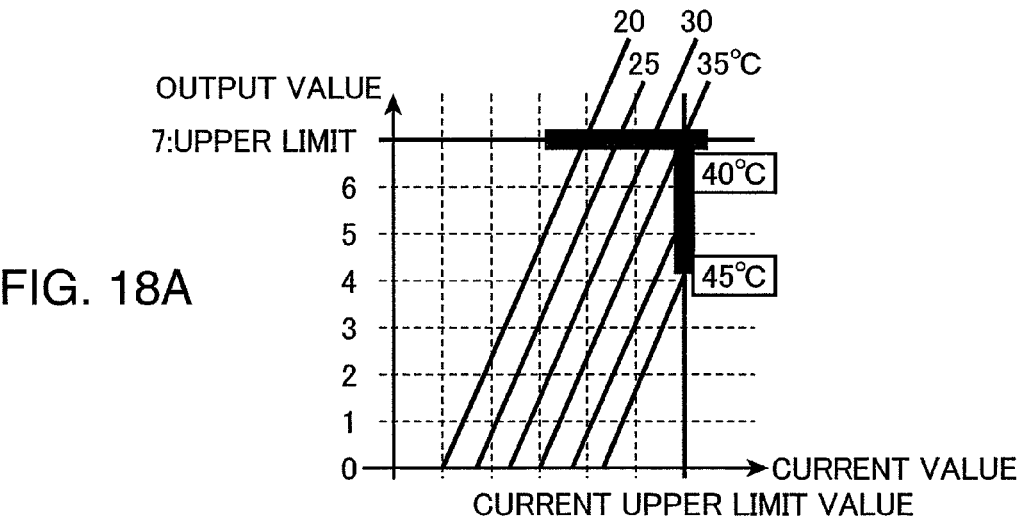
FIGS. 18A to 18C are diagrams for describing contents of a current-output value table.
Figure 18B:
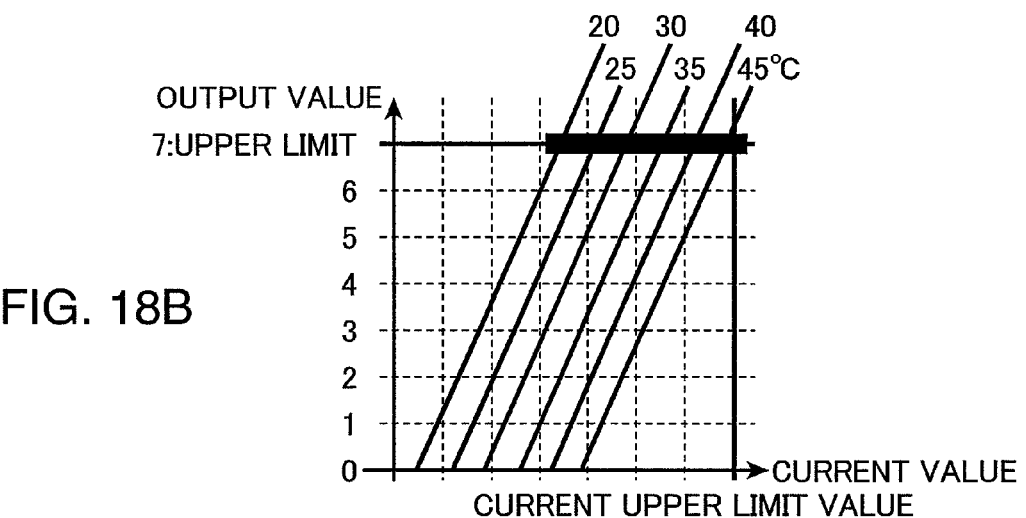
Figure 18C:
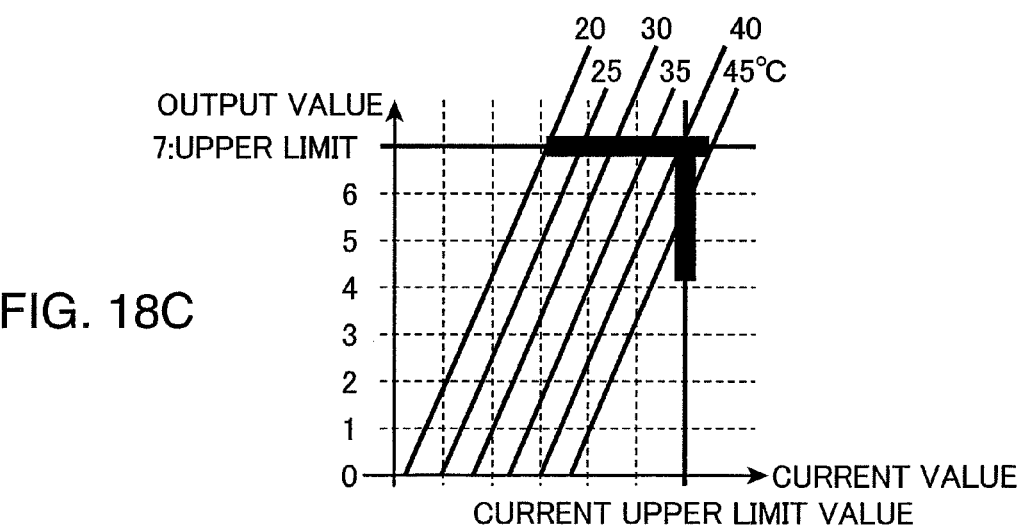

FIGS. 18A to 18C show an example of the current-output value table 505 of the controller 510 for attaining white balance. An example of a case of a red LD is shown in FIG. 18A. The contents to be stored in the current-output value table 505 are stored so as to indicate, for each temperature, what current value enables an output upper limit value to be obtained. When the output upper limit value cannot be obtained even when applying a current value generatable by the power supply circuit (the cases of 40° C. and 45° C. in the drawing), a maximum output value obtainable from a current upper limit value is recorded. In other words, for each temperature, a value in the blacked-out portion in the drawing is stored. Such a table is respectively prepared for the green laser (FIG. 18B) and the blue laser (FIG. 18C) to be stored in the current-output value table 505 of the controller 510.

Figure 19:
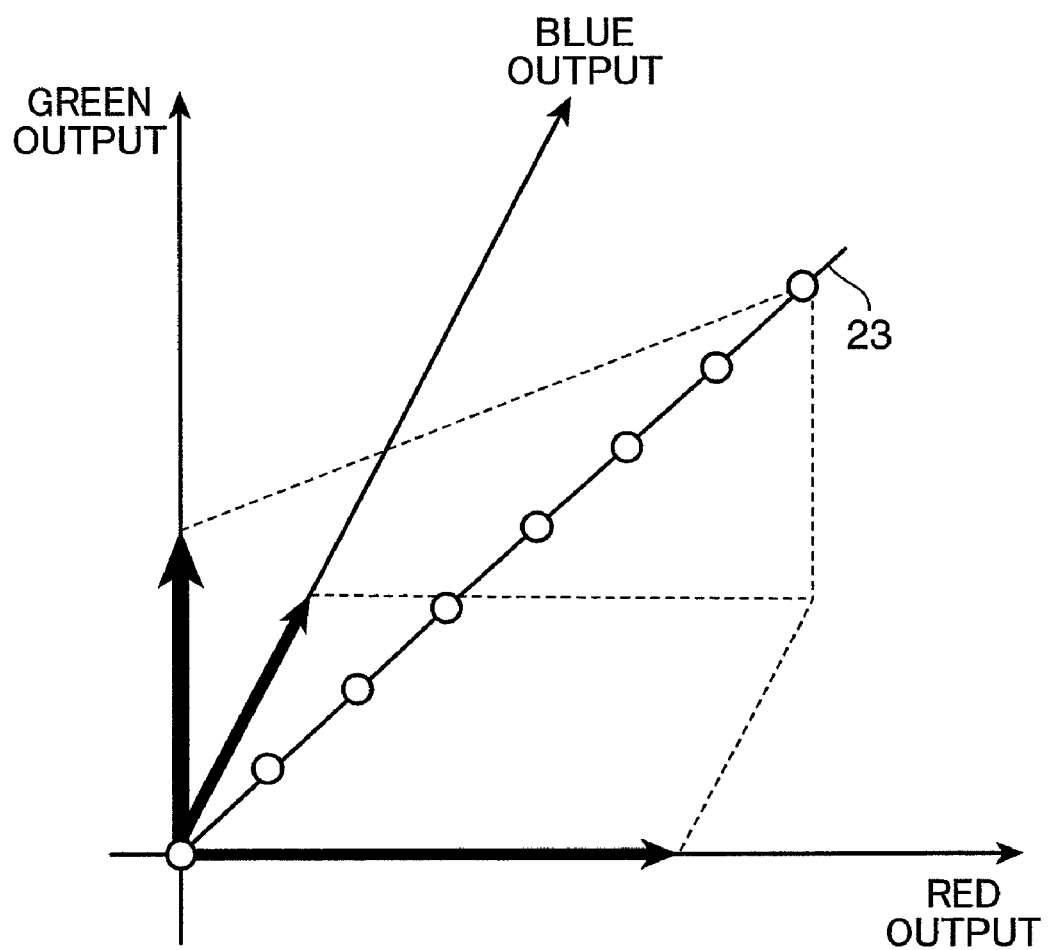
FIG. 19 is a schematic diagram that represents a curve from which white balance is obtained in three-dimensional coordinates.

Furthermore, the image processing portion 102 stores requisite output values from the red laser light source 105R, the green laser light source 105G and the blue laser light source 105B which enable white balance to be attained. Consequently, white balance can be attained at any output value in each of the colors. FIG. 19 shows curves of ratios at which white balance can be attained with respect to outputs in the respective colors. As shown, since a white balance curve can be represented as a curve existing in three-dimensional space, once a light output value of any one color is determined, the necessary light intensity for the remaining two colors can be unambiguously determined. In addition, a reduction in light output value with respect to applied current value due to aged deterioration of the LD of each color can be accommodated by increasing the amount of current applied to the LD.

An increase in the amount of applied current forced by aged deterioration of an LD can be accommodated by rewriting the current values in the tables shown in FIGS. 18A to 18C. When a maximum output value cannot be obtained even when applying a maximum current value that can be applied to an LD due to high temperature around the LD, aged deterioration of the LD, or the like, white balance is attained in accordance with a light source having the greatest shortage of output.

Figure 20A:
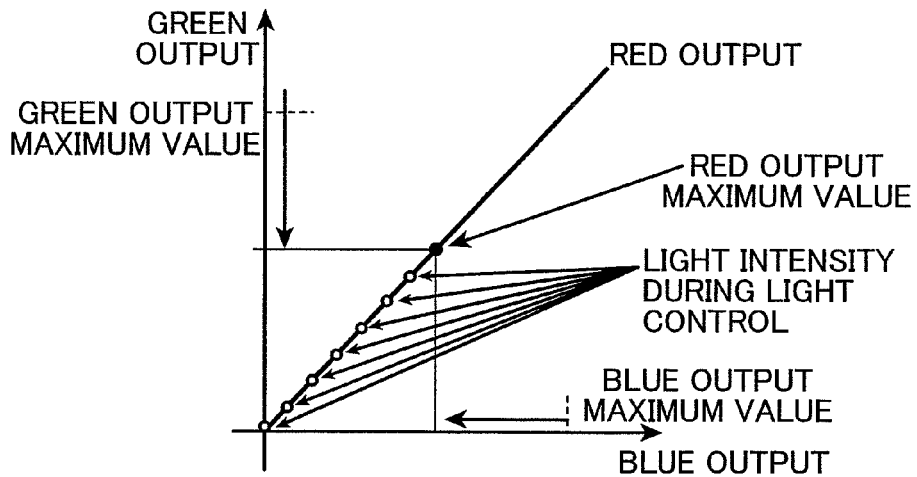
Figure 20B:
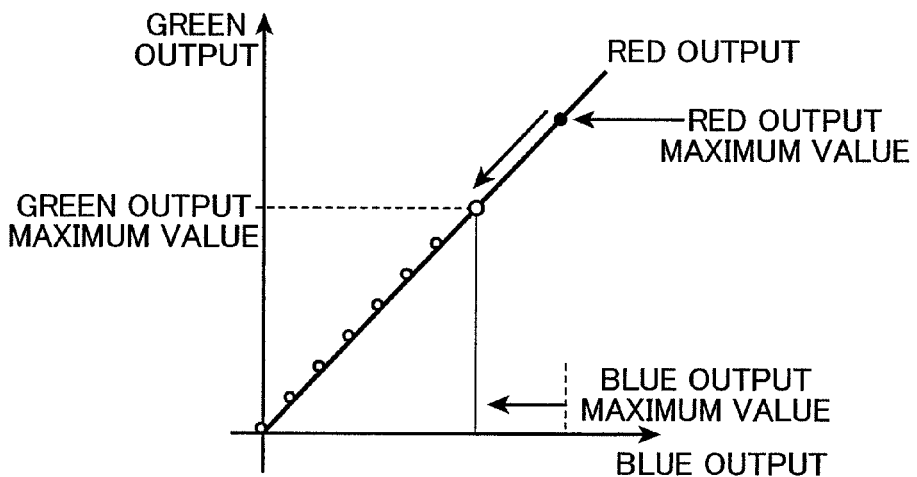
Figure 20C:
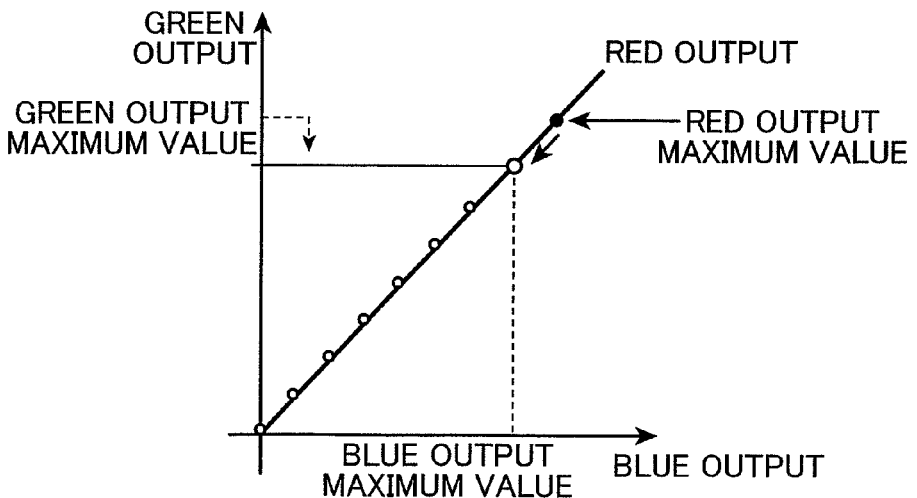

While attaining white balance in this manner, light intensity control functions referred to as light control or dynamic iris can be realized in which the light intensity from a light source is adjusted in accordance with a luminance signal of a visual signal. FIGS. 20A to 20C show an example according to the present embodiment in which a method for attaining white balance from a light output maximum value of a single color is applied to light control. FIG. 20A shows a case where, when attaining white balance, the red output maximum value from the red LD limits output from the other two colors. A description will now be given on a case of 8-bit light control in which current value is linearly varied in order to vary light intensity. When the red output maximum value is determined, white balance is attained by lowering green output and blue output in accordance with the red output. In addition, light intensity can be adjusted in accordance with a visual luminance signal by dividing, eightfold, output values corresponding to a range between a light intensity of 0 to a maximum light intensity at which white balance can be attained. FIGS. 20B and 20C show behavior of output from the respective laser light sources when a light intensity limitation is imposed on the light sources of the other colors.

Besides light control involving linearly controlling a laser light source, a light control function can be similarly realized with PWM control in which illumination time is subjected to time-shared control. With PWM control, since only performing time-division on illumination time shall suffice without having to calculate a divided value every time as long as a light intensity maximum value is acquired, calculations by the controller 510 can be significantly simplified.

When performing light control, the applied current value at the point of 0 light intensity is desirably set equal to or greater than the oscillation threshold of each laser light source. This is because an abrupt fluctuation in current value across the oscillation threshold will generate a large inrush current which may potentially destroy the LD.

While a spatial modulating element using a transmissive liquid crystal element was used in the first to fourth embodiments described above, it is obvious that a modulating element using a micro-reflecting element or a two-dimensional modulating element using a galvanomirror or a mechanical microswitch (MEMS) can also be used. By having a planar light guiding mechanism guide light to illuminate a large-size liquid crystal panel from the rear, the configurations according to the first to fourth embodiments can also be used as a backlight.

While the fiber laser in the first to fourth embodiments described above may use at least one rare-earth element selected from other rare-earth elements including Nd, Er, and the like, a fiber laser doped with Yb as the rare-earth element can be used in various light sources due to its broad gain and extremely wide oscillation wavelength range of 1030 to 1150 nm, and is therefore exceptionally desirable. In addition, the doping amount of the rare-earth element may be varied and a plurality of rare-earth elements may be doped depending on the wavelength or output of the wavelength converting apparatus.

While lasers with wavelengths of 915 nm and 976 nm have been used as the excitation LD of the fiber laser in the first to fourth embodiments described above, laser light sources with other wavelengths may also be used as long as such laser light sources are capable of exciting the fiber laser.

While $MgO:LiNbO_3$ having cyclic polarization-inverting characteristics has been used as the wavelength converting elements in the first to fourth embodiments described above, wavelength converting elements using other materials or having other structures such as potassium titanyl phosphate ($KTiOPO_4$:KTP) or $Mg:LiTaO_3$ having a cyclic polarization-inverting structure may be used instead.

With the wavelength converting apparatuses according to the first to fourth embodiments described above, with respect to a green light output obtained in a wavelength converting apparatus provided with a plurality of wavelength converting mechanisms, by respectively controlling the temperatures of wavelength converting elements and a current to be supplied to an excitation LD, and compensating output fluctuations during the execution of temperature regulation of the wavelength converting elements using the current to be supplied to the excitation LD, it is now possible to reduce green light output fluctuation as compared to so-called "constant value control" in which the temperatures of the wavelength converting elements are controlled to a constant value.

Conventionally, the monitoring of element temperatures is required to be performed with an accuracy of 0.01° C., thereby complicating control circuits and control programs. In addition, depending on how the vicinity of wavelength converting elements is thermally designed, there is a risk that a "runaway effect" which is a deviation from constant value control may occur. However, with the wavelength converting apparatuses according to the first to fourth embodiments described above, since green light output is used as a temperature indicator, it is now possible to perform temperature control at higher accuracy, and by reciprocally monitoring the green light output and a current supplied to an excitation LD, constant value control of the green light output can be performed while causing hardly any green light output fluctuations.

Fifth Embodiment

Figure 21:
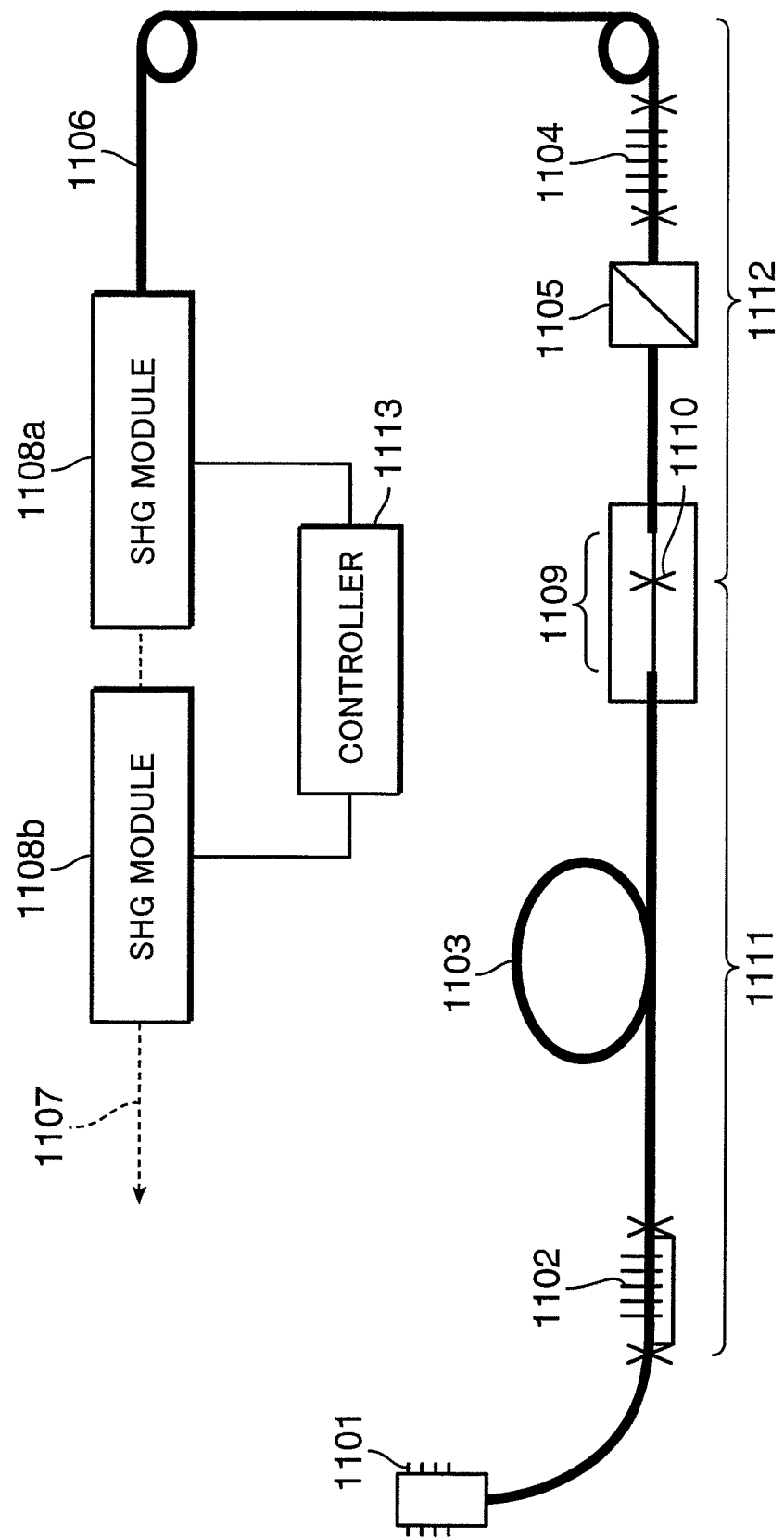
FIG. 21 is a diagram showing a configuration of a wavelength converting apparatus according to a fifth embodiment of the present invention.

Next, a fifth embodiment of the present invention will be described. FIG. 21 is a diagram showing a configuration of a wavelength converting apparatus according to the present embodiment. In FIG. 21, a double-clad polarization-maintaining fiber 1103 (with a fiber length of 10 m in the case of the present embodiment) having its core portion doped with Yb as a rare earth by a pumping LD 1101 is excited, and a laser light is oscillated inside a resonator composed of a pair of fiber gratings 1102 and 1104. This laser active substance was selected because a light of 1050 to 1170 nm can be arbitrarily oscillated by manipulating the characteristics of the fiber gratings 1102 and 1104 using the double-clad polarization-maintaining fiber 1103 doped with Yb and is therefore desirable as far as display applications are concerned.

In the case of the present embodiment, single emitter laser diodes (three, respectively with an 8 W maximum output) having an oscillation wavelength of 915 nm are used as the pumping LD 1101. The fiber grating 1102 is formed as a polarization-maintaining fiber in which germanium is added to a core portion of the double-clad polarization-maintaining fiber 1111 to improve sensitivity towards ultraviolet light and to form a grating, and has a central wavelength of 1070 nm, a reflectance spectrum half bandwidth of 1 nm and a reflectance ratio of 98%. In addition, the fiber grating 1104 is formed such that germanium is similarly added to a core portion of a general single-mode polarization-maintaining fiber 1112 (with a core diameter of 6 μm and a clad outside dimension of 125 μm), and has a central wavelength of 1070 nm, a reflectance spectrum half bandwidth of 0.09 nm and a reflectance ratio of 10%. While the length of the rare earth-added double-clad polarization-maintaining fiber 1103 can be extended by increasing the reflectance ratio of the fiber grating 1104, there is a limit to improving characteristics and therefore cannot be considered an effective countermeasure. Furthermore, while a narrower bandwidth is important for wavelength conversion purposes, there is a problem in that a higher reflectance ratio makes narrowing the bandwidth of the fiber grating 1104 difficult. A polarizer 1105 is used to change polarized light of the light to be oscillated into single polarized light (linear polarized light) by increasing the loss inside the laser resonator of one of the polarization components. The polarized light is changed into linear polarized light because the wavelength converting crystals inside SHG modules 1108a and 1108b only perform wavelength conversion on one of the polarization components. Subsequently, oscillated light in the vicinity of 1064 nm is guided into the SHG modules 1108a and 1108b by a light polarization-maintaining fiber that propagates the light, whereby a light of 532 nm is generated through second harmonic wave generation. A pumped light diffusion absorption mechanism 1109 is provided because a connecting portion 1110 of the rare earth-added double-clad polarization-maintaining fiber 1111 and the general single-mode polarization-maintaining fiber 1112 exists between the Yb-doped clad pump fiber 1103 and the polarizer 1105 and may cause fiber deterioration. In the present embodiment, a novel proposal is made in regards to a method of holding the fiber grating 1102.

Moreover, in a similar manner to the first to fourth embodiments described above, the wavelength converting apparatus according to the present embodiment comprises two SHG modules 1108a and 1108b and has a so-called two-stage configuration. The two SHG modules 1108a and 1108b are connected to a controller 1113 which performs constant value control on a summed value of output values from the two SHG modules 1108a and 1108b.

Figure 22:
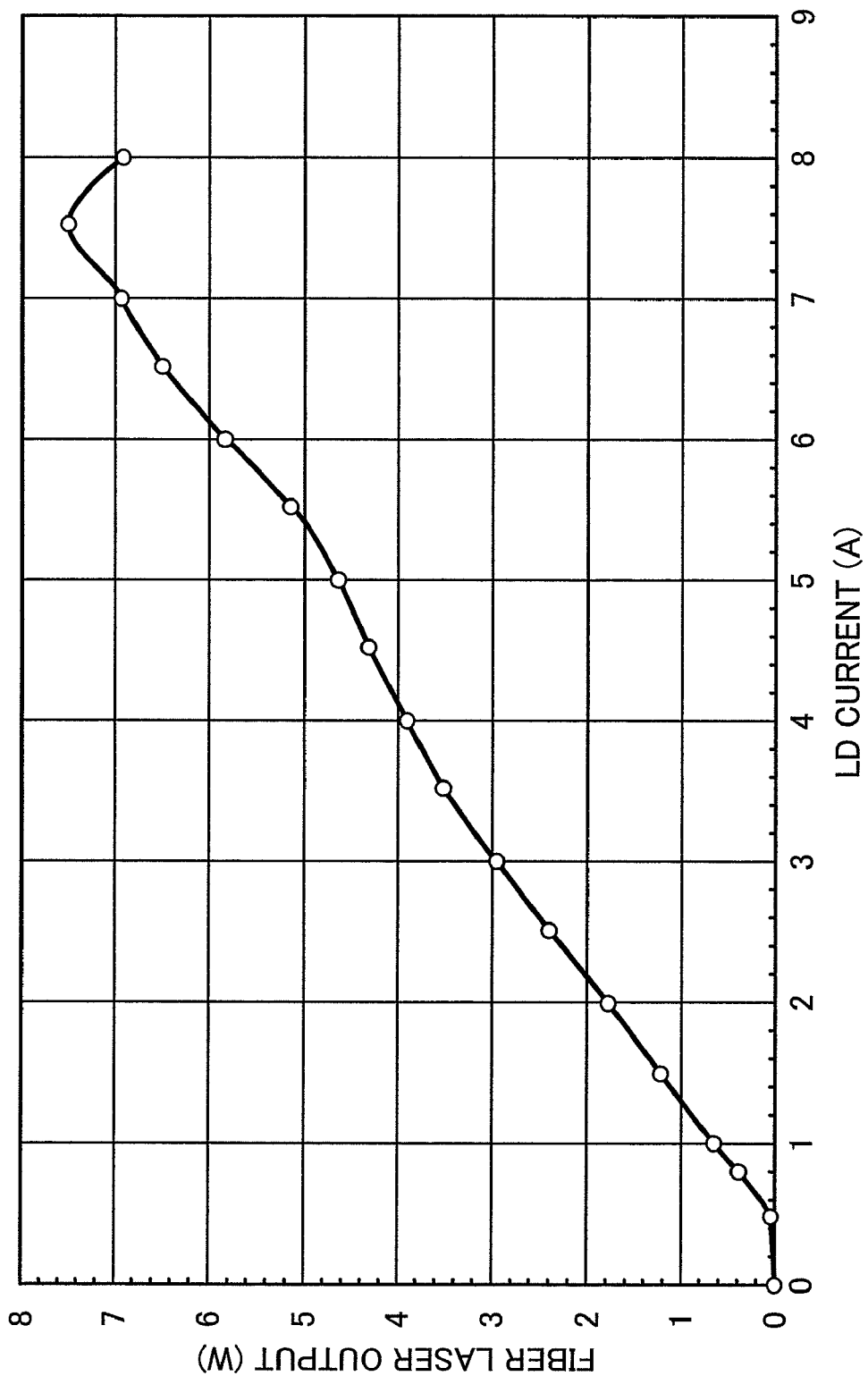
FIG. 22 is a diagram showing a relationship between excitation LD current and fiber laser output.
Figure 23A:
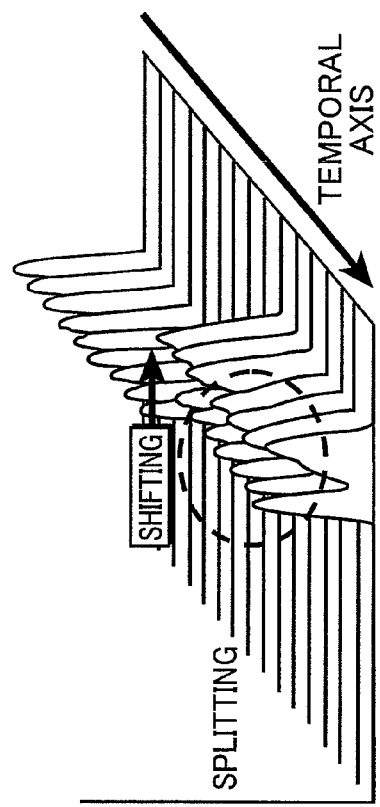
FIGS. 23A and 23B are diagrams for explaining deterioration of a wavelength spectrum.
Figure 23B:
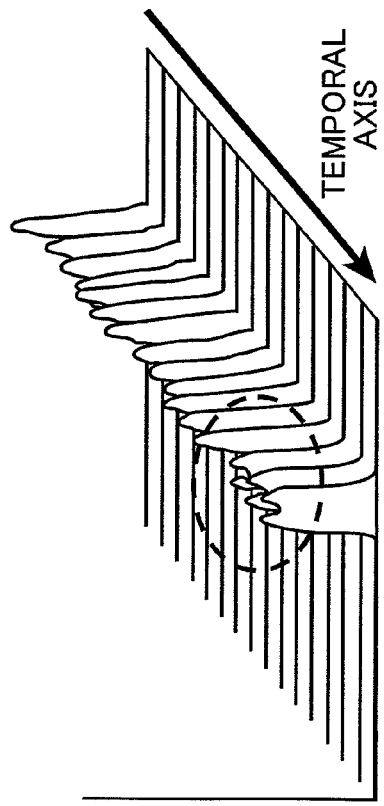

Next, a method of holding the fiber grating 1102 according to the present embodiment will be described. With a fiber laser whose output exceeds 1 W and whose oscillation wavelength is determined by a fiber grating, it has been found that spontaneous heating and subsequent change in reflectance characteristics of a double-clad fiber grating near an excitation laser diode destabilizes laser oscillation. More specifically, a problem arises in that a decline in output or a deterioration of the oscillation wavelength spectrum is induced, which causes the output to fluctuate significantly when used as a fundamental wave of a wavelength converting laser light source. FIG. 22 is a so-called I-L curve which plots light output from a fiber laser when excitation LD current is represented by the abscissa. It is shown that output declines past 7.5 W. An observation of the wavelength spectrum of output light in the vicinity of the current value at which the output declines has revealed the occurrence of peak splitting as shown in FIG. 23A. In addition, as shown in FIG. 23B, there were also found cases in which peak shifting had occurred as well as cases in which shifting and splitting of peaks had occurred concurrently. Furthermore, it was found that the output values at which these phenomena were observed occurred when the light output from the fiber laser was 2 W or higher.

An analysis of these phenomena revealed that the phenomena had occurred because the fiber itself expanded when locally heated by a strong excitation light regardless of ambient temperature, which in turn generated stress at the fiber grating portion and thereby causing a variation in reflectance characteristics. Since these phenomena are independent of fluctuations in ambient temperature, the phenomena cannot be avoided using a conventional temperature compensating package. When employing temperature control based on temperature regulation, since local heating makes it difficult to keep temperature constant, power consumption increases significantly when using a Peltier element or the like.

FIG. 24A is a schematic diagram of a holding portion of a fiber grating formed at a double-clad fiber according to the present embodiment; FIG. 24B is a cross-sectional view taken along A-A' of FIG. 24A; and FIG. 24C is a cross-sectional view taken along B-B' of FIG. 24A. While one end of a double-clad fiber 1401, at which a fiber grating 1402 is formed, is directly fixed to a holding member 1403 by an adhesive 1405, the other end is fixed by the adhesive 1405 via a sleeve 1404. A UV curable resin with a refractive index of 1.39 is used as the adhesive 1405. The holding member 403 is provided with a groove or a depression which prevents the fiber grating 1402 from coming into contact with the holding member 1403. Such a depression is provided because the contact of the fiber grating 1402 with the holding member 403 causes abnormalities in the wavelength spectrum such as those shown in FIGS. 23A and 23B described above.

Fixing one end of the fiber 1401 via the sleeve 1404 enables free movement of the fiber 1401. That is, by arranging one end of the fiber grating 1402 as a fixed end and the other end as a free end, even when the fiber 1401 expands due to heat, the fiber 1401 itself is able to extend freely. Therefore, the fiber grating 1402 is not subjected to stress and abnormalities in the reflectance characteristics of the fiber grating 1402 can be avoided.

In addition, a double-clad fiber is used as the fiber 1401 because the phenomena presently in question are prominently manifested when exciting the laser with high excitation light intensity (strong excitation). While the effects may also be achieved using a normal single-clad fiber, a greater effect may be achieved when applied on a double-clad fiber.

Figure 25:
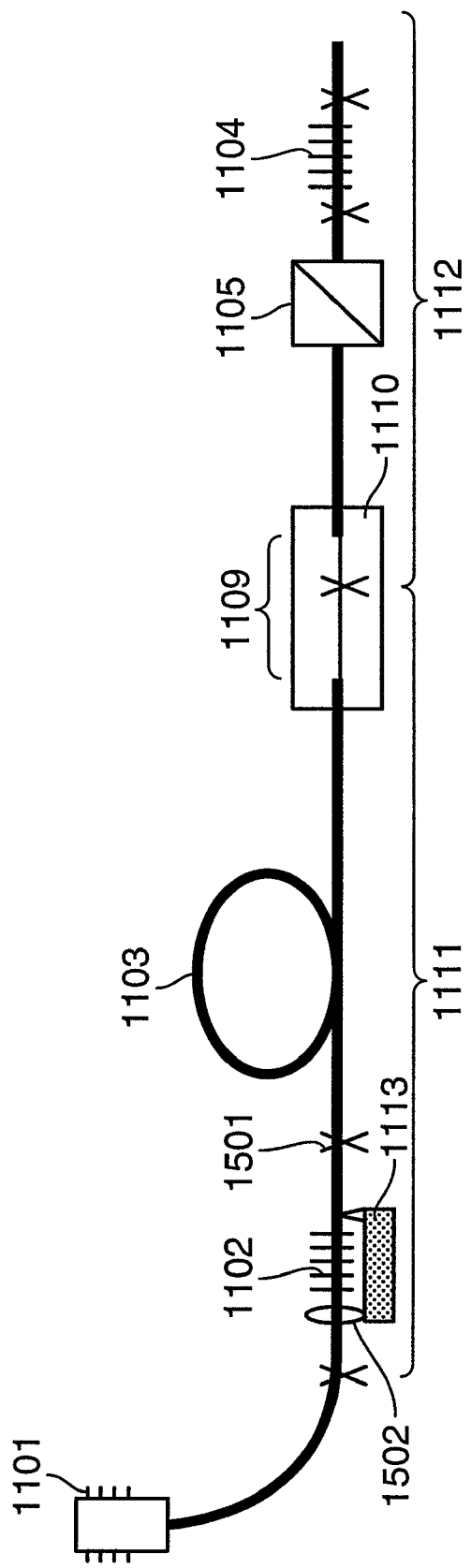
FIG. 25 is a diagram for explaining a position of a fixed end of a fiber.

Furthermore, to enable the fiber 1401 to contract freely, the fixed end of the fiber 1401 is desirably set on the side of the Yb-doped fiber 1103 as shown in FIG. 25.

Moreover, the fiber grating 1402 is desirably an uncovered fiber (not in a so-called recoated state).

In addition, in order to prevent dust from adhering to the fiber grating 1402 after assembly, a cover for covering the entire holding member 1403 is desirably provided.

In the present embodiment, while the sleeve 1404 is provided for holding the free end of the fiber 1401, a sleeve is not a requisite and what is important is that a structure be provided which enables free contraction of the fiber 1401.

Figure 26:
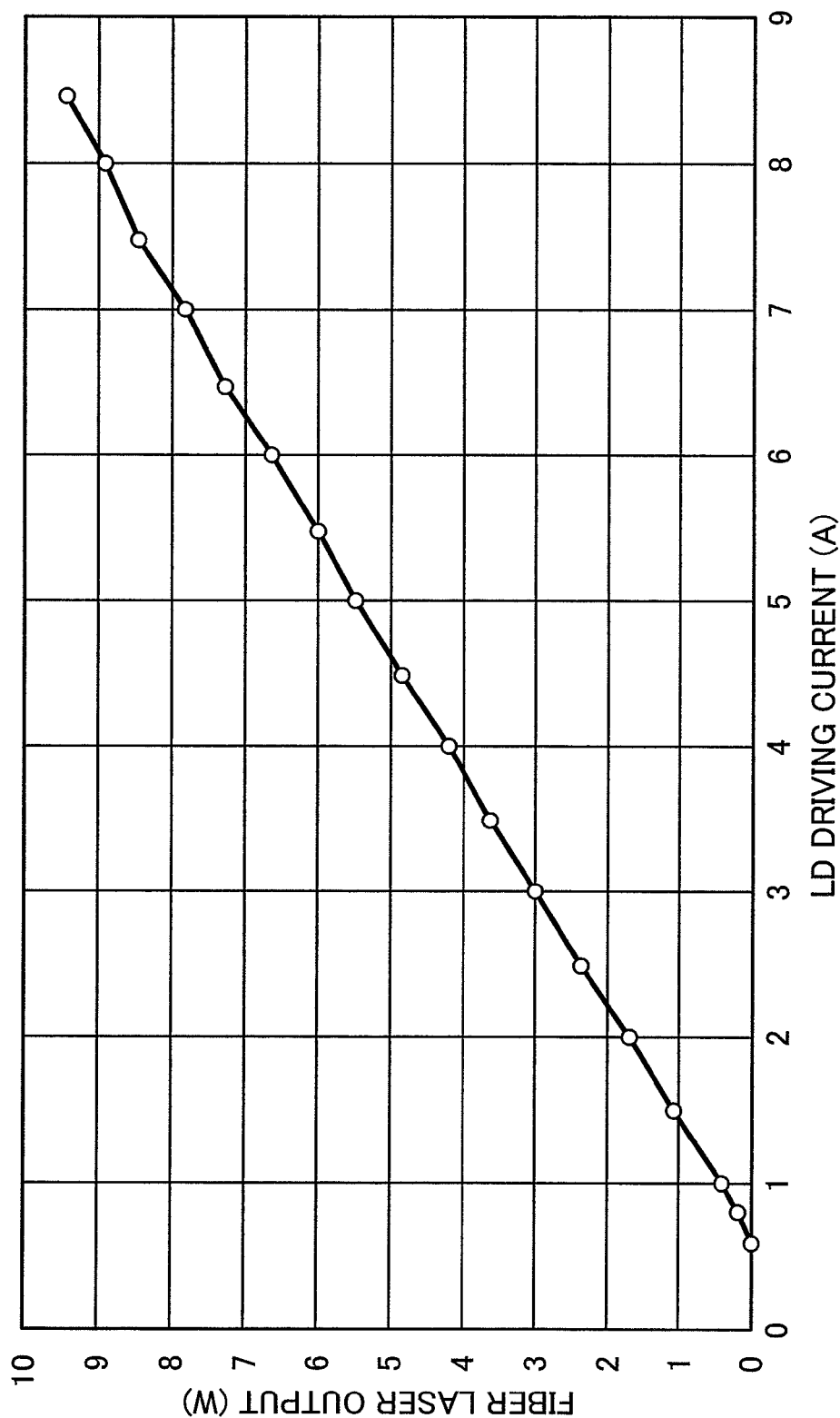
FIG. 26 is a diagram showing output characteristics of a fiber laser.
Figure 27:
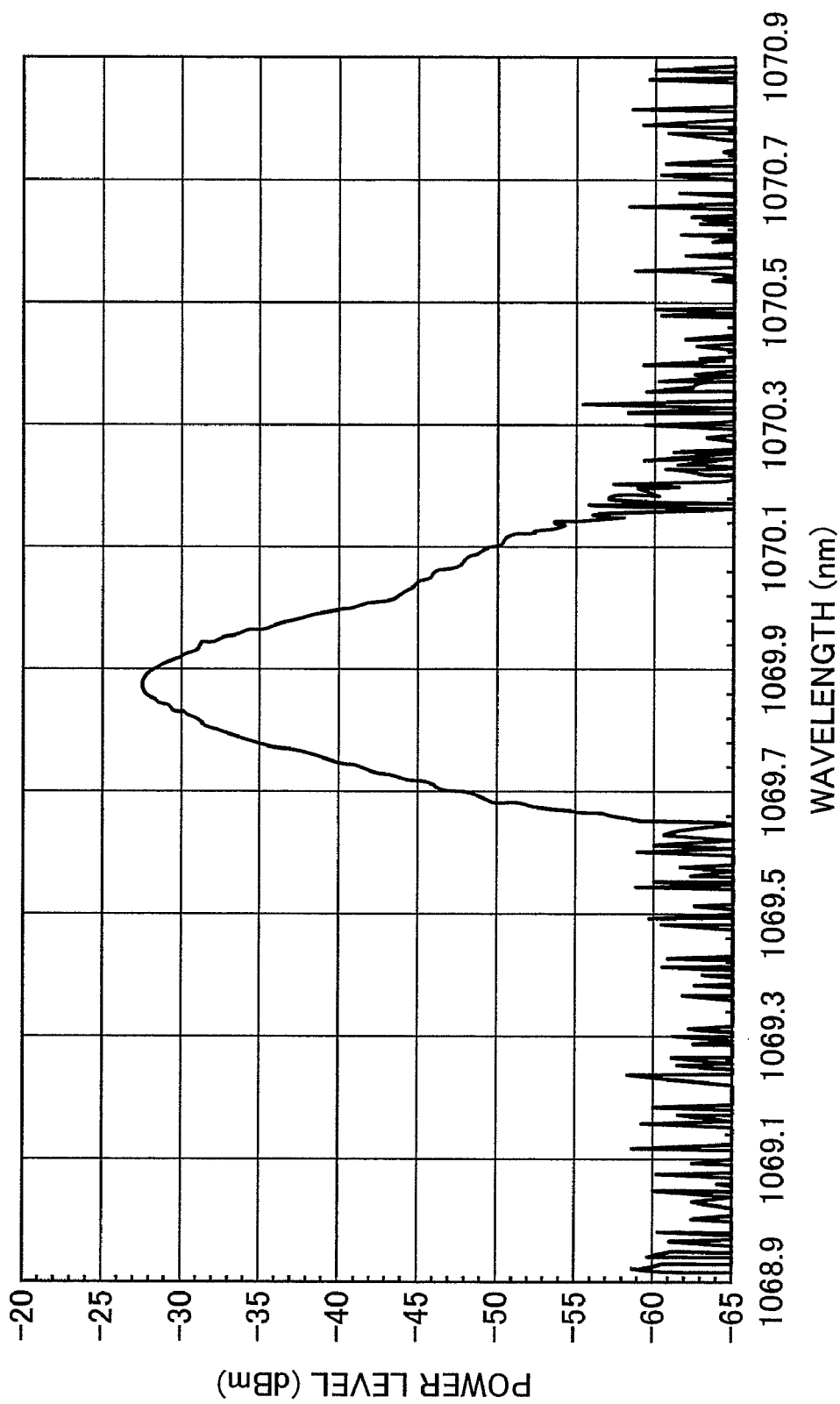
FIG. 27 is a diagram showing a wavelength spectrum of a fiber laser.

FIG. 26 shows I-L characteristics of a fiber laser when using the fiber grating holding member according to the present embodiment. Favorable characteristics are exhibited without a decline in output as was the case with FIG. 22 described above. In addition, as shown in FIG. 27, no peak splitting and the like had been observed in the wavelength spectrum.

Figure 28:
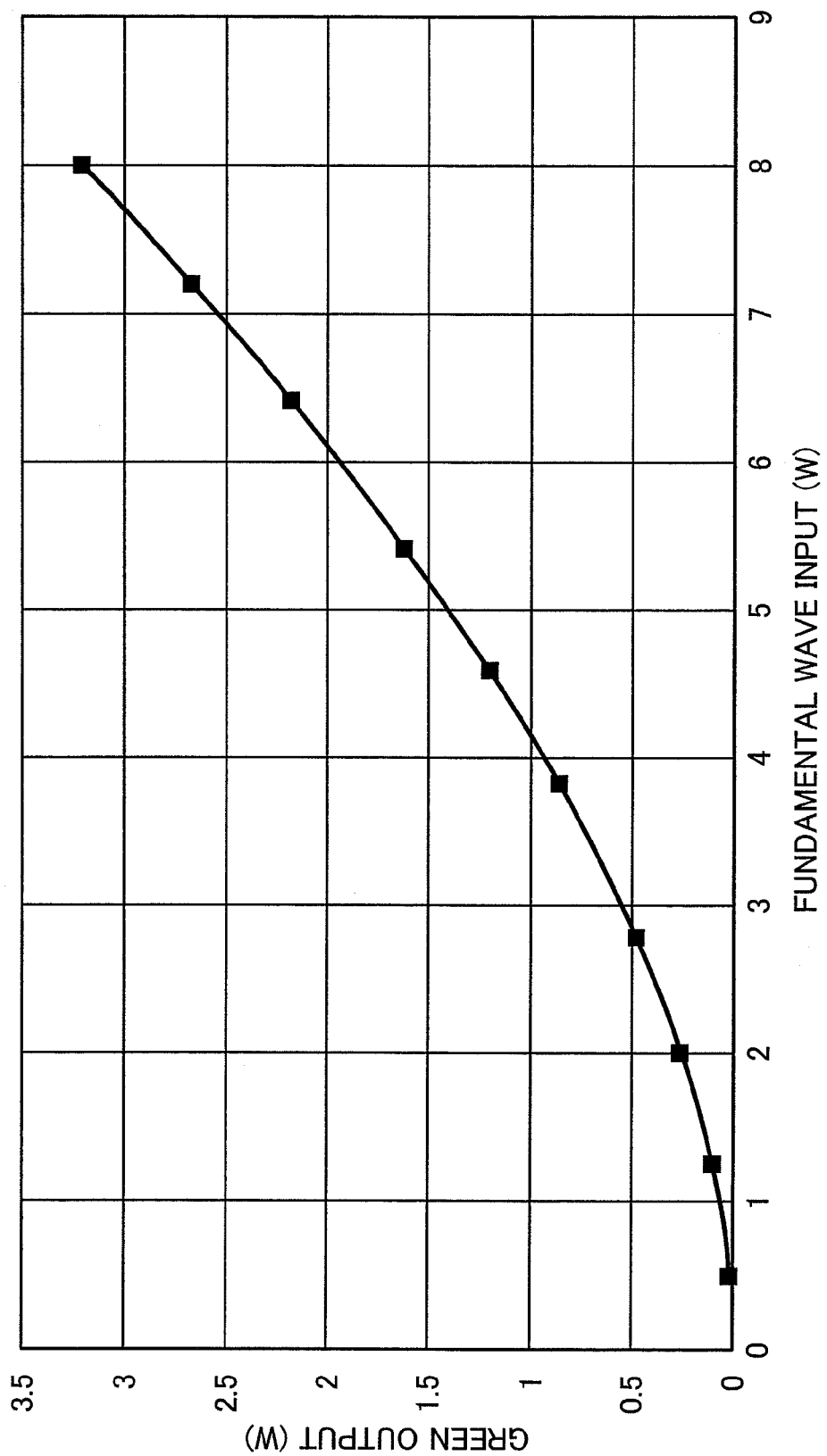
FIG. 28 is a diagram showing a relationship between fundamental wave input and green light output.

FIG. 28 shows the result of second harmonic wave generation using, as a fundamental wave, light emitted from a fiber laser using the fiber grating holding member according to the present embodiment. A polarization-inverting lithium niobate element is used as a wavelength converting element whose temperature is managed by a Peltier element. As a result, the generation of green light of 3 W or more was confirmed with respect to a fundamental wave input of 8 W. Such power will enable the configuration of a front projector of 1000 lm or greater and, in turn, a practical display.

Figure 29:
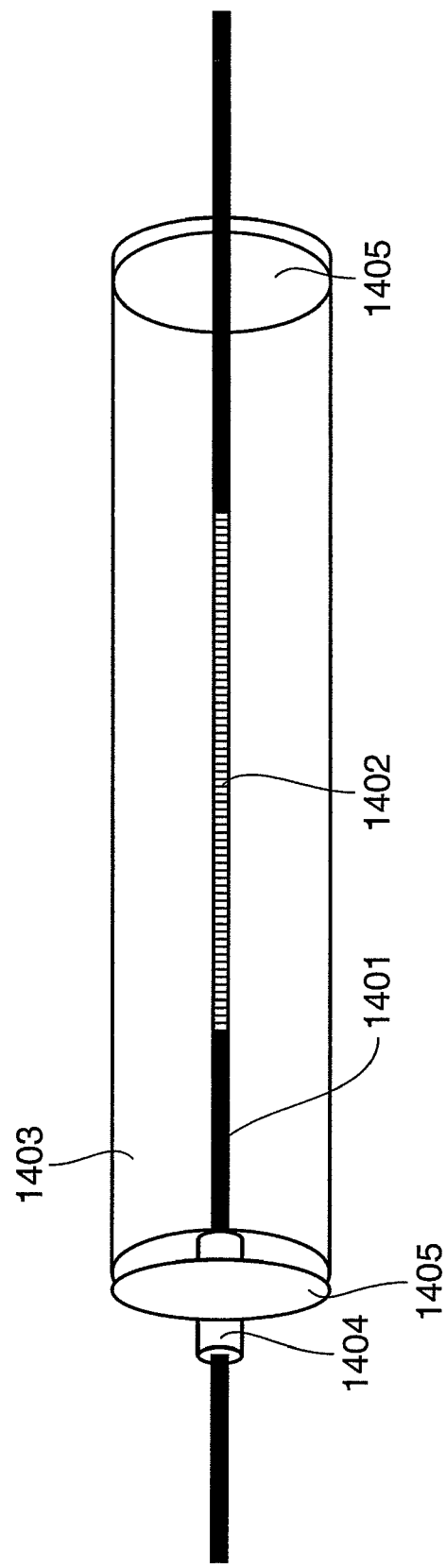
FIG. 29 is a schematic diagram showing another holding portion according to the fifth embodiment of the present invention.

Furthermore, while a plate-like holding member is been used in the present embodiment, as shown in FIG. 29, a cylindrical holding member 1403 can obviously be used as well. In FIG. 29, while the fiber 1401 is fixed via the sleeve 1404 to realize a free end, a similar effect may be achieved by arranging the fiber 1401 to be totally free without fixing the same with an adhesive or the like as long as the fiber grating 1402 does not come into contact with the holding member 1403.

Sixth Embodiment

Figure 30:
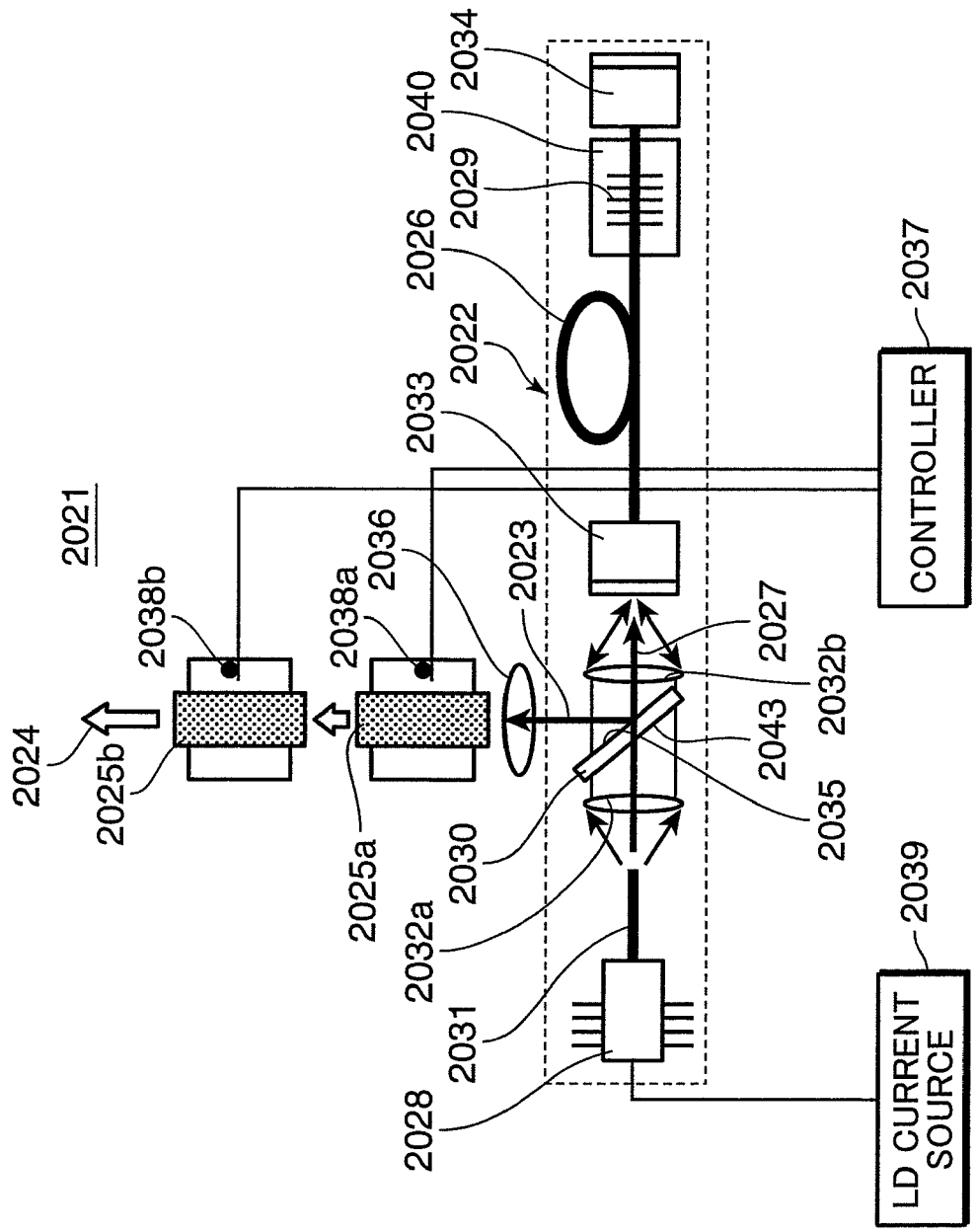
FIG. 30 is a diagram showing a configuration of a wavelength converting apparatus according to a sixth embodiment of the present invention.
Figure 31:
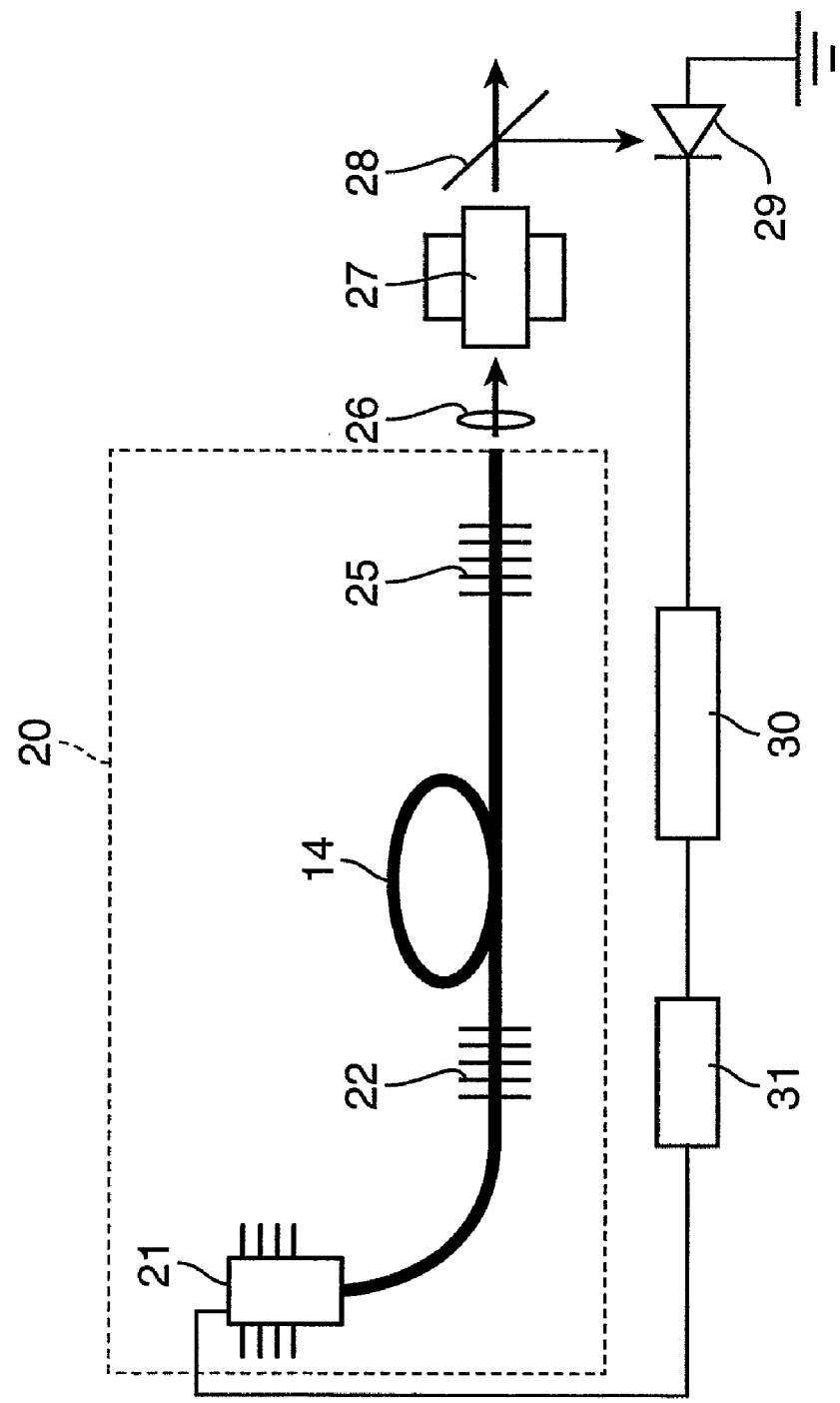
FIG. 31 is a diagram showing a schematic configuration of a conventional wavelength converting apparatus.

Next, a sixth embodiment of the present invention will be described. The present embodiment is an embodiment in which the fiber grating holding member according to the fifth embodiment described above is applied to a wavelength converting apparatus that uses only one fiber grating. FIG. 30 is a diagram showing a configuration of a wavelength converting apparatus according to the present embodiment. In FIG. 30, a wavelength converting apparatus 2021 according to the present embodiment comprises: a fiber laser 2022; and wavelength converting elements 2025*a* and 2025*b* which convert a fundamental wave 2023 outputted from the fiber laser 2022 into a harmonic wave output 2024.

Moreover, in a similar manner to the first to fourth embodiments described above, the wavelength converting apparatus according to the present embodiment comprises two wavelength converting elements 2025*a* and 2025*b*, and has a so-called two-stage configuration. The wavelength converting elements 2025*a* and 2025*b* are connected to a controller 2037 which performs constant value control on a summed value of output values from the two wavelength converting elements 2025*a* and 2025*b*.

The fiber laser 2022 is constituted by components enclosed in the dashed line in FIG. 30. Primary components include: a laser light source 2028 which enters an excitation light 2027 into a fiber 2026; a laser resonator made up of the fiber 2026 containing a laser active substance and having a fiber grating 2029 formed on a portion thereof; and an extracting mirror 2030 which extracts the fundamental wave 2023 outputted from the fiber 2026 in the directions of the wavelength converting elements 2025*a* and 2025*b*. The laser resonator constituted by the fiber 2026 amplifies and outputs the fundamental wave 2023 using the fiber grating 2029 and a second reflecting face 2033 formed on an edge face of the fiber 2026 as a pair of reflecting faces.

In other words, the fiber laser 2022 comprises: the laser light source 2028 which outputs the excitation light 2027 to be entered into the fiber 2026; the fiber 2026 having formed therein the fiber grating 2029 that selects a wavelength of the fundamental wave and which reflects the fundamental wave; and the extracting mirror 2030 which guides the fundamental wave 2023 that is an output to the wavelength converting elements 2025*a* and 2025*b*. The extracting mirror 2030 functions to transmit the excitation light 2027 and join the laser light source 2028 and the fiber 2026, and at the same time, to reflect the fundamental wave 2023 outputted from the fiber 2026 and guide the same to the wavelength converting elements 2025*a* and 2025*b*. Applying the fiber grating 2029 as one of the reflecting faces of the laser resonator of the fiber laser 2022 enables selection of an arbitrary reflection central wavelength and therefore an arbitrary oscillation central wavelength, as well as generation of a fundamental wave with a wavelength band of 0.05 to 0.2 nm required by the wavelength converting elements 2025*a* and 2025*b*. With a reflecting mirror using a dielectric multilayer film, this band is difficult to achieve. When using a wideband reflecting face such as a dielectric multilayer film, since oscillation occurs at an oscillation wavelength with a high fiber gain (oscillation occurs at an oscillation wavelength at which oscillation more readily occurs), arbitrarily selecting a wavelength becomes more difficult which may potentially lead to oscillation wavelength destabilization.

In addition, by configuring a closed system in which the laser resonator is closed inside the fiber 2026, it is now possible to suppress a reduction of output over time or fluctuations in output due to an increase in damages to the resonator caused by dust from the outside, a misalignment of the reflecting faces, and the like.

Next, basic laser operations of the fiber laser 2022 will be described. In FIG. 30, after propagating through a fiber 2031 attached to the pigtail-type laser light source 2028, the excitation light 2027 from the laser light source 2028 is transmitted through the extracting mirror 2030 in a state where the excitation light 2027 is converted into parallel light by a collimating lens 2032*a*. Furthermore, the excitation light 2027 is collected by a collecting lens 2032*b* and entered into the fiber 2026 by the second reflecting face 2033 of the fiber 2026. The incident excitation light 2027 propagates through the fiber 2026 while being absorbed by the laser active substance contained in the fiber 2026. After being transmitted through the fiber grating 2029, the excitation light 2027 is reflected by a first reflecting face 2034 and folded inside the fiber 2026, propagates while being absorbed by the laser active substance, and completes a round trip before reaching the second reflecting face 2033. While making the round trip, the excitation light 2027 is almost completely absorbed by the laser active substance and then disappears. Conventionally, since an excitation light merely propagates in a single direction in the fiber while being absorbed, a gain for amplifying the fundamental wave decreases as the excitation light proceeds in the direction of propagation. On the other hand, in the present embodiment, since the excitation light 2027 is folded, makes a round trip and is absorbed inside the fiber 2026, a gain for amplifying the fundamental wave becomes uniformly higher inside the fiber 2026 compared to conventional cases.

In the present embodiment, a seed light of the fundamental wave 2023 is generated inside the fiber 2026 in a state where the excitation light 2027 has already made a round trip and is almost completely absorbed within the fiber 2026 and a gain that amplifies the fundamental wave has risen uniformly inside the fiber 2026. With the second reflecting face 2033 of the fiber 2026, and the fiber grating 2029 as a pair of reflecting faces of the laser resonator, the seed light of the fundamental wave repeatedly travels back and forth inside the laser resonator while being amplified and having its intensity increased until finally attaining laser oscillation.

For the fiber 2026 used in the present embodiment, for example, a double-clad polarization-maintaining fiber capable of propagating a high-power excitation light 2027 was used. As such, the excitation light 2027 propagates across a relatively spacious region consisting of the core and the inner clad of the fiber 2026 to be absorbed by the laser active substance contained in the fiber 2026. In addition, since the excitation light is able to propagate across a spacious region, a high-power excitation light 2024 can also be used.

After being outputted from the second reflecting face 2033, the fundamental wave 2023 outputted by the fiber 2026 is converted into parallel light by the collecting lens 2032*b* and reaches the extracting mirror 2030. A multilayer film 2035 for wavelength selection is formed on the surface of the extracting mirror 2030. Since the multilayer film 2035 is configured so as to transmit light with the same wavelength as the excitation light 2027 and reflect light with the same wavelength as the fundamental wave 2023, the fundamental wave 2023 is reflected off of the multilayer film 2035 of the extracting mirror 2030 and guided to the wavelength converting elements 2025*a* and 2025*b*.

In the present embodiment, the extracting mirror 2030 is desirably inserted at an angle of, for example, 40 to 50 degrees with respect to the excitation light 2027 so as to realize a configuration of a narrowband transmission filter. The insertion should be made at an angle of 40 to 50 degrees in order to ensure that a portion of the excitation light 2027 reflected by the extracting mirror 2030 does not return to the laser light source 2028, and because greater compactness can be achieved by arranging light outputted from the fiber laser 2022 and a light path outputted from the wavelength converting elements 2025*a* and 2025*b* so as to be perpendicular to each other. In order to prevent a portion of the excitation light 2027 from returning to the laser light source 2008 or when considering filter transmission characteristics, the insertion may alternatively be made at an angle of around 80 degrees. Furthermore, a narrowband transmission filter may be inserted between the extracting mirror 2030 and the collimating lens 2032*a* separate from the extracting mirror 2030.

By adapting such a configuration, for example, when a Yb-doped fiber is used as the fiber 2026, the transmitted wavelength of the transmission filter can be matched with the peak wavelength of absorption by the Yb-doped fiber of 915 nm or 976 nm. Furthermore, the excitation light will only have a narrowband half bandwidth of 2 to 3 nm centered on the transmitted wavelength of 915 nm or 976 nm. When the excitation light 2027 is transmitted through the extracting mirror 2030 and enters the light fiber 2026 as such a narrowband light, a portion of the excitation light 2027 is reflected off of the second reflecting face 2033 which is an end face of the fiber 2026. The reflected portion of the excitation light 2027 proceeds along the same optical path in the opposite direction and returns to the laser light source 2028, whereby the oscillation wavelength of the laser light source 2028 is locked by the narrowband light that is the returned portion of the excitation light 2027. While the excitation laser light source 2028 oscillates in multi-mode and therefore has a relatively wide wavelength half bandwidth of 5 nm or more to begin with, using an optical part that locks the wavelength of a transmission filter or the like to narrowband results in a narrowband laser light source with a wavelength half bandwidth of 2 to 3 nm. Due to such an effect, the half bandwidth of the wavelength of the excitation light 2027 is reduced, the efficiency of the entire laser light source is improved, the excitation light 2027 is more efficiently absorbed by the fiber laser 2022, and the light output from the excitation light 2027 to the fundamental wave 2023 is realized at a higher efficiency. In addition, since a higher absorption efficiency enables the fiber length to be further shortened, a fiber laser with an even higher efficiency can be produced when used to generate wavelengths of 1030 nm or less. Moreover, the reflectance ratio of the excitation light 2027 at the second reflecting face 2033 that is an end face of the fiber 2026 is desirably set to at least around 3 to 8% at this point, while the emitter width of the excitation light source 2028 is desirably set to 50 to 200 μm and more desirably to 50 to 100 μm because the smaller the number of oscillating modes, the more easier wavelengths can be locked.

Furthermore, the wavelength converting elements 2025*a* and 2025*b* are fixed on the temperature regulating mechanisms (Peltier elements and thermistors) 2038*a* and 2038*b*, and are controlled by the controller 2037. In addition, the excitation laser light source 2028 is driven by an LD current source 2039.

Meanwhile, with the wavelength converting apparatus 2021 according to the present embodiment, the length of the fiber 2026 is reduced to approximately half of a conventional configuration. When the excitation light is folded at the end face and is completely absorbed by the fiber 2026, the oscillation output of the fundamental wave light increases by about 10% in comparison with the case of the fifth embodiment described above. In the case of the present embodiment, the excitation light 2027 is folded by the first reflecting face 2034 and is completely absorbed by the time the excitation light 2027 makes a round trip inside the fiber 2026. Using a laser with a wavelength of 915 nm as the excitation laser light source 2028, the excitation light 2027 with a light output of 9 W was injected from an end face of the fiber 2026, and when a fundamental wave of 1064 nm is generated, the length of the fiber 2026 was altered to measure a light output of the 1064 nm-fundamental wave.

According to the measurement result, it was found that while the optimum length of the fiber in the configuration of the fifth embodiment was 17 m, the optimum length of the fiber in the configuration in the present embodiment was 7.5 m. This also substantiates that, in the present embodiment, the length of the fiber need only be half or less compared to conventional configurations. Moreover, it was found that the light output at the optimum length of the fiber according to the present embodiment exceeded the light output at the optimum length of the fiber in the configuration according to the fifth embodiment by around 20%. From this result, it is conceivable that oscillated light is efficiently amplified while making a round trip of the fiber, resulting in a higher gain with respect to the fundamental wave. Regarding a "light-to-light conversion efficiency" that is calculated by dividing the intensity of oscillated light by the intensity of inputted excitation light, while the fifth embodiment exhibited a value of 41.3%, merely adapting the oscillated light-folding configuration proposed in the present embodiment improved the value to 50.2%, and providing the reflecting face 2034 for reflecting excitation light further improved the value to 54.7%.

When activating the wavelength converting apparatus 2021 using this fiber as an example and exciting the fiber by an excitation light with a light output of 9 W, a G light of 1.5 W was stably acquired at a fundamental wave output of 6.3 W. Furthermore, green light conversion efficiency can conceivably be improved significantly by increasing fundamental wave output. With the configuration described above, the fiber laser 2022 according to the present embodiment is capable of almost completely absorbing excitation light with only half of the length of a conventional fiber and, at the same time, due to the increase in the amplification section of a fundamental wave, a uniformly high gain for amplifying the fundamental wave can be obtained. In addition, since the length of the fiber can now be reduced in half, the fiber laser 2022 can be made more compact, a high-power fundamental wave can be obtained, and the wavelength converting apparatus 2021 can be downsized.

Moreover, the fiber laser 2022 according to the present embodiment can be configured by a fiber whose length is reduced to half compared to a conventional fiber. Consequently, since the amount of fundamental wave absorption by the fiber laser 2022 is also reduced in half, the absorption amount on the shorter-wavelength side which has a greater amount of light absorption is also reduced in half, and as a result, the oscillation wavelength range can be expanded to 1030 to 1170 nm. For example, a laser light with a fundamental wave of 1030 nm that is shorter in wavelength than 1064 nm can now be outputted at high power, thereby achieving an advantage in that, when applied to a display, the color reproduction range thereof can be expanded.

In addition, the present embodiment requires that the fiber grating 2029 must be a double-clad fiber. However, in this case, due to the transmission of strong excitation light, a decline in output or fluctuations in wavelength spectrum such as described above in the fifth embodiment had been observed. In the present embodiment, one end of the fiber grating 2029 formed as a double-clad fiber is fixed to the holding member according to the fifth embodiment described above. Adopting the configuration according to the present embodiment prevents such a problem from occurring, improves electricity-to-light conversion efficiency, and achieves both the generation of light with shorter wavelengths and stabilization of wavelength spectrums and outputs.

While a spatial modulating element using a transmissive liquid crystal element has been used in the present embodiment, it is obvious that a modulating element using a micro-reflecting element or a two-dimensional modulating element using a galvanometer or a mechanical microswitch (MEMS) can also be used. By having a planar light guiding mechanism guide light to illuminate a large-size liquid crystal panel from the rear, the first to fourth embodiments can also be used as a backlight.

While the fiber laser in the fifth and sixth embodiments described above may use at least one rare-earth element selected from other rare-earth elements including Nd, Er, and the like, a fiber laser doped with Yb as the rare-earth element can be used in various light sources due to its broad gain and extremely wide oscillation wavelength range of 1030 to 1170 nm, and is therefore exceptionally desirable. In addition, the doping amount of the rare-earth element may be varied and a plurality of rare-earth elements may be doped depending on the wavelength or output of the wavelength converting apparatus.

In the fifth and sixth embodiments described above, while a rare earth-added fiber with a core diameter of 6 μm has been selected, it was now found that efficiency can be further improved with a core diameter of 8 μm or more. Compared to the case of 6 μm, since efficiency improves by a factor of 1.2 at 8 μm and by a factor of 1.4 at 10 μm, the core diameter is desirably 8 μm or greater. Since an excessively large core diameter causes oscillated light to deviate from single-mode conditions, the core diameter should desirably fall within the range of 8 to 12 μm.

While lasers with wavelengths of 915 nm and 976 nm have been used as the excitation laser light source of the fiber laser in the fifth and sixth embodiments described above, laser light sources with other wavelengths may also be used as long as such laser light sources are capable of exciting the fiber laser.

While $MgO:LiNbO_3$ having cyclic polarization-inverting characteristics has been used as the wavelength converting elements in the fifth and sixth embodiments described above, wavelength converting elements using other materials or having other structures, such as potassium titanyl phosphate ($KTiOPO_4$:KTP) or $Mg:LiTaO_3$ having a cyclic polarization-inverting structure may be used instead.

In the above fifth and sixth embodiments, besides the image displaying apparatuses configured as described earlier, it is also possible to realize a form in which projection is performed from behind a screen (rear projection display) or a form of a back panel in which light is irradiated to a large-size liquid crystal panel from a back face thereof.

While a reflective spatial modulating element integrated with micro-mirrors has been used in the fifth and sixth embodiments described above, it is obvious that a modulating element using a liquid crystal or a two-dimensional modulating element using a galvanometer or a mechanical microswitch (MEMS) can also be used.

In the fifth and sixth embodiments described above, since a light fiber propagating a harmonic wave does not necessary have to be a polarization-maintaining fiber such as a PANDA fiber in the case of a reflective spatial modulating element or a light-modulating element whose polarizing component does not significantly influence light modulating characteristics such as a MEMS or a galvanometer, when using a two-dimensional modulating device employing a liquid crystal, a polarization-maintaining fiber is desirably used because modulation characteristics and polarization characteristics have great relevancy.

The present invention may be summarized from the respective embodiments described above as follows. That is, a wavelength converting apparatus according to an aspect of the present invention comprises: a laser resonator that oscillates an excitation light outputted from a laser light source and outputs a fundamental wave; a first wavelength converting element that converts a fundamental wave outputted from the laser resonator to a harmonic wave; a first temperature control element that controls the temperature of the first wavelength converting element; a second wavelength converting element that converts a fundamental wave outputted from the first wavelength converting element without being converted by the first wavelength converting element among the fundamental wave incident to the first wavelength converting element into a harmonic wave; a second temperature control element that controls the temperature of the second wavelength converting element; a first detecting portion that detects an output of a harmonic wave outputted from the first wavelength converting element; a second detecting portion that detects an output of a harmonic wave outputted from the second wavelength converting element; and a controller that manages temperature control of the first wavelength converting element by the first temperature control element, temperature control of the second wavelength converting element by the second temperature control element, and current value control of a driving current applied to the laser light source, wherein the controller sums a first detected value by the first detecting portion and a second detected value by the second detecting portion, and based on the summed value, performs temperature control of the first and second wavelength converting elements.

According to the wavelength converting apparatus described above, since temperature control of the first and second wavelength converting elements is performed based on a summed value of a first detected value by the first detecting portion and a second detected value by the second detecting portion, even when fluctuations in the output of a harmonic wave from the second wavelength converting element occurs dependent on fluctuations in the output of a harmonic wave from the first wavelength converting element, fluctuations in the output of a summed value of the two harmonic waves can be effectively suppressed.

When executing temperature control of the first and second wavelength converting elements based on the summed value, the controller preferably suspends current value control of a driving current applied to the laser light source executed thus far and executes the temperature control of the first and second wavelength converting elements while holding the driving current at a constant value.

In this case, since the current value control of the driving current executed thus far is suspended and the temperature control of the first and second wavelength converting elements is executed while holding the driving current to a constant value, it is now possible to execute temperature control of the first and second wavelength converting elements with greater accuracy and control runaway of the control circuit attributable to having two wavelength converting elements.

The laser resonator preferably comprises: a double-clad single-mode fiber containing a laser active substance; a fiber on which a fiber grating is formed; and the laser light source which enters excitation light into the fiber.

In this case, since the fiber on which a fiber grating is formed and the double-clad single-mode fiber to be excited by the excitation light can be produced separately, a configuration accommodating respectively required characteristics can be realized.

Preferably, the holding temperature of the first and second wavelength converting elements ranges between 35 and 80° C., the first and second temperature control elements are Peltier elements, and the controller raises or lowers the temperatures of the first and second wavelength converting elements without reversing the polarity of a current applied to the Peltier elements.

In this case, by setting the holding temperature of the first and second wavelength converting elements to 35 to 80° C. which is higher than room temperature, the temperatures of the first and second wavelength converting elements can be raised or lowered without reversing the polarity of the current to be applied to the Peltier elements, thereby enabling temperature control of the first and second wavelength converting elements to be performed at high speed.

Preferably, the holding temperature of the first and second wavelength converting elements ranges between 80 and 200° C., the first and second temperature control elements are heaters, and the controller executes heating of the heaters to rise the temperatures of the first and second wavelength converting elements and suspends heating of the heaters to drop the temperatures of the first and second wavelength converting elements.

In this case, by setting the holding temperature of the first and second wavelength converting elements to 80 to 200° C., the temperature control of the first and second wavelength converting elements can be realized using inexpensive heaters.

Preferably, the controller performs temperature control of the first and second wavelength converting elements by supplying the first and second temperature control elements with a control current for performing temperature control of the first and second wavelength converting elements, and the waveform of the control current is pulse-width modulated.

In this case, by adjusting the pulse width of the waveform of the control current, an average value of the current value of the control current supplied to the first and second temperature control elements can be arbitrarily varied. As a result, temperature control of the first and second wavelength converting elements can be performed with high accuracy.

The controller preferably comprises a storage portion which stores the first and second detected values corresponding to a current value of the driving current applied to the laser light source when performing temperature control of the first and second wavelength converting elements.

In this case, since first and second detected values are recorded as the current value of the driving current applied to the laser light source varies, temperature control of the first and second wavelength converting elements can be performed with high accuracy while referencing the stored information.

Preferably, a temperature detecting portion that detects an internal temperature of the laser resonator is further provided, wherein the storage portion stores the first and second detected values corresponding to the temperature detected by the temperature detecting portion when performing temperature control of the first and second wavelength converting elements.

In this case, since an internal temperature of the laser resonator is detected and the temperature control of the first and second wavelength converting elements can be performed in accordance with the detected internal temperature of the laser resonator, the temperature control of the first and second wavelength converting elements can be simplified.

Preferably, the controller suppresses output fluctuations in a summed value of the first and second detected values by performing temperature control of the first and second wavelength converting elements in accordance with respective increases or decreases of the first and second detected values.

In this case, appropriate temperature control can be performed on the first and second wavelength converting elements in accordance with respective increases or decreases of the first and second detected values.

Preferably, when the first detected value increases or decreases and the direction of increase or decrease of the second detected value differs from the direction of increase or decrease of the first detected value, or when the first detected value increases or decreases and the second detected value is constant, the controller suppresses output fluctuations in a summed value of the first and second detected values by performing temperature control of the first wavelength converting element to vary the summed value of the first and second detected values and judging whether the varied summed value has recovered to a predetermined value or not, and in response to a judgment that the varied summed value has not recovered to the predetermined value, further varying the summed value of the first and second detected values by performing temperature control of the second wavelength converting element.

In this case, since the temperature of the first wavelength converting element and the temperature of the second wavelength converting element can be varied in opposite directions, output fluctuations in the summed value of the first and second detected values can be effectively suppressed.

Preferably, when the first and second detected values increase or decrease and the direction of increase or decrease of the first detected value and the direction of increase or decrease of the second detected value are the same, the controller suppresses output fluctuations in a summed value of the first and second detected values by individually varying the first and second detected values through temperature control of the first and second wavelength converting elements.

In this case, since the temperature of the first wavelength converting element and the temperature of the second wavelength converting element can be varied in the same directions, output fluctuations in the summed value of the first and second detected values can be effectively suppressed.

Preferably, when the second detected value increases or decreases and the first detected value is constant, the controller suppresses output fluctuations in a summed value of the first and second detected values by varying the summed value of the first and second detected values through temperature control of the second wavelength converting element.

In this case, since only the temperature of the second wavelength converting element can be varied, output fluctuations in the summed value of the first and second detected values can be effectively suppressed.

The harmonic wave outputted from the first and second wavelength converting elements is preferably a green light of 510 to 550 nm.

In this case, a W-class high-power green light can be obtained.

The first and second wavelength converting elements are preferably composed of a nonlinear optical crystal made up of $LiNbO_3$ or $LiTaO_3$ containing at least one of Mg, In, Zn, Sc, Er, and Nd.

In this case, first and second output values which are 95 to 85% of the phase-matched temperature can be obtained and temperature control can be performed using a higher-temperature side of the phase-matched temperature as a stand-by position. As a result, output fluctuations in accordance with temperature variations of the first and second wavelength converting elements can be reduced, and as a result, temperature control of the first and second wavelength converting elements can be simplified.

An image displaying apparatus according to another aspect of the present invention comprises: the wavelength converting apparatus described above; and an image processing portion which applies an image signal to a laser outputted from the wavelength converting apparatus, wherein the wavelength converting apparatus is a green laser light source that generates green light and which further comprises a red laser light source that generates red light and a blue laser light source that generates blue light, and the image processing portion sets a white balance of an image to be displayed by determining, based on a maximum output value of a laser light source whose maximum output value is the smallest among the green laser light source, the red laser light source and the blue laser light source, the output upper limit values of the other two laser light sources.

With the image displaying apparatus described above, since setting output values of the other two laser light sources in accordance with the laser light source whose maximum output value is the smallest shall suffice, simplification of the white balance adjustment can be achieved.

The image processing portion preferably varies the respective output values of the red laser light source, the blue laser light source and the green laser light source in accordance with a luminance signal of an inputted visual signal up to a ceiling that is the determined output upper limit value.

In this case, since output values of the respective laser light sources are varied up to a ceiling that is the determined output upper limit value, there is no longer a risk of deterioration of the laser light sources.

The current value of the driving current of the respective laser light sources at which the respective output values of the red laser light source, the blue laser light source and the green laser light source becomes zero is preferably equal to or greater than the respective threshold currents of the red laser light source, the blue laser light source and the green laser light source.

In this case, since the current value of the driving current of the respective laser light sources no longer varies across the thresholds, the generation of a large inrush current at the laser light sources can be prevented and the risk of deterioration of the laser light sources can be eliminated.

A wavelength converting apparatus according to another aspect of the present invention comprises: a laser light source that enters excitation light into a fiber; a laser resonator consisting of two fiber gratings fixed to an optical fiber containing a laser active substance and to a fiber grating fixing member; and a wavelength converting apparatus that converts a fundamental wave of a laser outputted from the laser resonator into a harmonic wave, wherein one end of at least one of the two fiber gratings is attached to the fiber grating fixing member and the other end is a free end.

Preferably, at least one of the two fiber gratings is formed as a double-clad fiber, and the one fiber grating is disposed at a position optically close to the excitation laser light source.

A wavelength converting apparatus according to another aspect of the present invention comprises: a laser light source that enters excitation light into a fiber; a laser resonator consisting of one fiber grating fixed to an optical fiber containing a laser active substance and to a fiber grating fixing member and a dielectric film reflecting face; and a wavelength converting apparatus that converts a fundamental wave of a laser outputted from the laser resonator into a harmonic wave, wherein one end of at least one of the two fiber gratings is attached to the fiber grating fixing member and the other end is a free end.

The fiber grating is preferably formed as a double-clad fiber.

The fiber grating is preferably held at its free end via a sleeve.

The core diameter of the fiber preferably ranges from 8 to 14 μm.

Preferably, the laser active substance contained in the optical fiber is ytterbium ion and the oscillation wavelength ranges from 1050 to 1170 nm.

Preferably, the laser active substance contained in the optical fiber is ytterbium ion and the oscillation wavelength ranges from 1030 to 1070 nm.

Preferably, the polarization direction of the oscillated light is linear polarization and the light output at the oscillation wavelength is 2 W or greater.

The fixed end of the fiber grating is preferably provided on the side of the optical fiber containing the laser active substance.

At the fiber grating, the fiber grating is preferably not covered.

The fiber grating preferably includes a holding portion cover that offers dust protection to the fiber grating portion.

An image display apparatus according to another aspect of the present invention comprises the wavelength converting apparatus described above.

INDUSTRIAL APPLICABILITY

The present invention is useful for stabilizing light output in a wavelength converting apparatus obtained by combining a fiber laser light source whose wavelength has been selected by a fiber grating with a wavelength converting element, and in an image displaying apparatus using the wavelength converting apparatus. In addition, the present invention enables stabilization of red light output and, in turn, enables stabilization of the colors of the image display apparatus.

The invention claimed is:

1. A wavelength converting apparatus comprising:
a laser resonator that oscillates an excitation light outputted from a laser light source and outputs a fundamental wave;
a first wavelength converting element that converts a fundamental wave outputted from the laser resonator to a harmonic wave;
a first temperature control element that controls the temperature of the first wavelength converting element;
a second wavelength converting element that converts a fundamental wave outputted from the first wavelength converting element without being converted by the first wavelength converting element among the fundamental wave incident to the first wavelength converting element into a harmonic wave;
a second temperature control element that controls the temperature of the second wavelength converting element;
a first detecting portion that detects an output of a harmonic wave outputted from the first wavelength converting element;
a second detecting portion that detects an output of a harmonic wave outputted from the second wavelength converting element; and
a controller that manages temperature control of the first wavelength converting element by the first temperature control element, temperature control of the second wavelength converting element by the second temperature control element, and current value control of a driving current applied to the laser light source, wherein
the controller sums a first detected value by the first detecting portion and a second detected value by the second detecting portion, and performs temperature control of the first and second wavelength converting in accordance with respective increases or decreases of the first and second detected values so that the summed value has a constant value.

2. The wavelength converting apparatus according to claim 1, wherein
when executing temperature control of the first and second wavelength converting elements based on the summed value, the controller suspends current value control of a driving current applied to the laser light source executed thus far and executes the temperature control of the first and second wavelength converting elements while holding the driving current at a constant value.

3. The wavelength converting apparatus according to claim 1, wherein
the laser resonator comprises: a double-clad single-mode fiber containing a laser active substance; a fiber on which a fiber grating is formed; and the laser light source which enters excitation light into the fiber.

4. The wavelength converting apparatus according to claim 1, wherein
the holding temperature of the first and second wavelength converting elements ranges between 35 and 80° C.,
the first and second temperature control elements are Peltier elements, and
the controller raises or lowers the temperatures of the first and second wavelength converting elements without reversing the polarity of a current applied to the Peltier elements.

5. The wavelength converting apparatus according to claim 1, wherein
the holding temperature of the first and second wavelength converting elements ranges between 80 and 200° C.,
the first and second temperature control elements are heaters, and
the controller executes heating of the heaters to rise the temperatures of the first and second wavelength converting elements and suspends heating of the heaters to drop the temperatures of the first and second wavelength converting elements.

6. The wavelength converting apparatus according to claim 1, wherein
the controller performs temperature control of the first and second wavelength converting elements by supplying the first and second temperature control elements with a control current for performing temperature control of the first and second wavelength converting elements, and
the waveform of the control current is pulse-width modulated.

7. The wavelength converting apparatus according to claim 1, wherein
the controller comprises a storage portion which stores the first and second detected values corresponding to a current value of the driving current applied to the laser light source when performing temperature control of the first and second wavelength converting elements.

8. The wavelength converting apparatus according to claim 7, further comprising:
a temperature detecting portion that detects an internal temperature of the laser resonator,
wherein the storage portion stores the first and second detected values corresponding to the temperature detected by the temperature detecting portion when the controller performs temperature control of the first and second wavelength converting elements.

9. The wavelength converting apparatus according to claim 1, wherein
the controller identifies one or both of the first and second wavelength converting elements to be controlled in temperature in accordance with respective increases or decreases of the first and second detected values.

10. The wavelength converting apparatus according to claim 9, wherein
when the first detected value increases or decreases and the direction of increase or decrease of the second detected value differs from the direction of increase or decrease of the first detected value, or when the first detected value increases or decreases and the second detected value is constant, the controller suppresses output fluctuations in a summed value of the first and second detected values by performing temperature control of the first wavelength converting element to vary the summed value of the first and second detected values and judging whether the varied summed value has recovered to a predetermined value or not, and in response to a judgment that the varied summed value has not recovered to the predetermined value, further varying the summed value of the first and second detected values by performing temperature control of the second wavelength converting element.

11. The wavelength converting apparatus according to claim 9, wherein when the first and second detected values increase or decrease and the direction of increase or decrease of the first detected value and the direction of increase or decrease of the second detected value are the same, the controller suppresses output fluctuations in a summed value of the first and second detected values by individually varying the first and second detected values through temperature control of the first and second wavelength converting elements.

12. The wavelength converting apparatus according to claim 9, wherein when the second detected value increases or decreases and the first detected value is constant, the controller suppresses output fluctuations in a summed value of the first and second detected values by varying the summed value of the first and second detected values through temperature control of the second wavelength converting element.

13. The wavelength converting apparatus according to claim 1, wherein the harmonic wave outputted from the first and second wavelength converting elements is a green light of 510 to 550 nm.

14. The wavelength converting apparatus according to claim 1, wherein the first and second wavelength converting elements are composed of a nonlinear optical crystal made up of $LiNbO_3$ or $LiTaO_3$ containing at least one of Mg, In, Zn, Sc, Er, and Nd.

15. An image displaying apparatus comprising:

the wavelength converting apparatus according to claim 1; and an image processing portion which applies an image signal to a laser outputted from the wavelength converting apparatus, wherein the wavelength converting apparatus is a green laser light source that generates green light and which further includes:

a red laser light source that generates red light, and a blue laser light source that generates blue light, and the image processing portion sets a white balance of an image to be displayed by determining, based on a maximum output value of a laser light source whose maximum output value is the smallest among the red laser light source, the blue laser light source and the green laser light source, the output upper limit values of the other two laser light sources.

16. The image displaying apparatus according to claim 15, wherein the image processing portion varies the respective output values of the red laser light source, the blue laser light source and the green laser light source in accordance with a luminance signal of an inputted visual signal up to a ceiling that is the determined output upper limit value.

17. The image displaying apparatus according to claim 16, wherein the current value of the driving current of the respective laser light sources at which the respective output values of the red laser light source, the blue laser light source and the green laser light source becomes zero is equal to or greater than the respective threshold currents of the red laser light source, the blue laser light source and the green laser light source.

* * * * *